US011084163B2

(12) United States Patent
Strempke et al.

(10) Patent No.: US 11,084,163 B2
(45) Date of Patent: Aug. 10, 2021

(54) MOBILE PROJECT CENTER SYSTEM

(71) Applicants: Shelby Lee Strempke, Huxley, IA (US); Fredrick James Good, Ogden, IA (US)

(72) Inventors: Shelby Lee Strempke, Huxley, IA (US); Fredrick James Good, Ogden, IA (US)

(73) Assignee: KREG ENTERPRISES, INC., Huxley, IA (US)

( * ) Notice: Subject to any disclaimer, the term of this patent is extended or adjusted under 35 U.S.C. 154(b) by 742 days.

(21) Appl. No.: 15/813,327

(22) Filed: Nov. 15, 2017

(65) Prior Publication Data

US 2020/0391372 A1 Dec. 17, 2020

Related U.S. Application Data

(60) Provisional application No. 62/422,997, filed on Nov. 16, 2016.

(51) Int. Cl.
*B23Q 3/02* (2006.01)
*B25H 1/04* (2006.01)
(Continued)

(52) U.S. Cl.
CPC ............... *B25H 1/04* (2013.01); *A47B 3/002* (2013.01); *A47B 3/087* (2013.01); *A47B 3/0912* (2013.01);
(Continued)

(58) Field of Classification Search
CPC ........ B25H 1/08; B25H 3/006; B25H 1/0078; A47B 3/0912; A47B 13/16; A47B 2200/0036; A47B 13/088
(Continued)

(56) References Cited

U.S. PATENT DOCUMENTS 379,236 A 3/1888 McCastline
380,558 A 4/1888 Eaton
(Continued)

FOREIGN PATENT DOCUMENTS

CA 2508205 6/2004
CA 2627812 4/2007
(Continued)

*Primary Examiner* — Joseph J Hail
*Assistant Examiner* — Shantese L McDonald
(74) *Attorney, Agent, or Firm* — Christopher A. Proskey; BrownWinick Law Firm

(57) ABSTRACT

A mobile project center system is presented that includes a center track having a pair of center supports and a pair of legs connected to the center support. A pair of benchtops are connected to the center track and move between an extended position and a retracted position. A pair of braces connect to each benchtop and provide support between the benchtop and the legs. These braces are locked and unlocked using a brace lock controlled by a brace control positioned just below the benchtops. A shelf extends between the opposing pairs of legs that transitions from a folded position and an extended position. The benchtop includes a plurality of openings in a grid pattern that facilitate attachment of various devices such as a joinery block. The system is used to perform a number of operations and converts between a plurality of configurations.

33 Claims, 62 Drawing Sheets

(51) Int. Cl.

| | |
|---|---|
| ***A47B 3/087*** | (2006.01) |
| ***A47B 3/091*** | (2006.01) |
| ***A47B 13/08*** | (2006.01) |
| ***A47B 13/16*** | (2006.01) |
| ***B25H 1/00*** | (2006.01) |
| ***B25H 1/08*** | (2006.01) |
| ***B25H 1/10*** | (2006.01) |
| ***B25H 1/12*** | (2006.01) |
| ***B25H 3/00*** | (2006.01) |
| ***B25H 3/06*** | (2006.01) |
| ***B25H 3/02*** | (2006.01) |
| ***A47B 3/00*** | (2006.01) |
| *A47B 3/08* | (2006.01) |

(52) U.S. Cl.

CPC .......... *A47B 13/081* (2013.01); *A47B 13/088* (2013.01); *A47B 13/16* (2013.01); *B25H 1/0078* (2013.01); *B25H 1/08* (2013.01); *B25H 1/10* (2013.01); *B25H 1/12* (2013.01); *B25H 3/003* (2013.01); *B25H 3/006* (2013.01); *B25H 3/02* (2013.01); *B25H 3/06* (2013.01); *A47B 2003/0821* (2013.01); *A47B 2200/0036* (2013.01); *A47B 2200/0066* (2013.01); *A47B 2200/0085* (2013.01)

(58) Field of Classification Search

USPC ................ 269/136, 139, 145, 220, 258, 901

See application file for complete search history.

(56) References Cited

U.S. PATENT DOCUMENTS 399,977 A 3/1889 Davis
409,764 A 8/1889 Woods
425,210 A 4/1890 Cobb
3,984,092 A * 10/1976 Fitzpatrick .............. B25B 5/163 269/88
4,500,081 A * 2/1985 Carossino ............... B25B 5/108 269/100
D279,736 S 7/1985 Zastera et al.
5,305,850 A 4/1994 McQuiston
5,351,730 A 10/1994 Lewellen et al.
5,377,780 A 1/1995 Dunaway
D357,140 S 4/1995 Hollinger
5,421,430 A 6/1995 Cox
D361,216 S 8/1995 Lewellen et al.
5,439,073 A 8/1995 Johnson
5,467,842 A 11/1995 Meloy
5,560,449 A 10/1996 Smith
5,582,267 A 12/1996 Bockover et al.
5,584,254 A * 12/1996 Williams ................. A47B 3/02 108/118
D379,236 S 5/1997 Sheftel
5,626,321 A 5/1997 Ulshafer, Jr.
D380,558 S 7/1997 Calvin
5,647,455 A 7/1997 Russell
D392,746 S 3/1998 Dickinson et al.
5,758,744 A 6/1998 Forino
5,813,495 A 9/1998 Smith
D399,977 S 10/1998 Laga
5,868,185 A 2/1999 Poling et al.
5,875,828 A 3/1999 Quiram
5,884,681 A 3/1999 Nickles
D409,764 S 5/1999 Laga
5,904,225 A 5/1999 Patros et al.
5,921,347 A 7/1999 Rodriguez et al.
5,927,436 A 7/1999 Schutz
5,954,156 A 9/1999 Cooke
6,019,193 A 2/2000 Brown
6,021,866 A 2/2000 Meeks
6,029,721 A 2/2000 O'Banion
D425,105 S 5/2000 Dupau
6,059,071 A 5/2000 Appezzato
6,113,088 A * 9/2000 Gakhar ................... B25B 5/105 269/139
D432,670 S 10/2000 Horrell
6,155,318 A 12/2000 Underwood
6,173,660 B1 1/2001 Emmert
6,199,608 B1 3/2001 Ayala et al.
6,283,250 B1 9/2001 Asher
6,286,824 B1 9/2001 Sagol
6,298,946 B1 10/2001 Yemini et al.
6,305,498 B1 10/2001 Itzkovitch
6,422,343 B1 7/2002 Berg
D475,142 S 5/2003 Sommerville et al.
6,712,182 B1 3/2004 Baker
D493,236 S 7/2004 Frey
D502,777 S 3/2005 Kempf
6,899,306 B1 5/2005 Huang
6,968,790 B1 11/2005 Kocsis
D520,775 S 5/2006 Liu et al.
7,036,540 B2 5/2006 Welsh et al.
7,140,409 B2 11/2006 Leberfinger et al.
D535,490 S 1/2007 Wise
D535,491 S 1/2007 Wise
D536,800 S 2/2007 Kyle
7,172,053 B2 2/2007 Slavich
D550,476 S 9/2007 Liu et al.
D556,419 S 11/2007 Whiteside et al.
D563,113 S 3/2008 Snider
D564,780 S 3/2008 Reeves et al.
D565,320 S 4/2008 Wenskowski
D572,937 S 7/2008 Wenskowski
7,415,933 B2 8/2008 Sagol
D577,507 S 9/2008 Collins et al.
7,418,907 B2 * 9/2008 Haimoff ................... B25H 1/04 108/115
7,458,403 B2 12/2008 Radermacher
D584,421 S 1/2009 Wise
7,588,255 B2 9/2009 Katz
D604,864 S 11/2009 Jansson et al.
D638,140 S 5/2011 Busschaert et al.
D638,141 S 5/2011 Busschaert et al.
8,016,079 B1 9/2011 Huls
D648,443 S 11/2011 Busschaert et al.
8,267,017 B1 9/2012 Michael
D681,851 S 5/2013 Zidek et al.
8,439,164 B1 5/2013 Esposito
8,439,165 B2 5/2013 Busschaert et al.
D688,388 S 8/2013 Ardoin
D688,901 S 9/2013 Colson
8,584,601 B1 11/2013 Deschner
8,684,052 B2 4/2014 Breitenbach
D704,858 S 5/2014 Green
D708,351 S 7/2014 Ken-Dror et al.
D709,626 S 7/2014 Wise
D721,442 S 1/2015 Wang
8,931,529 B2 1/2015 Fregeau
D729,555 S 5/2015 Saigauvker et al.
9,140,401 B2 9/2015 Hoyle
9,186,736 B1 11/2015 Chang
9,347,229 B2 5/2016 Ken-Dror et al.
9,505,121 B2 11/2016 Pearson
9,515,267 B2 12/2016 Michael
D781,083 S 3/2017 Zhu
2002/0011381 A1 1/2002 Wilkerson
2002/0038741 A1 4/2002 Krajec
2002/0043432 A1 4/2002 Elwick
2002/0108481 A1 8/2002 Logan
2002/0125072 A1 9/2002 Levy
2003/0024604 A1 2/2003 Derecktor
2003/0079661 A1 5/2003 Luu
2004/0124036 A1 7/2004 Ulshafter
2004/0188178 A1 9/2004 Slemmer
2005/0006002 A1 1/2005 Barclay deTolly
2005/0011421 A1 1/2005 Zhang
2005/0045422 A1 3/2005 Remmers
2005/0167199 A1 8/2005 Kempf
2005/0224291 A1 10/2005 Fasanella
2005/0230188 A1 10/2005 Berg
2006/0124395 A1 6/2006 Fisher
2006/0130715 A1 6/2006 Yoo

(56) References Cited

U.S. PATENT DOCUMENTS

| | | | |
|---|---|---|---|
| 2006/0162627 | A1 | 7/2006 | Alger |
| 2006/0272744 | A1 | 12/2006 | Liu et al. |
| 2008/0035427 | A1 | 2/2008 | Fowler |
| 2008/0173498 | A1 | 7/2008 | Beyor |
| 2009/0242329 | A1 | 1/2009 | Krauss |
| 2009/0183948 | A1 | 7/2009 | Sciorrota, Jr. |
| 2009/0260921 | A1 | 10/2009 | Osborne |
| 2010/0012432 | A1 | 1/2010 | Noel |
| 2010/0288585 | A1 | 11/2010 | Katz et al. |
| 2011/0233000 | A1 | 9/2011 | Sutton et al. |
| 2012/0174835 | A1 | 7/2012 | Chen |
| 2013/0075197 | A1 | 3/2013 | Peter |
| 2013/0092005 | A1 | 4/2013 | Wiker et al. |
| 2013/0160894 | A1 | 6/2013 | Whalen |
| 2013/0285302 | A1 | 10/2013 | Helm |
| 2014/0232053 | A1 | 8/2014 | Lifshitz et al. |
| 2015/0075909 | A1 | 3/2015 | Walker et al. |
| 2016/0101514 | A1 | 4/2016 | Moore |
| 2016/0107305 | A1 | 4/2016 | Reinhart |
| 2016/0176040 | A1 | 6/2016 | Wysong |
| 2016/0221177 | A1 | 7/2016 | Reinhart |
| 2016/0346912 | A1 | 12/2016 | Reinhart |
| 2016/0375574 | A1 | 12/2016 | Reinhart |
| 2017/0106527 | A1 | 4/2017 | Birnbaum et al. |
| 2017/0173778 | A1 | 6/2017 | Reinhart |
| 2017/0252917 | A1 | 9/2017 | Williams |

FOREIGN PATENT DOCUMENTS

| | | |
|---|---|---|
| CA | 2314044 | 3/2008 |
| FR | 2898474 | 3/2006 |
| GB | 9709119 | 11/1998 |
| GB | 0908747 | 5/2009 |
| IL | 124680 | 12/2001 |
| WO | 2016063285 | 4/2016 |
| WO | 2017009844 | 1/2017 |
| WO | 2017083713 | 5/2017 |

* cited by examiner

MOBILE PROJECT CENTER SYSTEM

CROSS REFERENCE TO RELATED APPLICATIONS

This application claims the benefit of U.S. Provisional Patent Application Ser. No. 62/422,997 filed on Nov. 16, 2016.

FIELD OF THE DISCLOSURE

This invention relates generally to portable supporting devices and workbenches. More specifically and without limitation, this invention relates to a workbench that has a number of features that provides new and unique functionality.

BACKGROUND OF THE DISCLOSURE

Portable workbenches are old and well known in the art. There are many forms of portable workbenches on the market. Manufacturers of currently available workbenches include Stanley Black & Decker having an address of 1000 Stanley Drive, New Britain, Conn. 06053; Craftsman by Sears Holdings Corporation, having an address of 3333 Beverly Road Hoffman Estates, Ill. 60179; Keter having an address of 2369 Charles Raper Jonas Hwy, Stanley, N.C. 28164; Husky by The Home Depot having address of 2455 Paces Ferry Rd SE, #B #3, Atlanta, Ga. 30339-1834; Performance Tool by Wilmar Corporation, P.O. Box 88259, Tukwila, Wash. 98138; Grizzly Industrial Inc. having an address of 1821 Valencia St., Bellingham, Wash. 98229, among many other manufacturers.

While each of these prior art workbenches provide various functionality and various features, each of these workbenches suffer from one or more substantial deficiencies and disadvantages. Namely, the prior art workbenches are unnecessarily difficult to use or inconvenient to set-up or take down. In addition, the prior art work benches only provide limited functionality or features. Furthermore, the prior art work benches are cumbersome to use and difficult to transport. As such, users of workbenches have substantial needs that are unmet by the present offering of workbenches.

Therefore, for all the reasons stated above, and the reasons stated below, there is a need in the art for a mobile project center that improves upon the state of the art.

Another object of at least one embodiment of the disclosure is to provide a mobile project center that provides improved functionality over prior art workbenches.

Yet another object of at least one embodiment of the disclosure is to provide a mobile project center that provides improved features over prior art workbenches.

Another object of at least one embodiment of the disclosure is to provide a mobile project center that provides a unique combination of features over prior art workbenches.

Yet another object of at least one embodiment of the disclosure is to provide a mobile project center that provides a unique combination of functionalities over prior art workbenches.

Another object of at least one embodiment of the disclosure is to provide a mobile project center that is easy to use.

Yet another object of at least one embodiment of the disclosure is to provide a mobile project center that is convenient to use.

Another object of at least one embodiment of the disclosure is to provide a mobile project center that is safe to use.

Yet another object of at least one embodiment of the disclosure is to provide a mobile project center that can be manipulated into a plurality of configurations and saves time.

Another object of at least one embodiment of the disclosure is to provide a mobile project center that improves accuracy.

Yet another object of at least one embodiment of the disclosure is to provide a mobile project center that can be used with a plurality of other accessories to perform additional functions.

Another object of at least one embodiment of the disclosure is to provide a mobile project center that can be quickly and easily set-up.

Yet another object of at least one embodiment of the disclosure is to provide a mobile project center that can be quickly and easily taken down.

Another object of at least one embodiment of the disclosure is to provide a mobile project center that is easily transported.

Yet another object of at least one embodiment of the disclosure is to provide a mobile project center that is rigid.

Another object of at least one embodiment of the disclosure is to provide a mobile project center that is durable.

Yet another object of at least one embodiment of the disclosure is to provide a mobile project center that facilitates end-to-end connection of two or more workbenches.

Another object of at least one embodiment of the disclosure is to provide a mobile project center that facilitates side-to-side connection of two work benches.

Yet another object of at least one embodiment of the disclosure is to provide a mobile project center that can function as a sawhorse.

Another object of at least one embodiment of the disclosure is to provide a mobile project center that can function as an expanded table.

Yet another object of at least one embodiment of the disclosure is to provide a mobile project center that can function as a table with a sacrificial surface.

Another object of at least one embodiment of the disclosure is to provide a mobile project center that can function as a vise.

Yet another object of at least one embodiment of the disclosure is to provide a mobile project center that is configured to hold containers.

Another object of at least one embodiment of the disclosure is to provide a mobile project center that is configured to receive a Kreg Jig.

Yet another object of at least one embodiment of the disclosure is to provide a mobile project center that facilitates clamping.

Another object of at least one embodiment of the disclosure is to provide a mobile project center that has a long useful life.

Yet another object of at least one embodiment of the disclosure is to provide a mobile project center that is high quality.

Another object of at least one embodiment of the disclosure is to provide a mobile project center that improves efficiencies.

Yet another object of at least one embodiment of the disclosure is to provide a mobile project center that improves the quality of products made using the system.

Another object of at least one embodiment of the disclosure is to provide a mobile project center that is fun to use.

These and other objects, features, or advantages of at least one embodiment of the disclosure will become apparent from the specification, figures and claims.

SUMMARY OF THE DISCLOSURE

A mobile project center system is presented that includes a center track having a pair of center supports and a pair of legs connected to the center support. A pair of benchtops hingedly connect to the center track and move between an extended position and a retracted position. A pair of braces connect to each benchtop and provide support between the benchtop and the legs below the benchtop. These braces are locked and unlocked using a brace lock controlled by a brace control. A shelf extends between the opposing pairs of legs that transitions from a folded position and an extended position. The benchtop includes a plurality of openings in a grid pattern that facilitate attachment of various devices such as a joinery block. The edge of benchtop includes a recess that is configured to receive a flange of a container thereby holding the container along the edge of the workbench. The system is used to perform a number of operations and converts between a plurality of configurations.

DETAILED DESCRIPTION OF THE DISCLOSURE

Figure 1:
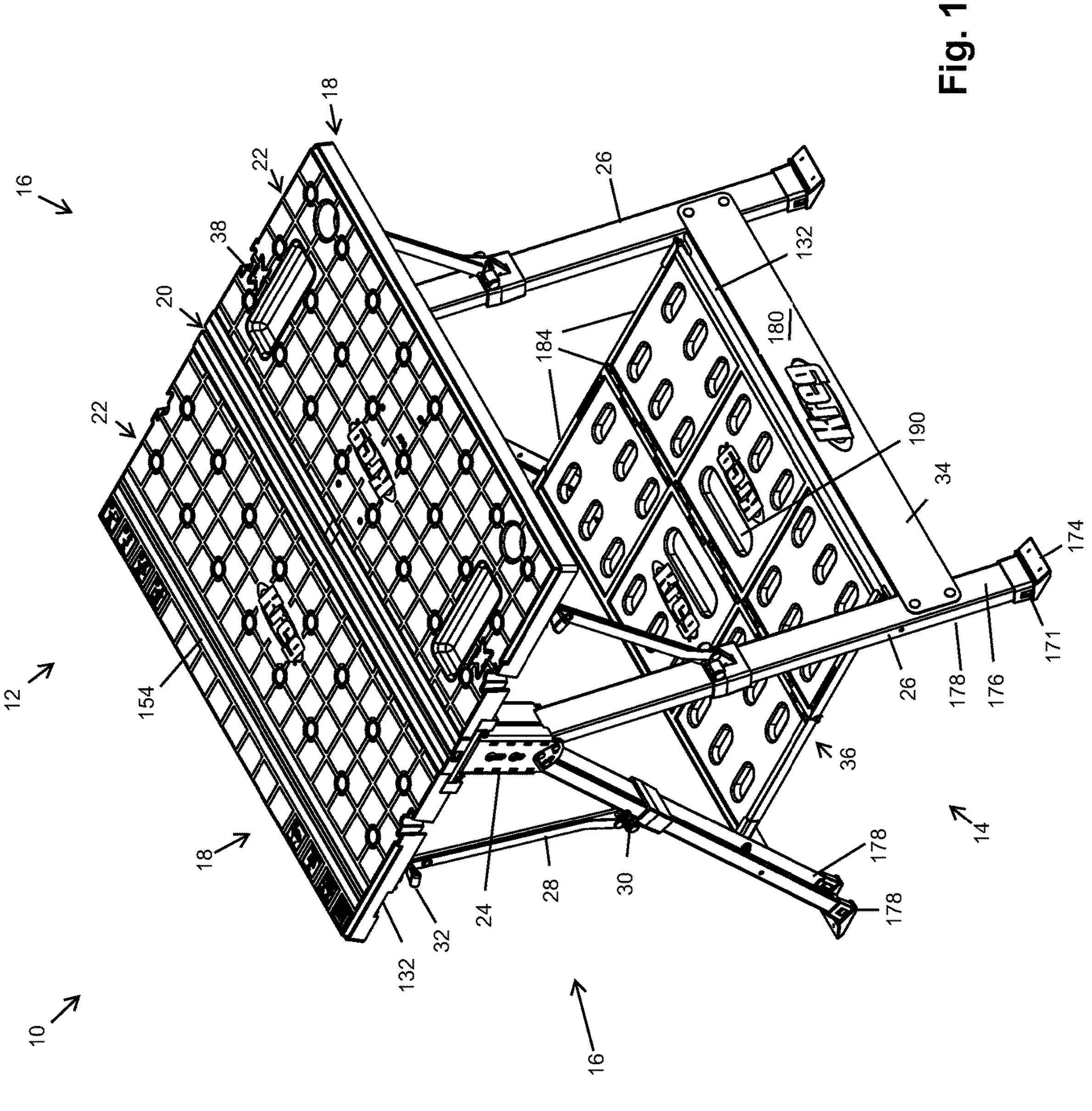
FIG. 1 is a perspective view of a mobile project center system; the view showing the mobile project center system in a fully extended position; the view showing a center track having a slot in its upper surface positioned between a pair of benchtops; the view showing two pairs of legs in a fully extended position that are connected to a center support positioned at opposing ends of the center track; the view showing braces having brace locks and brace controls extending between the legs and the benchtops that provide support to the benchtops and control the raising and lowering of benchtops; the view showing cross supports extending between legs on opposing ends of the mobile project center system; the view showing a collapsible shelf extending between legs on opposing sides of the mobile project center; the view showing the benchtops having a grid of openings and a grid pattern in their upper surface; the view showing a slot in the lower surface of a benchtop; the view showing a center support having a plurality of slots that are configured to receive a support bracket and a plurality of key holes that are configured to receive a bench clamp.
Figure 2:
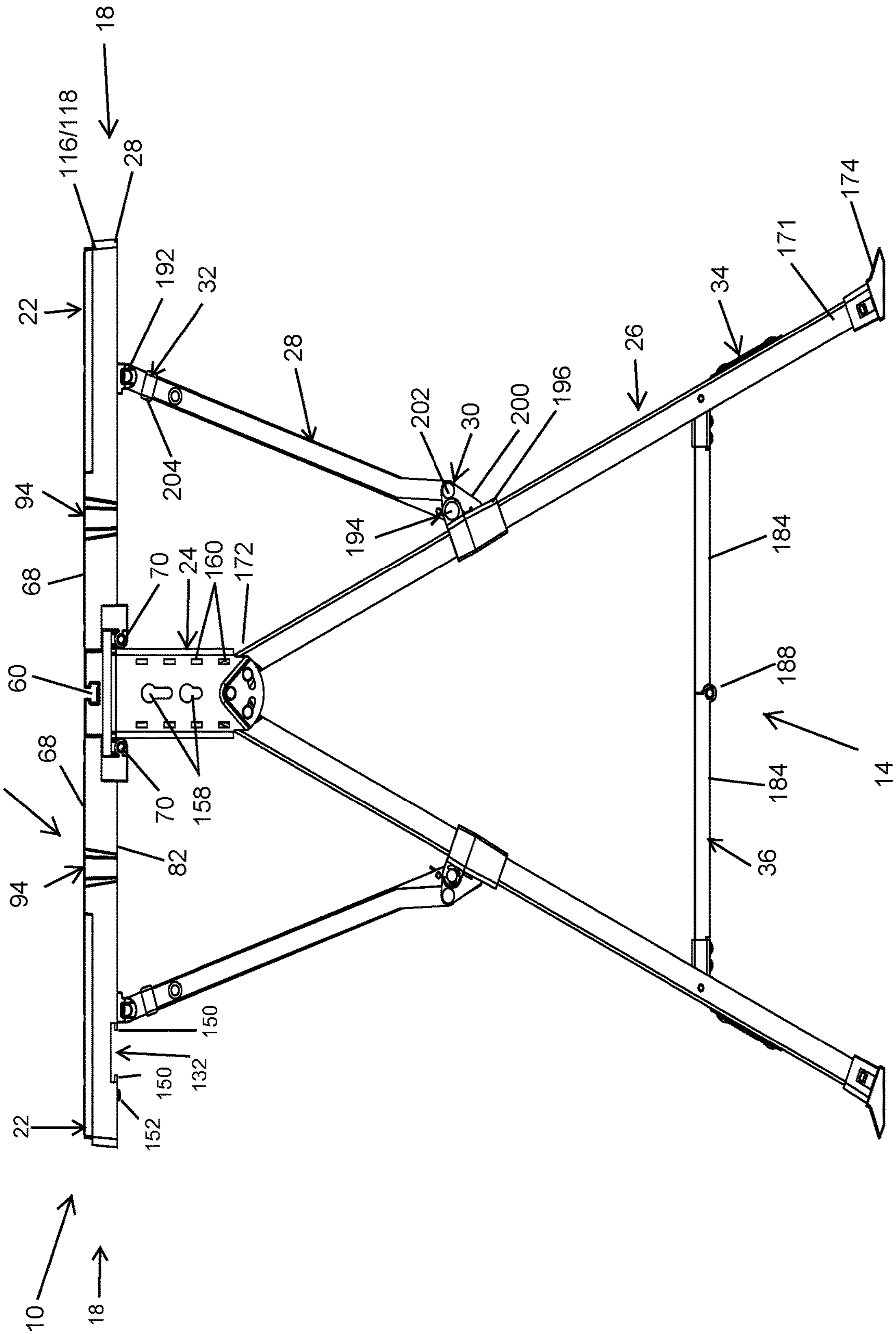
FIG. 2 is an elevation view of an end of the mobile project center system shown in FIG. 1.
Figure 3:
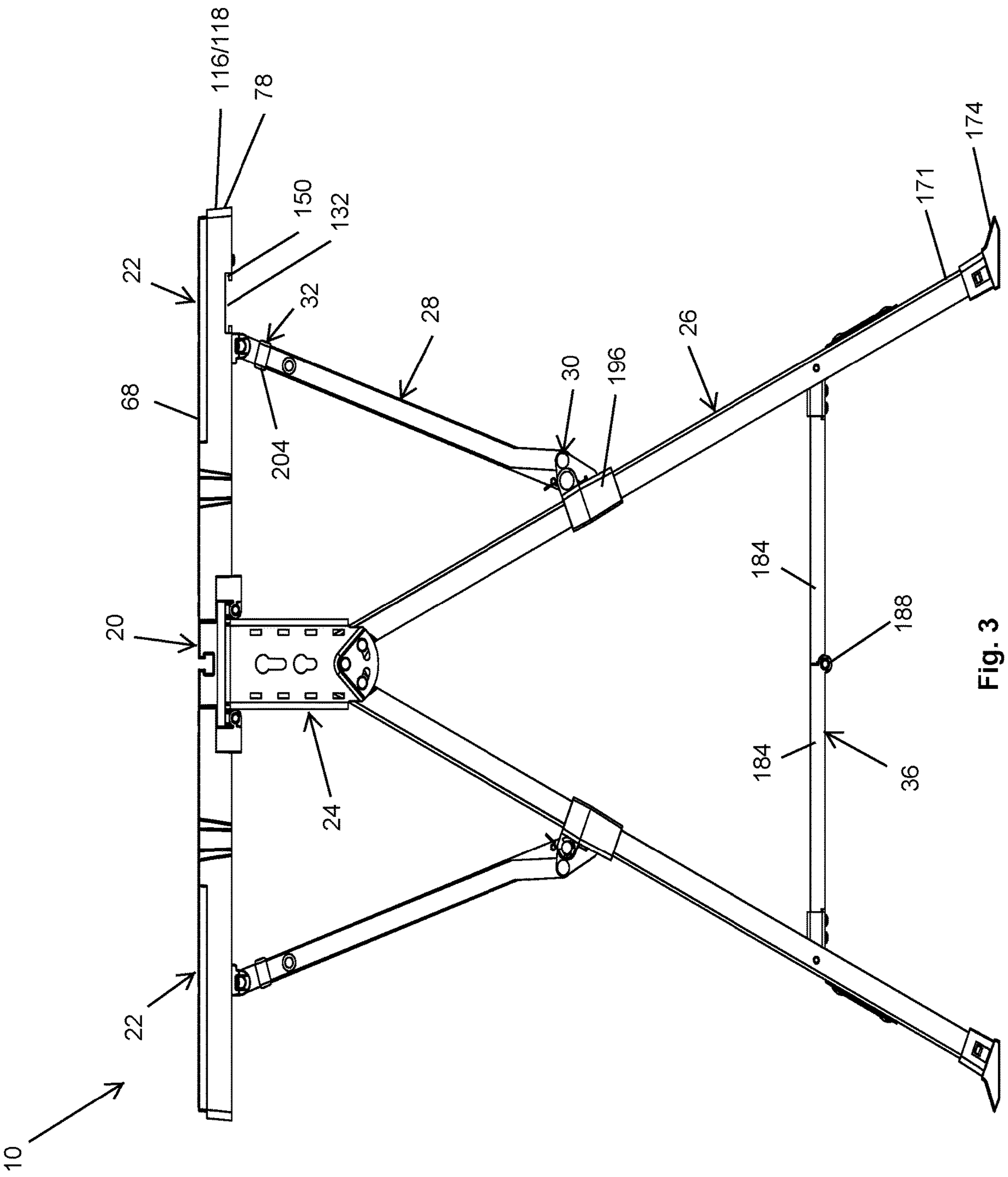
FIG. 3 is an elevation view of an end of the mobile project center system shown in FIG. 1; the view showing an opposite end as shown in FIG. 2.
Figure 4:
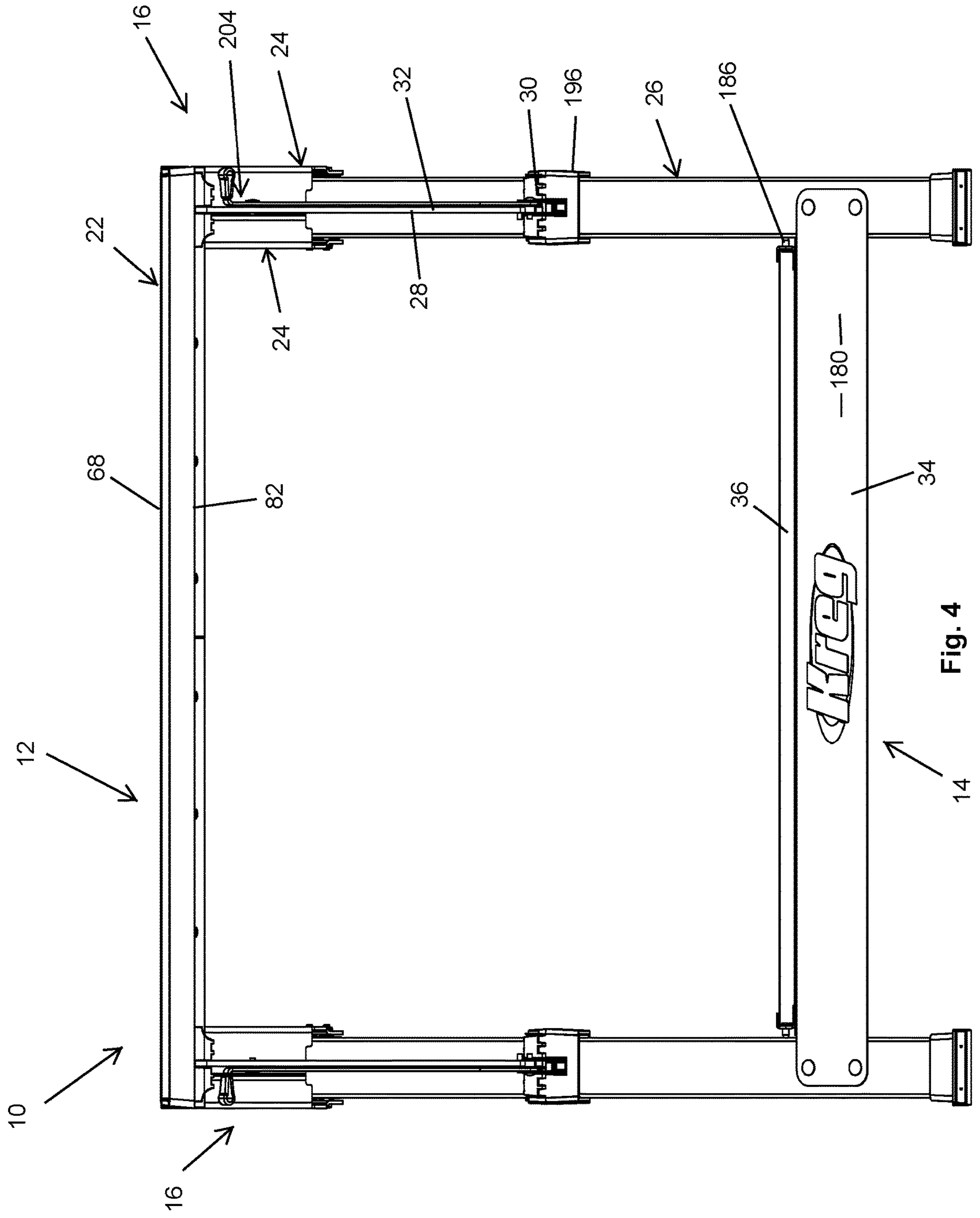
FIG. 4 is an elevation view of a side of the mobile project center system shown in FIG. 1.
Figure 5:
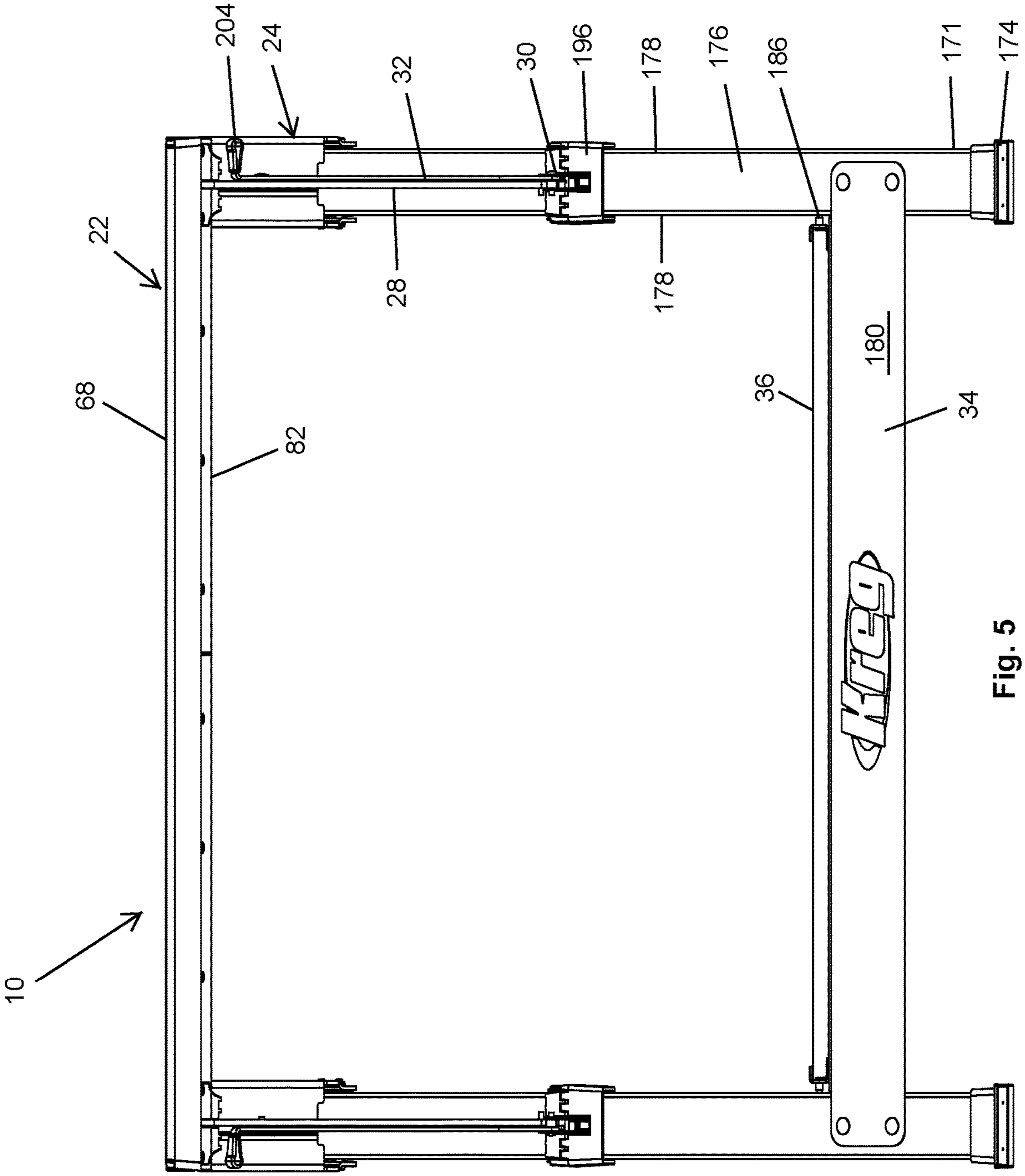
FIG. 5 is an elevation view of a side of the mobile project center system shown in FIG. 1; the view showing an opposite side as shown in FIG. 4.
Figure 6:
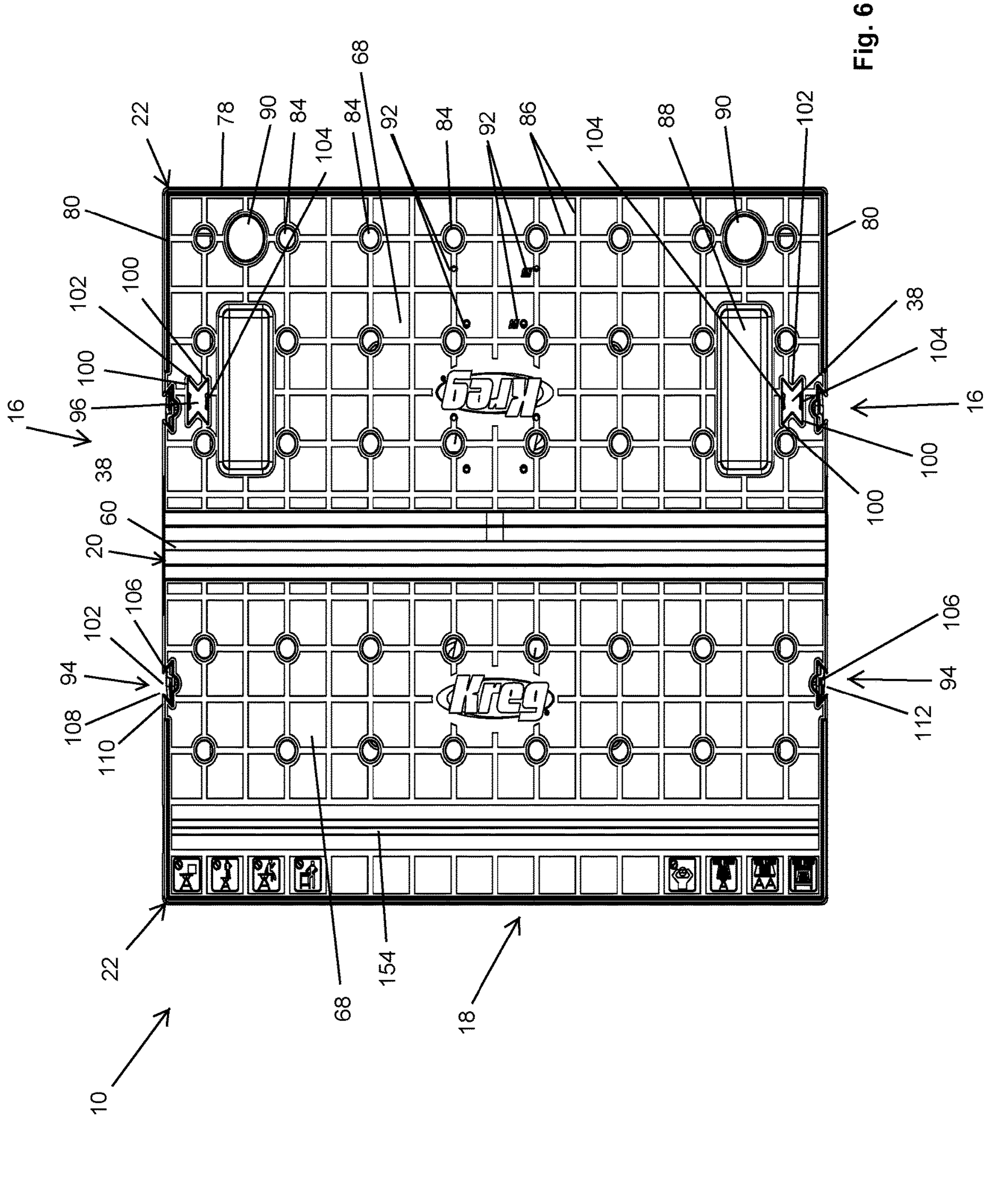
FIG. 6 is an elevation view of a top side of the mobile project center system shown in FIG. 1; the view showing the center track having a slot with a benchtop connected to either side of the center track; the view showing the benchtops having a bench dog grid of openings that are used to attach accessories such as a joinery block that helps to stop and align workpieces; the view showing a grid pattern in the upper surface that provides guidance on alignment of workpieces; the view showing the bench tops having recesses in the ends of the benchtops that receive connection keys that facilitate end to end connection of two mobile project center systems; the view showing a pair of trays in the upper surface of a benchtop that holds components such as screws and drill bits; the views showing drill holsters in a benchtop that are configured to receive and hold a drill therein.
Figure 7:
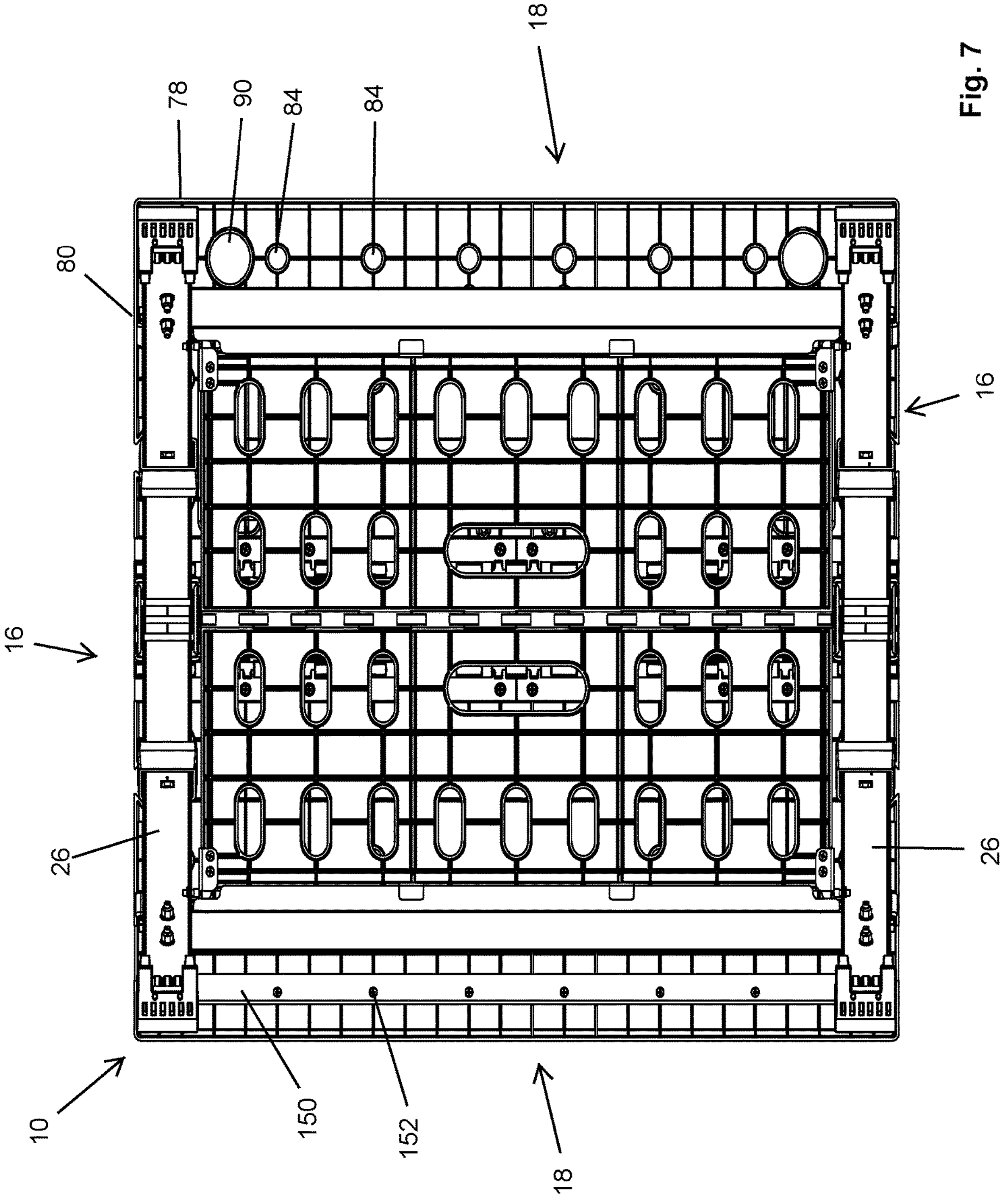
FIG. 7 is an elevation view of a bottom side of the mobile project center system shown in FIG. 1; the view showing the legs in an extended position; the view showing the shelf in an extended position; while much of the features of the benchtops are covered the legs and shelf, the view showing a portion of the slot in the lower surface of the benchtop with a flange connected to the lower surface of the benchtop that covers a portion of the recess that forms the slot.
Figure 8:
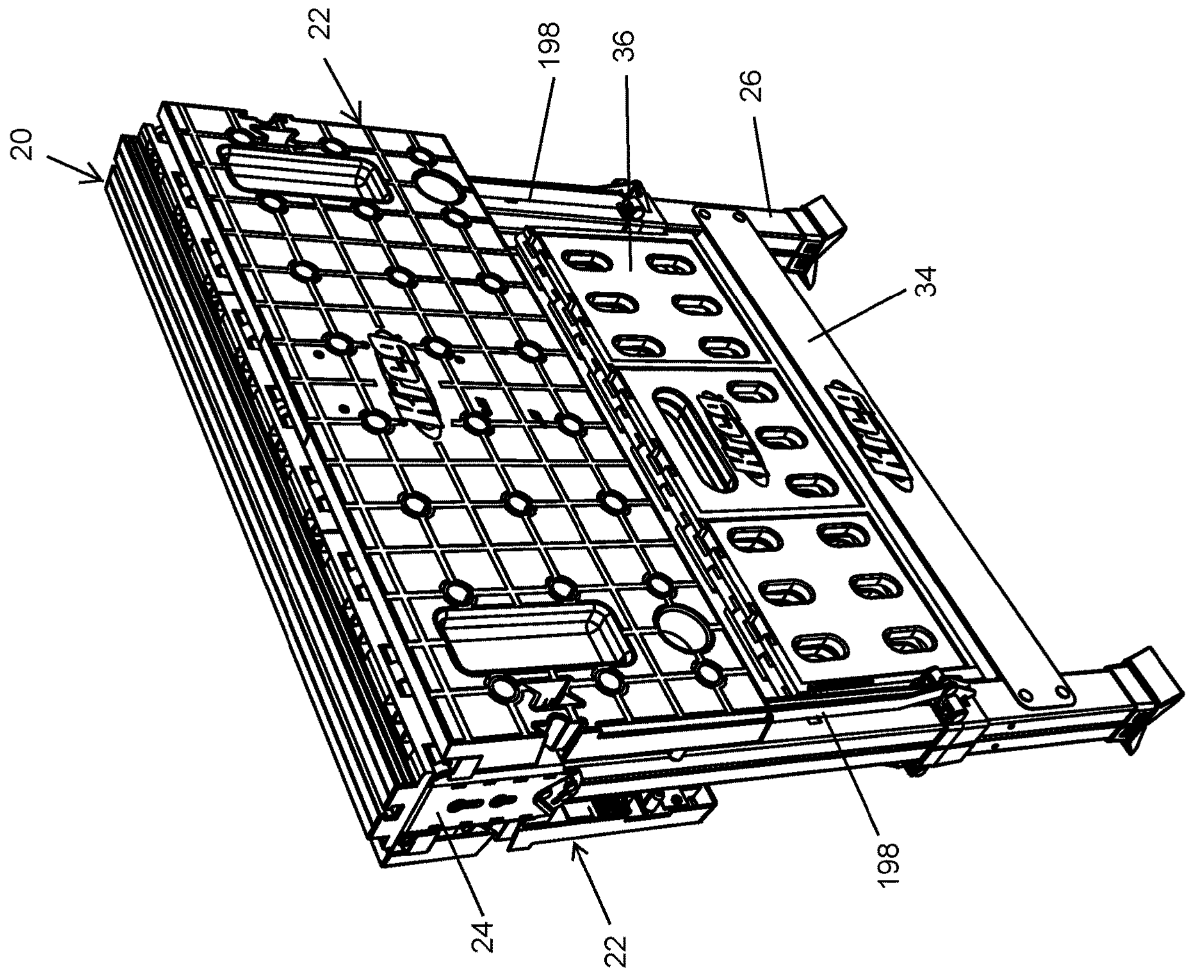
FIG. 8 is a perspective view of a the mobile project center system shown in FIG. 1; the view showing the mobile project center in a fully retracted position.
Figure 9:
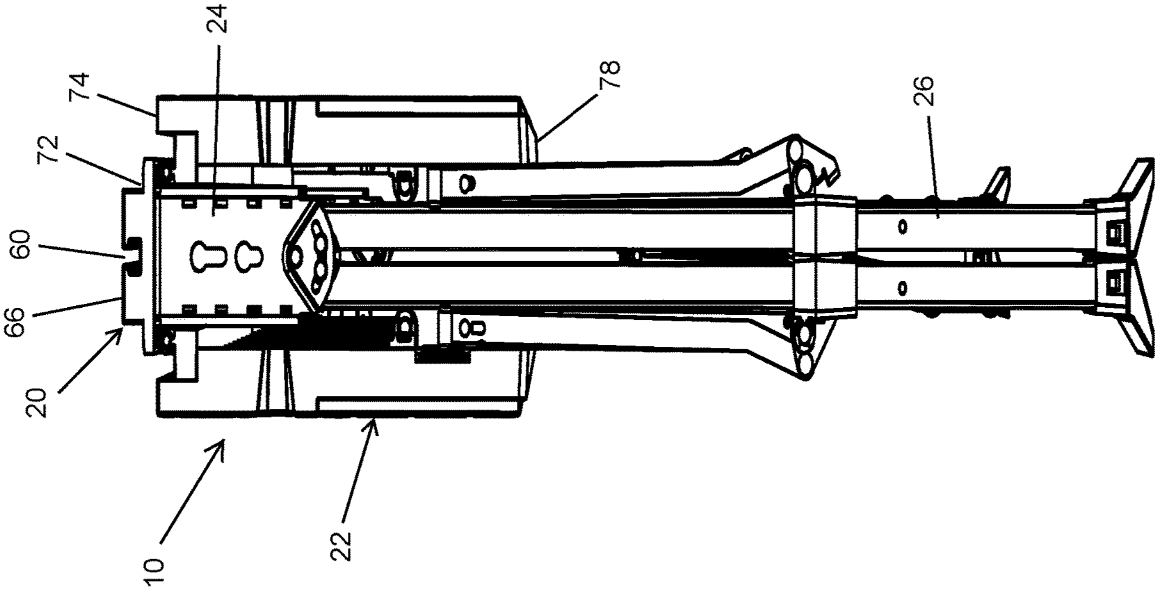
FIG. 9 is an elevation view of an end of the mobile project center system shown in FIG. 8; the view showing the mobile project center in a fully retracted position; the view showing the slot in the center track; the view showing the step in the sides of the center track that receive the steps in the inward edges of the benchtops.
Figure 10:
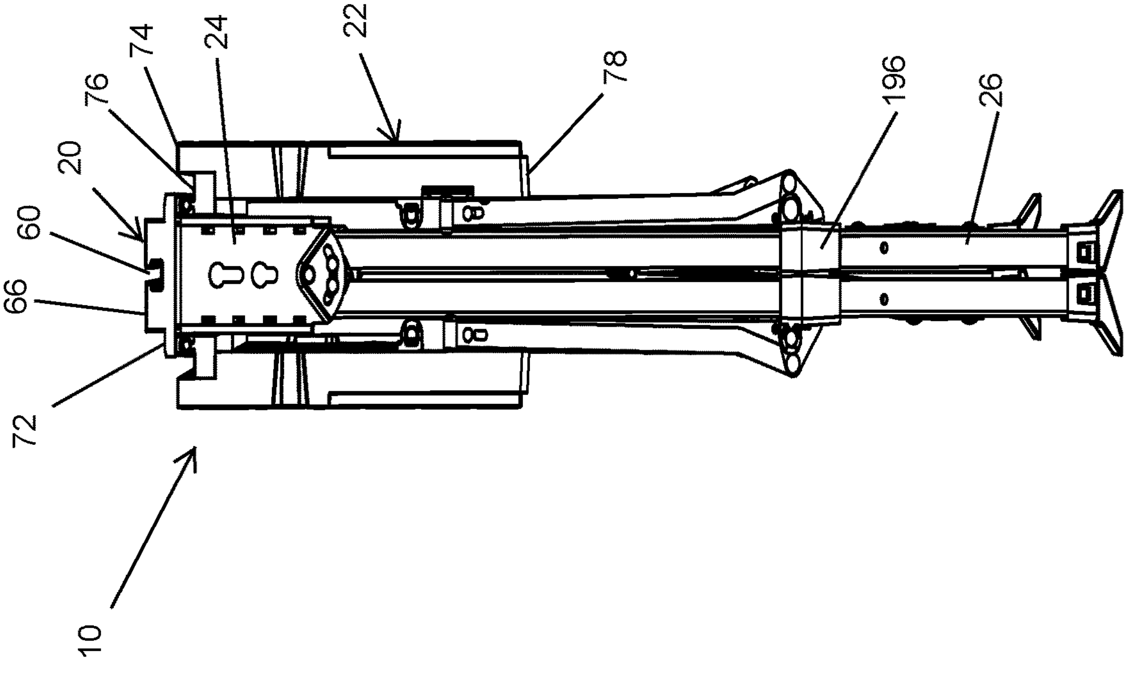
FIG. 10 is an elevation view of an end of the mobile project center system shown in FIG. 8; the view showing an opposite end of the mobile project center as shown in FIG. 9.
Figure 11:
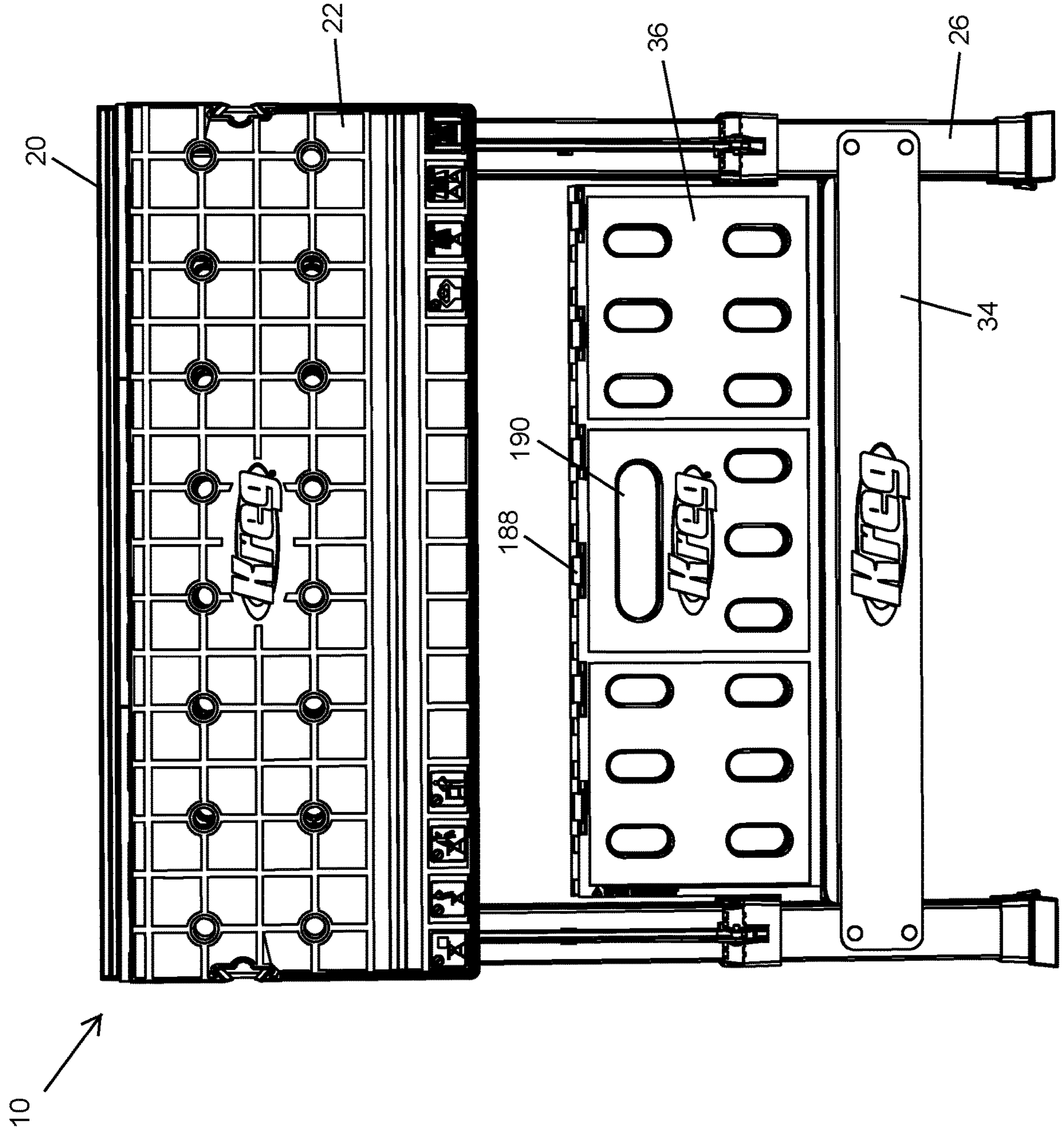
FIG. 11 is an elevation view of a side of the mobile project center system shown in FIG. 8.
Figure 12:
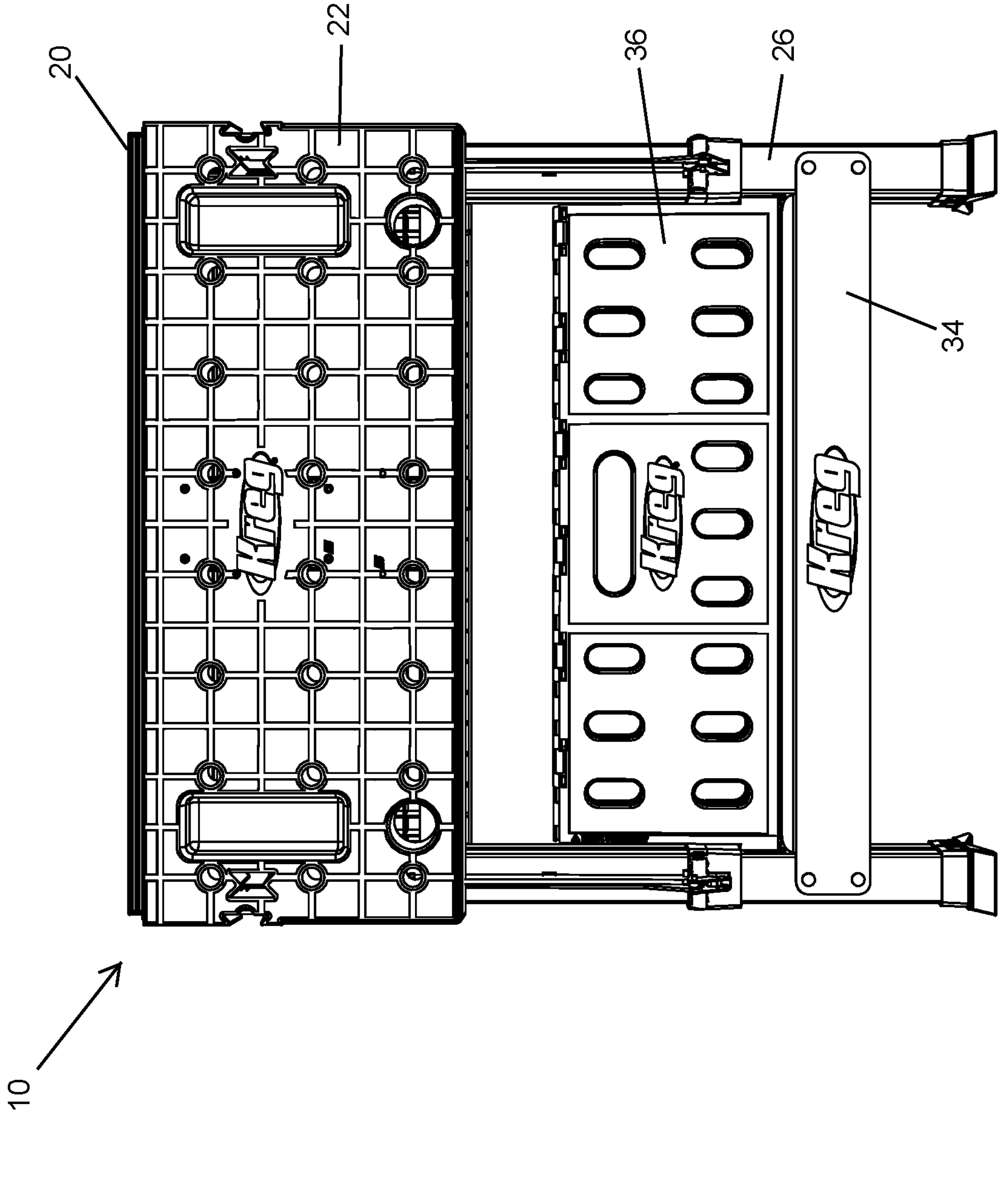
FIG. 12 is an elevation view of a side of the mobile project center system shown in FIG. 8; the view showing an opposite side of the mobile project center as shown in FIG. 11.
Figure 13:
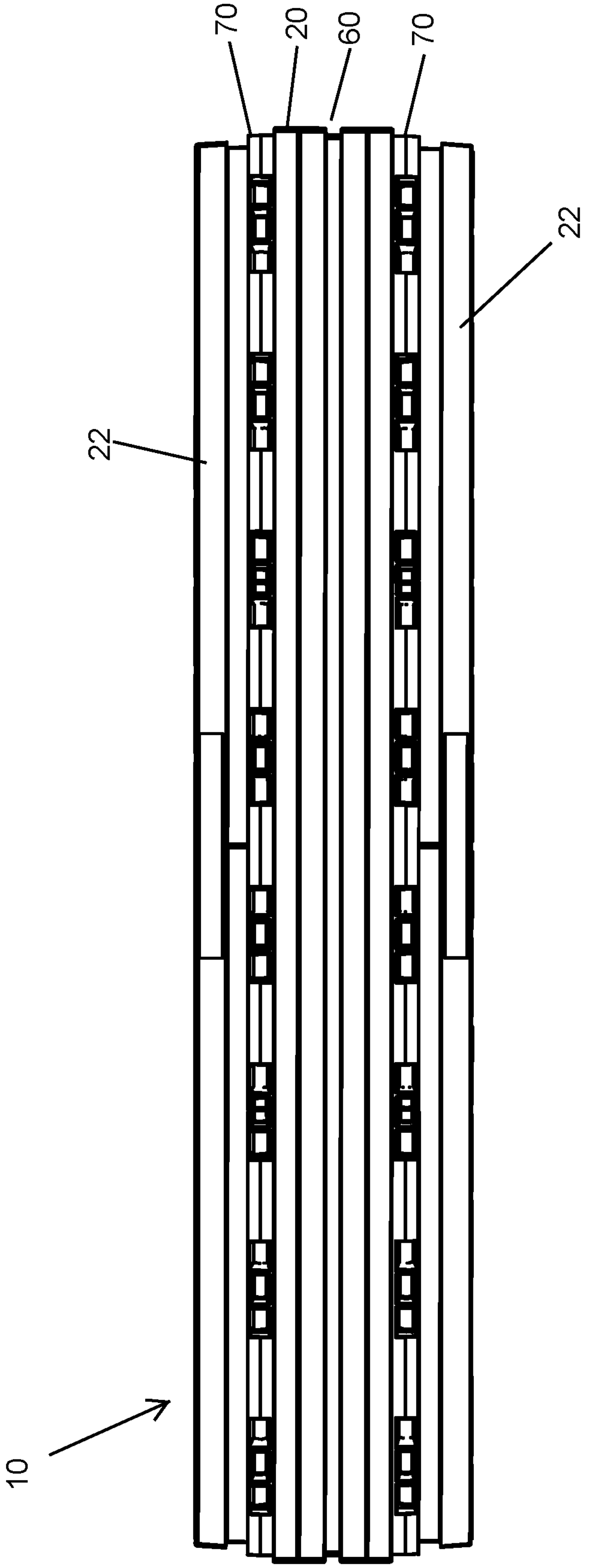
FIG. 13 is an elevation view of a top side of the mobile project center system shown in FIG. 8.
Figure 14:
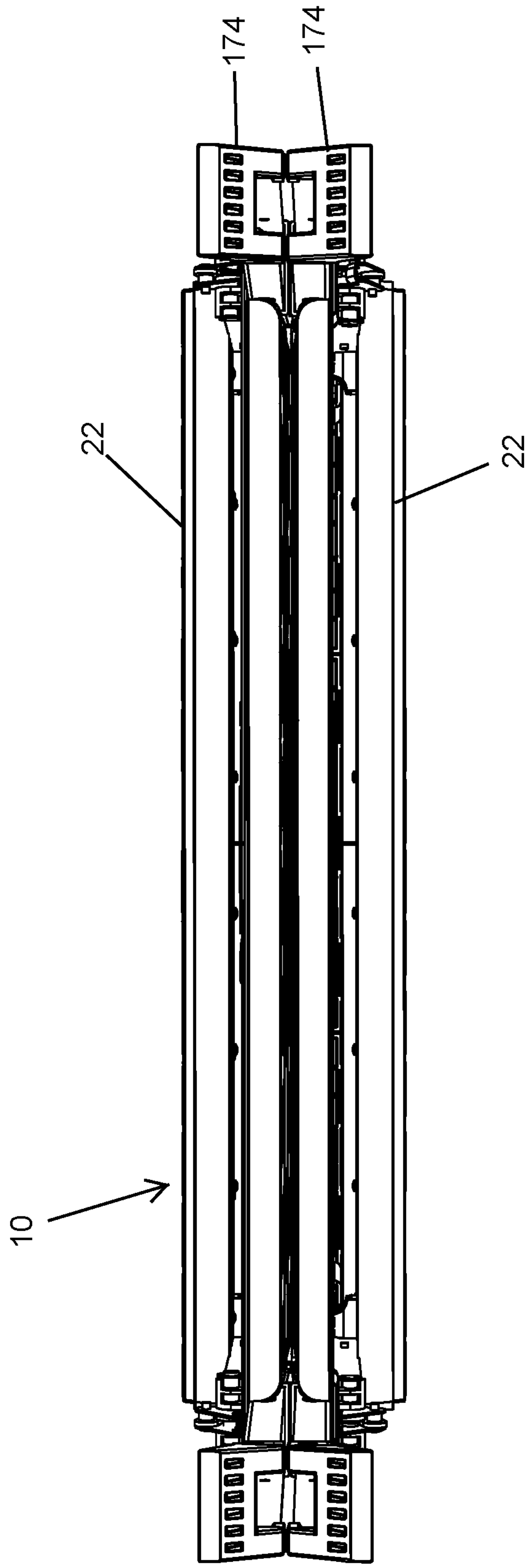
FIG. 14 is an elevation view of a bottom side of the mobile project center system shown in FIG. 8.
Figure 15:
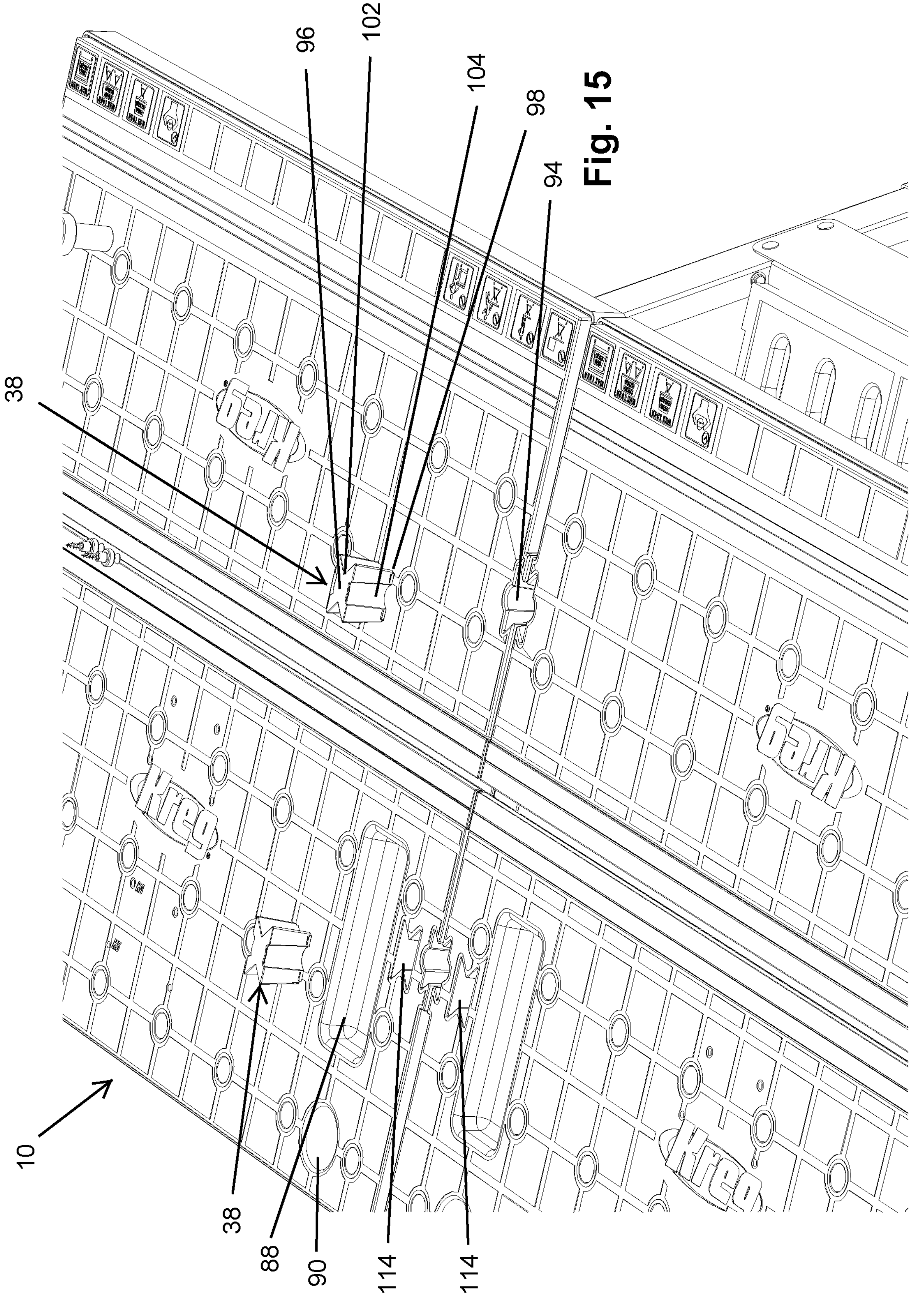
FIG. 15 is a close up perspective view of a pair of mobile project centers in a fully extended position; the view showing the two mobile project centers aligned in end-to-end alignment with the recesses in the ends of the benchtops aligned; the view showing a connection key about to be inserted into the two aligned recesses of adjacent benchtops that will join the two mobile project centers together in locking engagement.
Figure 16:
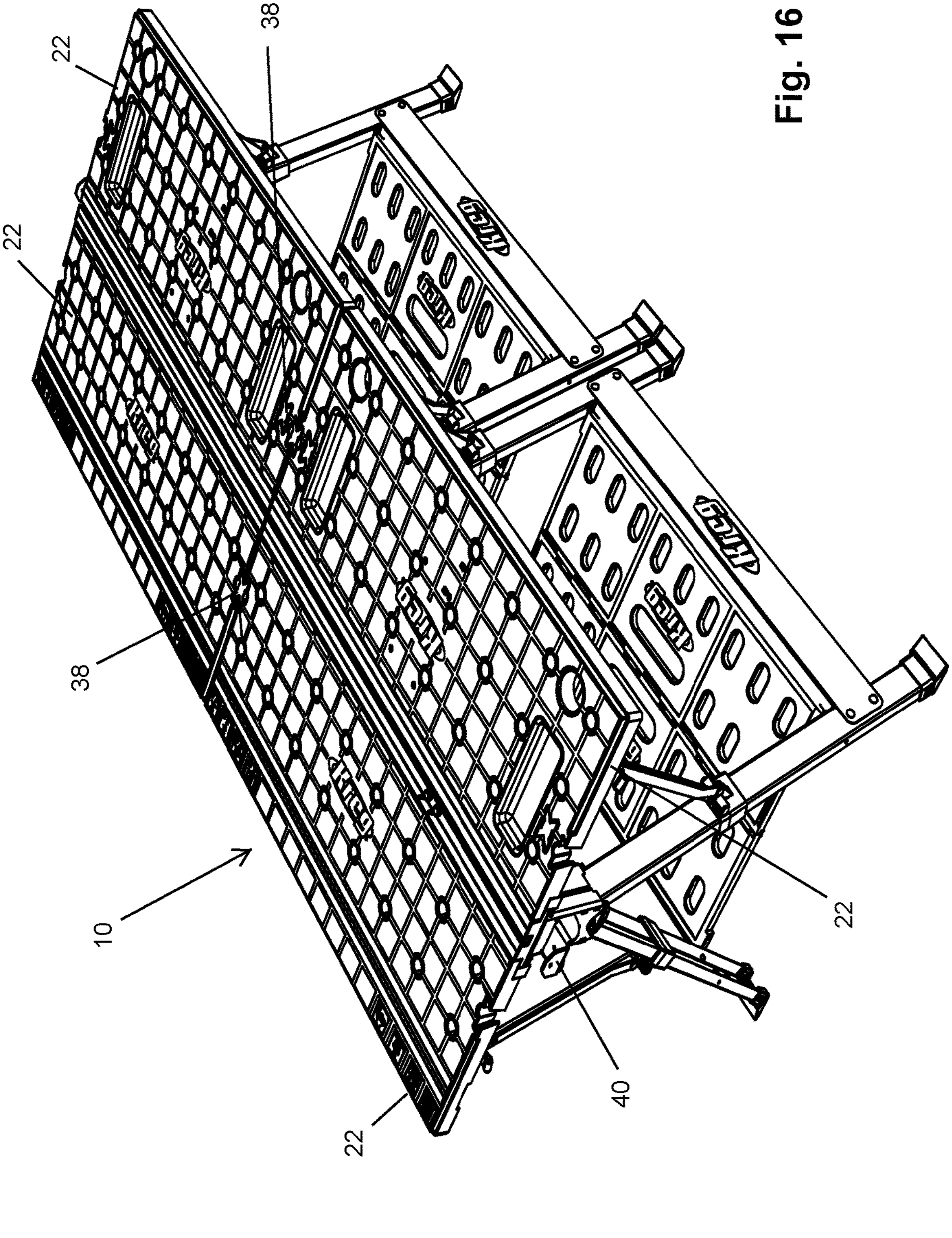
FIG. 16 is a perspective view of a pair of mobile project centers in a fully extended position; the view showing the two mobile project centers connected in end-to-end alignment using connection keys inserted into aligned recesses of adjacent benchtops that join the two mobile project centers together in locking engagement.
Figure 17:
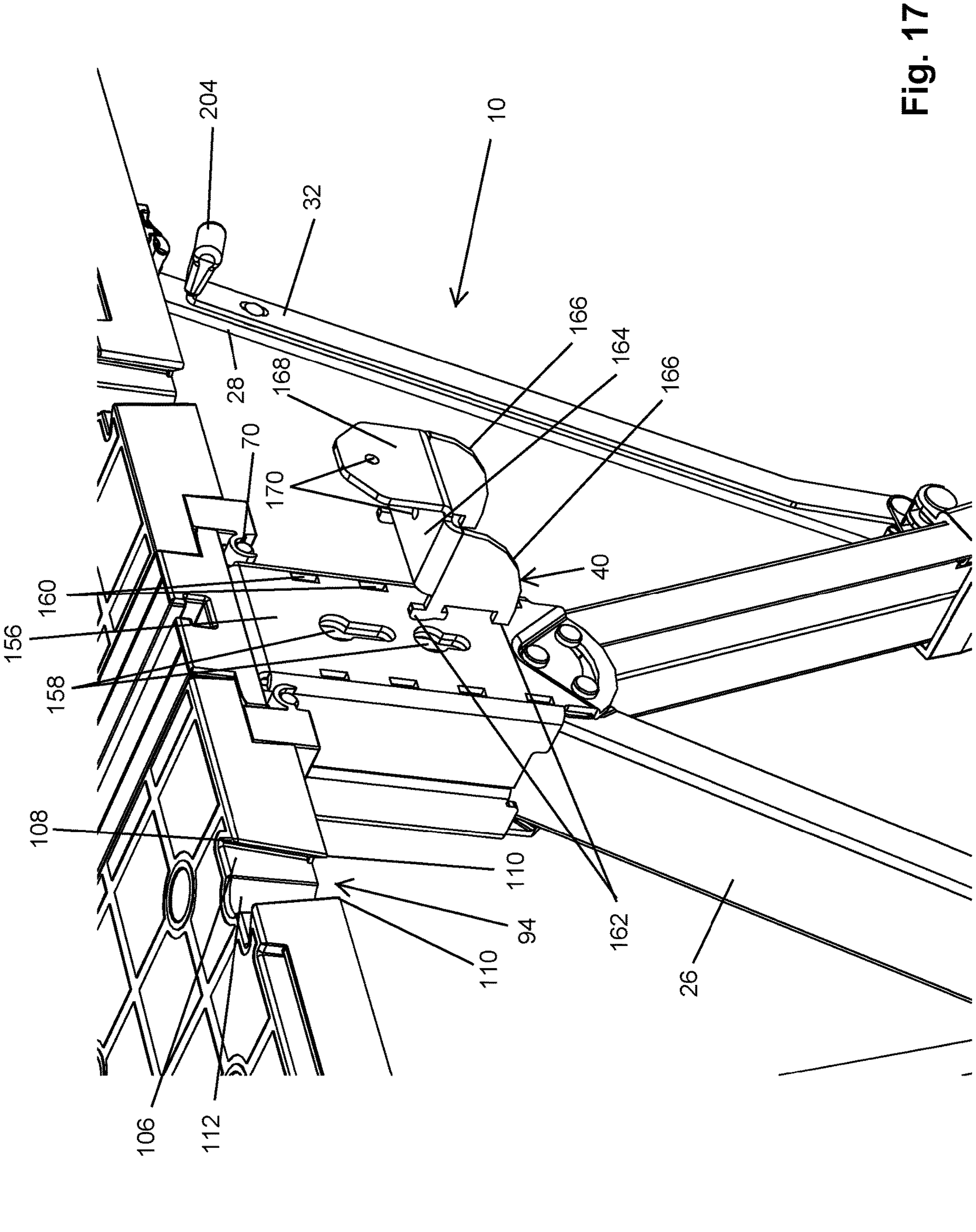
FIG. 17 is a close-up perspective view of an end of a mobile project center system; the view showing the exterior surface of a center support having mounting members therein, which include slots that are configured to receive a support bracket therein and key holes that are configured to receive a bench clamp therein; the view showing a support bracket about to be inserted within the slots in the center support; the view also showing a the recesses in the benchtop; the view also showing the brace, brace lock and brace control that extends between a leg and a benchtop.

In the following detailed description, reference is made to the accompanying drawings which form a part hereof, and in which is shown by way of illustration specific embodiments in which the disclosure may be practiced. These embodiments are described in sufficient detail to enable those skilled in the art to practice the disclosure, and it is to be understood that other embodiments may be utilized and that mechanical, procedural, and other changes may be made without departing from the spirit and scope of the disclosure. The following detailed description is, therefore, not to be taken in a limiting sense, and the scope of the disclosure is defined only by the appended claims, along with the full scope of equivalents to which such claims are entitled.

As used herein, the terminology such as vertical, horizontal, top, bottom, front, back, end, sides, left, right, and the like are referenced according to the views, pieces, parts, components and figures presented. It should be understood, however, that the terms are used only for purposes of description, and are not intended to be used as limitations. Accordingly, orientation of an object or a combination of objects may change without departing from the scope of the disclosure.

With reference to the figures, a mobile project center workbench system 10 (system 10) is presented. The mobile project center workbench system 10 is formed of any suitable size, shape and design and is configured to serve as a portable work surface that provides a plurality of functionalities. In the arrangement shown, as one example, the mobile project center workbench system 10 has a top side 12, a bottom side 14, opposing ends 16 and opposing sides 18. The mobile project center workbench system 10 includes the component parts of a center track 20, benchtops 22, center supports 24, legs 26, braces 28 having brace locks 30 and brace controls 32, cross supports 34, shelf 36, connection keys 38, support brackets 40, bench clamp 42, project clamp 44, small container 46, and medium container 48 and a joinery block 50, among other components.

Center Track:

Center track 20 is formed of any suitable size, shape and design and is configured to slidably receive bench clamp 42 therein while connecting to and providing support for benchtops 22 and center supports 24. In one arrangement, center supports 24 and track 20 are considered a single component and is referred to collectively as “center support,” in another arrangement, when specified, center supports 24 and center track 20 are separate components.

In the arrangement shown, as one example, center track 20 is an elongated generally rectangular member that extends from end 16 to end 16 of system 10. When viewed from the side, center track 20 includes a slot 60 that extends continuously from end 16 to end 16 of center track 20. In the arrangement shown, slot 60 is positioned in the approximate middle of center track 20, however any other position is hereby contemplated. Slot 60 is configured to slidably receive the anchor 62 connected to block 64 of bench clamp 42 and allows slidable positioning of bench clamp 42 at any position along center track 20 while facilitating clamping with bench clamp 42. In the arrangement shown, as one example, anchor 62 may be formed of a screw with a shaft that extends through the slot 60 and a head that is captured by the slot 60, however any other configuration is hereby contemplated for use. In one arrangement, as is shown, slot 60 is a T-slot, however any other configuration of a slot is hereby contemplated for use.

In the arrangement shown, as one example, center track 20 includes a generally flat or planar upper surface 66. When benchtops 22 are in a raised and locked position, the upper surface 66 of center track 20 is in a generally flat, flush and planar alignment with the flat or planar upper surface 68 of benchtops 22.

In the arrangement shown, each outward side of center track 20 connects at its lower outward edge to a benchtop 22 at a hinge 70. Hinge 70 facilitates the rotation of benchtop 22 with respect to center track 20 between a retracted position (or storage position) wherein the upper surface 68 of benchtop 22 is positioned at approximately a perpendicular alignment to the upper surface 66 of center track 20, and an extended position (or work position) wherein the upper surface 68 of benchtop 22 is positioned at approximately a parallel or planar alignment to the upper surface 66 of center track 20.

In the arrangement shown, the outward sides of center track 20 include a step 72. Step 72 provides a recess or feature or surface that facilitates engagement between the outward side of center track 20 and the inward edge 74 of benchtop 22. This step 72 also facilitates the support of sheet of material 300 to form an extended work surface between two mobile project center systems 10, as is further described herein.

In one arrangement, to provide maximum durability, longevity and rigidity, center track 20 is formed of a metallic material, such as aluminum or an aluminum alloy, or the like, while benchtops 22 are formed of a plastic material. However, any other materials are hereby contemplated for use with center track 20 and benchtops 22. In one arrangement, center track 20 is formed of an extruded metallic material.

Benchtop:

Benchtop 22 is formed of any suitable size, shape and design and is configured to move between a retracted position, for storage and transport, and an extended position where the benchtop 22 provides a work surface for various operations, as is described herein. In the arrangement shown, as one example, a pair of benchtops 22 connect at their inward edge 74 to center track 20 at hinges 70. The inward edge 74 of benchtops 22 include a step 76 that facilitates connection to the step 72 of center track 20 such that when the benchtop 22 is in an extended and locked position, the step 76 of the inward edge 74 of benchtop 22 is in mating engagement with the step 72 in the exterior edge of center track 20. This mating engagement between step 72 and step 76 provides added strength, rigidly and alignment to the connection between benchtop 22 and center track 20.

Benchtop 22 extends from inward edge 74 to outward edge 78. Benchtop 22 extends between end edges 80. Benchtop 22 extends vertically between an upper surface 68 and a lower surface 82. The upper surface 68 of benchtop 22 provides a generally flat and planar work surface. With that said, the upper surface 68 includes a plurality of features that do not detract from the objective of providing a flat and planar work surface.

Bench Dog Openings:

In one arrangement, the upper surface 68 of benchtop 22 includes a plurality of openings 84 therein that are positioned in a grid pattern. In this grid, openings 84 are approximately equally spaced to one another and are positioned in an approximate square or rectangular pattern. Any spacing is hereby contemplated for use, such as center-tocenter spacing of one inch, two inches, three inches, four inches, five inches, six inches, or more or any distance there between or any other distance. As one example, in the arrangement shown, eight openings 84 extend across benchtop 22 in equal spacing from end edge 80 to end edge 80. Similarly, as one example, in the arrangement shown, two or three openings extend between the inward edge 74 to the outward edge 78. This grid pattern of holes or openings is known as a bench dog grid of holes. This grid pattern of openings 84 allows the insertion of various accessories into these openings that provide alignment and/or spacing without the need to measure or otherwise align components. That is, when a joinery block 50 or other stop member is used with the bench dog grid of openings 84 parallel and perpendicular alignment of workpiece 148 or workpieces 148 is easily facilitated.

The spacing of openings 84 continues from one benchtop 22 across center track 20 to the other benchtop 22. Also, when two mobile project center systems 10 are joined together by way connection keys 38, as is further described herein, the spacing of openings 84 continues across to the two systems 10.

Grid Pattern:

In the arrangement shown, the upper surface 68 also includes a grid pattern 86. This grid pattern 86 is formed of any suitable size, shape and design. In the arrangement shown, grid pattern 86 is a generally square pattern of lines that centers on the center of openings 84. Grid pattern 86 provides the user with a quick and accurate visual indication of straight as well as perpendicular lines. Like the spacing of openings 84, the grid pattern 86 continues from one benchtop 22 across center track 20 to the other benchtop 22. Also, when two systems 10 are connected together by way connection keys 38, as is further described herein, the grid pattern 86 continues across to the two systems 10. In the arrangement shown, as one example, the density of the lines of the grid pattern 86 is twice as dense as the spacing between openings 84. That is, as an example, when the spacing between openings 84 is four inches, the spacing between lines of the grid pattern 86 is two inches which results in four squares being defined by lines of the grid pattern 86 within four openings 84. However any other density of lines of the grid pattern 86 is hereby contemplated for use.

Tray:

In one arrangement, the upper surface 68 of one of the benchtops 22 includes at least one tray 88 therein. Tray 88 is formed of any suitable size, shape and design and is configured to provide a compartment that is recessed from the upper surface 68 of benchtop 22 to hold parts, pieces and components such as screws, bolts, nuts, drill bits, drivers, or any other component. In this way, tray 88 provides a convenient place to hold parts while preventing them from being lost or from interfering with the flat work surface of benchtop 22

In the arrangement shown, tray 88 is a generally square or rectangular shaped component that is recessed a distance below the upper surface 68 of benchtop 22. In this arrangement, a tray 88 is positioned adjacent each end edge 80 with an interior edge near the center track 20. Tray 88 is positioned between openings 84 and therefore does not interrupt the pattern of openings 84.

Drill Holsters:

In one arrangement, the upper surface 68 of one, or both, of the benchtops 22 includes at least one drill holster 90 therein. Drill holster 90 is formed of any suitable size, shape and design and is configured to provide a convenient place to insert the forward end of a conventional drill 91 or driver or other device. Once the forward end of the drill 91 is inserted within the drill holster 90 the drill 91 is held in a convenient place out of the way of other operations performed on the benchtop 22.

In the arrangement shown, drill holster 90 is a generally circular opening in the benchtop 22 that is large enough to receive and hold the forward end of a drill 91 therein. In this arrangement, a drill holster 90 is positioned adjacent each end edge 80 between the outward end of tray 88 and before the outward edge 78 of benchtop 22. Drill holster 90 is positioned between openings 84 and therefore does not interrupt the pattern of openings 84.

Alignment Holes:

In one arrangement, the upper surface 68 of one of the benchtops 22 includes alignment holes 92 therein. Alignment holes 92 are formed of any suitable size, shape and design and is configured to provide pre-formed holes in benchtop 22 that are sized and shaped to fit various jigs 93 on the market such as Applicant, Kreg Tools Company's K4 Pocket Hole Drilling Jig, K5 Pocket Hole Drilling Jig, or the like, in a convenient place for use. The formation of these alignment holes 92 in benchtop 22 provides for improved accuracy of alignment, makes it easier to mount a jig 93 to the benchtop 22 and ensures that features of the jig 93 align with the grid pattern 86 and openings 84.

Connection Key:

In one arrangement, the upper surface 68 of one of the benchtops 22 includes at least one connection key 38 therein. Connection key 38 is formed of any suitable size, shape and design and is configured to facilitate connection of a pair of workbench systems 10 together in end-to-end alignment with one another. To facilitate this connection, in one arrangement, benchtop 22 includes one or more recesses 94 therein that are configured to receive a portion of, or in one arrangement, approximately half of a connection key 38, such that when two workbench systems 10 are positioned in end-do-end alignment and the recesses 94 are aligned with one another, a connection key 38 is inserted in the recesses 94 of both benchtops 22 thereby connecting the two systems 10. When two systems 10 are connected together by way connection keys 38, as is further described herein, the spacing and alignment of openings 84 and grid pattern 86 continues across to the two systems 10 in an uninterrupted manner.

In the arrangement shown, as one example, connection key 38 has a generally flat upper surface 96 which extends in approximate parallel spaced alignment to a generally flat lower surface 98. When viewed from above or below, connection key 38 has a general or approximate X-shape to it with generally flat opposing sides 100 that angle slightly inward as they extend from the upper surface 96 to the lower surface 98 of connection key 38, however any other shape is hereby contemplated for use. Connection key 38 includes a narrower waist 102 that is positioned at its approximate middle between opposing sides 100. Each side of the X-shaped member is essentially a tail cut section of a dovetail joint. Connection key 38 also includes reliefs 104 positioned in approximately the middle of opposing sides 100. These reliefs 104 are generally semi-circular in shape, when viewed from above or below, and are covered partially at their upper end by a portion of a flange. These reliefs 104 and the corresponding flange facilitate removal of the connection key 38 when inserted within benchtop 22. That is, a user can insert their finger or a tool into relief 104 and pry upward against the flange to lift the connection key 38 out of benchtop 22.

Recesses 94 formed in an edge of benchtop 22 receive approximately half of connection keys 38. In this arrangement, when viewed from above, recesses 94 are formed to receive approximately half of the X-shaped member of connection key 38. In this way, recesses 94 serve as the socket of a dovetail joint that receive the tail cut section (which is approximately half of connection key 38). More specifically, recess 94 includes a center wall 106 that connects at its outward edges to end walls 108. End walls 108 come to a point 110 that intersects with the edges of benchtop 22, which in the arrangement shown is end edge 80. End walls 108 extend slightly inward toward one another as they extend from upper surface 68 to the lower edge of recess 94, which terminates a distance above the lower surface 82 of benchtop 22. Center wall 106 extends at a slight outward angle as it extends from upper surface 68 to the lower edge of recess 94. In this way, recess 94 is configured to mimic the size and shape of connection key 38 and provides a socket that lockingly receives a portion of, or approximately half of, connection key 38.

Like the sides 100 of connection key 38, the center wall 106 of recess 94 includes a relief 112 that, when viewed from above, is generally semicircular in shape. In this way, relief 112 is similarly sized and shaped to the relief 104 of connection key 38. When connection key 38 is positioned within recess 94, the relief 104 of connection key 38 aligns with the relief 112 of recess 94 thereby providing room for a user to insert their finger or a tool so as to easily lift the connection key 38 out of recess 94.

As the size of recess 94 and connection key 38 narrow slightly as they extend downward, when a connection key 38 is inserted into two adjacent recesses 94, this has the result of pulling the two benchtops 22 toward one another. This has the effect of providing a strong frictional connection between the two benchtops 22.

In the arrangement shown, two connection keys 38 are held within connection key holders 114 in one of the benchtops 22 between the end edge 80 and the tray 88, however any other location is hereby contemplated. In this way, recesses 94 are essentially one half of or a portion of connection key holders 114. Connection key holders 114 are openings in benchtop 22 that are sized and shaped to receive and hold connection keys 38 therein. When in the storage position within connection key holders 114, the upper surface 96 of connection key 38 is in a generally flat and flush alignment with the upper surface 68 of benchtop 22. Similarly, when connection key 38 is inserted in the recess 94 of two adjacent benchtops 22, the upper surface 96 of connection key 38 is in a generally flat and flush alignment with the upper surface 68 of both benchtops 22. In the arrangement shown, a recess is positioned in each end edge 80 of benchtop 22 thereby facilitating connection of another benchtop 22 to either end.

Use of Dovetail Recess to Connect Accessories:

While recess 94 is shown and described herein as being used to attach two adjacent benchtops 22 using connection keys 38, it is hereby contemplated that recesses 94 can be used to connect any accessory or other device in a similar fashion. As one example, a drill, hammer, nail gun, power cord, air hose or other tool or device having a connector that mates with recess 94 (such as essentially one half of a connection key 38) attached thereto can be quickly and easily connected to recess 94 by inserting this connector into the recess 94. This places the tool or device at a convenient location and avoids the necessity of placing the tool or device on the upper surface 68 of benchtop 22 thereby saving precious workspace. When the user wants to use the tool or device, the user simply lifts the tool or device upward thereby lifting the connector out of the recess 94.

Step and Recess in Edge of Benchtop:

In one arrangement, as is shown, all or a portion of the exterior peripheral edge of benchtop 22 includes a step 116 with a recess 118. Step 116 and recess 118 are formed of any suitable size, shape and design and are configured to receive and hold the lip 128 and flange 130 of a container 46/48 as is further described herein.

In the arrangement shown, as one example, the exterior peripheral edge (which may be outward edge 78 and/or end edge 80) of benchtop 22 includes a step 116 that steps down a distance from the upper surface 68 of benchtop 22 at its edge 78/80. Step 116 includes and exterior surface 120 and an upper surface 122. Recess 118 is positioned at the intersection of and/or between the exterior surface 120 and the upper surface 122 of the edge 78/80 of benchtop 22. Exterior surface 120 extends downward from the upper surface 68 of benchtop 22 either in vertical fashion or at a slight outward angle when viewed from the side. Upper surface 122 extends in approximate parallel spaced alignment to the upper surface 68 of benchtop 22, albeit at a distance below upper surface 68. Recess 118 is positioned at the approximate intersection of the exterior surface 120 and upper surface 122 of step 116 and, when viewed from the side, forms an unobstructed groove or channel that extends the whole length or a portion of the length of the edge 78/80 of benchtop 22.

The outward side edge of upper surface 122 connects to the upper exterior surface of edge 78/80. The exterior surface of edge 78/80 extends downward from the upper surface 122 downward before terminating at the lower surface 82 of benchtop 22. In one arrangement, the exterior surface of edge 78/80 extends downward in vertical fashion. In another arrangement, the exterior surface of edge 78/80 extends at a slight outward angle. This slight outward angle approximately matches the angle of a sidewall 124 or end wall 126 of container 46/48 extend outward as they extend upward, as is further described herein. Similarly, the upper surface 122 extends outward approximately the distance lip 128 of container 46/48 extends outward, as is further described herein. Similarly, the recess 118 in step 116 is configured to receive the flange 130 of container 46/48, as is further described herein.

In the arrangement shown, as one example, the step 116 and recess 118 begin just outside of one recess 94 in end edge 80 and extends all the way around the peripheral edge of benchtop 22 in a continuous and uninterrupted manner before terminating just outside of the other, or opposing, recess 94 in the opposing end edge 80.

Slot in Bottom of Work Surface:

A slot 132 is positioned in the lower surface 82 of benchtop 22. Slot 132 is formed of any suitable size, shape and design and is configured to receive the clamp pad 134 of the lower clamp arm 136 of a project clamp 44 and hold the project clamp 44 to the benchtop 22 while allowing the project clamp 44 to slide along an edge of the benchtop 22.

Project clamps 44 are old and well known in the art and generally include a lower clamp arm 136 having a clamp pad 134 and an opposing upper clamp arm 138 having an upper clamp pad 140. Project clamps 44 also include a lower handle 142 and an upper handle 144 and a clamping mechanism 146 that facilitate clamping of the upper clamp arm 138 and lower clamp arm 136, however any other configuration is hereby contemplated for use. Conventionally, a workpiece 148 is placed on the upper surface 68 of a work surface and the project clamp 44 is clamped in place holding the workpiece 148 to the work surface. While this is effective, when the project clamp 44 is released there is nothing in place to hold the project clamp 44 to the work surface. This means that the project clamp 44 must be completely removed and reinstalled between each use. In this arrangement, often times the project clamp 44 falls to the ground after the clamping mechanism 146 is released. This is inconvenient, cumbersome and time consuming. This also leads to inaccuracy as the project clamp 44 may be placed on any portion of the benchtop 22 and there is no mechanism to consistently align the project clamp 22 between uses.

To solve these problems, slot 132 is positioned in the lower surface 82 of a benchtop 22. When viewed from the side, slot 132 has a general T-shape and is configured to receive the lower clamp pad 134 of lower clamp arm 136 of project clamp 44 therein. In the arrangement shown, slot 132 is positioned a distance inward from the outward edge 78 of one of the benchtops 22, however any other position is hereby contemplated for use. In this position, slot 132 extends from end 16 to end 16 in an uninterrupted manner thereby allowing project clamp 44 to slide to any position along the outward edge 78 of benchtop 22, however it is also contemplates that slot 132 only extends a portion of the benchtop 22.

When lower clamp pad 134 is in place within slot 132, the upper clamp arm 138 reaches around the outward edge 78 of benchtop 22 and positions the upper clamp pad 140 above the upper surface 68 of benchtop 22. The slot 132 holds the project clamp 44 in this position and ready for use while allowing for sliding lateral movement as well as some rotation within slot 132. This eliminates the need to replace and reposition the project clamp 44 between uses, and prevents the project clamp 44 from falling to the floor when the clamping mechanism 146 is released, which provide substantial time savings, which improves safety of using the system 10 and improves accuracy. When upper handle 144 and lower handle 142 and clamping mechanism 146 are activated, the upper clamp pad 140 engages the upper surface of workpiece 148 forcing the workpiece 148 into the upper surface 68 of benchtop 22 while the lower clamp pad 134 exerts a matching force against the lower surface 82 of benchtop 22. In this way, the project clamp 44 provides a clamping force that is perpendicular to the upper surface 68 of benchtop 22.

In one arrangement, slot 132 is formed of a generally square or rectangular recess in the lower surface 82 of benchtop 22 when viewed from the side. A flange 150 is positioned along the edges of the recess that extends inward a distance over the recess. The addition of flanges 150 to the recess in the lower surface 82 of benchtop 22 form a lip or the T-shaped slot out of the square or rectangular recess. In one arrangement, while the benchtop 22 is formed of a plastic material, to provide maximum durability and strength, flanges 150 are formed of a metallic material and are added to the lower surface 82 of benchtop 22 by a plurality of fasteners 152. This arrangement facilitates molding of the benchtops 22 while the flanges 150 are separate components that are added in a later assembly step. In an alternative arrangement, slot 132 is formed within the benchtop 22 and out of the material of benchtop 22 as a single and unitary piece with benchtop 22. While one slot 132 is shown in the lower surface 82 of benchtop 22, any number of slots 132 are hereby contemplated for use such as two, three, four, five, six or more. Also, while slot 132 is shown extending in parallel spaced relation to the slot 60 of track 20 any other orientation of the two slots 60, 132 is hereby contemplated for use such as perpendicular or at any other angle.

In one arrangement, to provide a visual indication of the position of slot 132, and therefore the position of lower clamp pad 134, indicia 154 is positioned in the upper surface 68 of benchtop 22 and show the position of slot 132. In the arrangement shown, indicia 154 appears as a plurality of lines that extend from end 16 to end 16 across a benchtop 22.

Center Support:

Center support 24 is formed of any suitable size, shape and design and is configured to connect at its upper end to the lower end of center track 20 and at its lower end to legs 26. In one arrangement, center support 24 and center track 20 are considered a single component, in other arrangements center support 24 and center track 20 are considered separate components. Center support 24 also serves to provide a connecting surface for support brackets 40 and a bench clamp 42, as is further described herein. In the arrangement shown, as one example, center support 24 has a generally flat and square upper end that connects to the lower outward end of center track 20. Center support 24 has a generally rounded lower end that pivotally connects to legs 26.

Center support 24 has a generally flat exterior surface 156 or side that includes a plurality of key holes 158 (also known as mounting members) that facilitate connection to an anchor 62 of a bench clamp 42. In the arrangement shown, a pair of key holes 158 are positioned in vertical alignment with one another in approximately the middle of center support 24. Vertically stacking key holes 158 allows for vertical adjustability of the position of bench clamp 42. In the arrangement shown, as one example, key holes 158 include a round opening connected to a smaller slot. The round opening is configured to allow passage of the head of anchor 62 there through thereby allowing the insertion of the head of anchor 62 through the opening. The slot is configured to receive the shaft of anchor 62 while retaining the head of anchor 62 thereby preventing the anchor 62 from pulling out of center support 24 when pressure is applied by the bench clamp 42. In the arrangement shown, the round opening is positioned above the slot, however any other arrangement is hereby contemplated for use such as inverted, to the side or any other angle. Also, in the arrangement shown, the slot of the upper key hole 158 is longer than the slot of the lower key hole 158 to provide increased vertical adjustability. In another arrangement, key holes 158 are replaced with any other form of a mounting member, such as a slot or the like.

The generally flat exterior surface 156 of center support 24 also includes a plurality of slots 160, (which may also be referred to as a mounting member or mounting members) that facilitate connection to tabs 162 of a support bracket 40. In the arrangement shown, as one example, slots 160 are positioned in vertical alignment with one another along the outward edges of center support 24. In the arrangement shown, slots 160 are generally rectangular in shape, and four slots are positioned in spaced alignment with one another vertically along the exterior surface 156. This vertical spacing allows the selection of the vertical height of support bracket 40.

Support Bracket:

Support brackets 40 are formed of any suitable size, shape and design and are configured to connect to center supports 24 and hold a workpiece 148 or other board or piece of material therein. In the arrangement shown, as one example, support bracket 40 includes an upper wall 164 that extends in approximate parallel spaced alignment to the upper surface 68 of benchtops 22 when support bracket 40 is installed on center support 24. Lower walls 166 connect to the outward edges of upper wall 164 and extend downward in approximate perpendicular alignment therefrom in approximate parallel spaced relation to one another. The inward edges of lower walls 166 include an upper tab 162 and a lower tab 162 that are received within slots 160 of center support 24. In the arrangement shown, the upper tab 162 includes an extension or protrusion that extends upward at the end of the upper tab 162. This upward extension or protrusion is inserted into the slot 160 first, at an angle, and then once this extension or protrusion is through the slot 160 the support bracket 40 is rotated until the lower tabs 162 are received in a lower slot 160. Through the connection of upper tabs 162 and lower tabs 162 with slots 160, support bracket 40 is held in place onto center support 24.

Support bracket 40 also includes an outward wall 168. Outward wall 168 is connected to the outward edge of upper wall 164 and extends upward therefrom in approximate perpendicular alignment to the upper surface of upper wall 164. When support bracket 40 is installed on center support 24, a channel is formed between the exterior surface 156 of center support 24 and the upper surface of upper wall 164 and the inward surface of outward wall 168.

In use, a workpiece 148 is installed into this channel and clamped into place with a bench clamp 42 connected to the center support 24 by way of keyhole 158. Alternatively, an elongated board, such as a 2×4 is placed in this channel and is used to connect two systems 10 together as is further described herein. The upper wall 164 and outward wall 168 include openings 170 therein that facilitate the passage of a fastener, such as a screw or bolt, there through so as to rigidly connect the board or workpiece 148 placed within the channel formed by support bracket 40 and center support 24.

In this way, support bracket 40 provides a simple, quick and easy manner of attachment to center support 24. In addition, support bracket 40 provides an easy and adjustable way of connecting or holding a board or workpiece 148 along the side of benchtops 22. The height of support bracket 40 can be easily adjusted by selecting the appropriate set of slots 160.

Legs:

Legs 26 are formed of any suitable size, shape and design and are configured to provide support for benchtops 22. In the arrangement shown, as one example, system 10 includes four legs 26 with two legs pivotally connected to each center support 24. In a retracted position or storage position the legs 26 are positioned in a generally flat and flush alignment with one another, whereas in an extended position, legs 26 are positioned at an angle to one another thereby providing a wide base for support.

Legs 26 extend from a lower end 171 to an upper end 172. Lower end 171 of legs 26 include a foot 174 that extends the surface area of leg 26 and helps to prevent marring the floor. The upper end 172 of legs 26 pivotally connect to the lower end of center support 24. In the arrangement shown, as one example, legs 26 have a generally C-shaped or U-shaped configuration with a center wall 176 connected at its outward edges to end walls 178.

Cross Support:

Cross support 34 is formed of any suitable size, shape and design and is configured to connect opposing legs 26 on either end 16 of system 10 such that the two legs 26 on opposing ends 16 of the system 10 open and close together. In the arrangement shown, cross support 34 is formed of an elongated member that connects at its outward edges to opposing legs 26. In the arrangement shown, cross support 34 includes a generally planar exterior wall 180 that extends in approximate parallel spaced relation with the exterior surface of the center wall 176 of legs 26. Cross support 34 includes an inwardly extending flange 182 that is connected to the upper end of exterior wall 180 of cross support 34 and extends inward therefrom a distance along the inside surface of inward end walls 178 of legs 26. This flange 182 and cross support 34 also provides support for shelf 36 when legs 26 are in the extended position.

Shelf:

A shelf 36 is connected to the lower end of legs 26 just above cross support 26. Shelf 36 is formed of any suitable size, shape and design and is configured to provide a generally flat and level shelf area for the storage of parts and pieces when the system 10 is in use. In the arrangement shown, as one example, shelf 36 is formed of a pair of shelf members 184 that are generally flat and planar and square or rectangular in shape. Shelf members 184 connect at their outward edges to hinges 186 that pivotally connect to the inward end wall 178 of opposing legs 26. Opposing shelf members 184 connect to one another at their inward edge at a center hinge 188.

In a retracted position, opposing shelf members 184 fold in a generally flat arrangement or an almost flat arrangement. In an extended position, opposing shelf members 184 lay in an approximately flat arrangement. In the extended position, the outward edge of shelf members 184 engages, lays upon or is supported by the inwardly extending flange 182 of cross support 34.

Shelf members 184 include a handle opening 190 therein. Handle opening 190 is approximately centered within the shelf member 184 and is positioned slightly toward center hinge 188. When shelf members 184 are in a retracted position or a folded position, the handle openings 190 are positioned in overlapping condition with one another and thereby provide an opening through both shelf members that can be easily grasped during transport and thereby facilitates easy transport of the system 10. In the arrangement shown, handle opening 190 is an elongated slot with rounded ends that is sized and shaped to fit a user's hand.

Brace, Brace Locks, Brace Control:

System 10 includes a brace 28, brace lock 30 and brace control 32. Brace 28, brace lock 30 and brace control 32 are formed of any suitable size, shape and design and are configured to provide support to benchtops 22 and hold benchtops 22 in an extended position while also facilitating easy and comfortable folding of benchtop 22. In the arrangement shown, braces 28 are generally elongated members that extend from an upper end to a lower end. Braces 28 pivotally connect at their upper ends to the lower surface 82 of benchtop 22 at hinge 192 that facilitates rotation of brace 28 upon benchtop 22. Braces 28 pivotally connect at their lower ends to hinge 194 that connect brace 28 to leg 26 by collar 196. Hinge 194 connects to collar 196. Collar 196 that facilities sliding of the lower end of brace 28 along leg 26, while hinge 194 facilitates rotation of brace 28 upon collar 196 as collar 196 slides along leg 26.

In one arrangement, as is shown, collar 196 fits around leg 26 and slides up and down along a length of leg 26. Collar 196 connects to the lower end of brace 28 at hinge 194 that facilitates pivoting of brace 28 on collar 196. In the arrangement shown, collar 196 is a generally rectangular member that has a hollow interior that is sized and shaped to receive leg 26 therein within relatively close tolerances. This arrangement provides easy and smooth sliding without binding.

In the arrangement shown, brace lock 30 includes a pin that fits within an opening 198 in leg 26 when in a locked position. To facilitate this locking, brace lock 30 includes a lever 200 that is under a spring loaded bias that applies an inward force urging the pin toward the leg 26 such that when collar 196 slides over opening 198 in leg 26 the pin of brace lock 30 is urged into the opening 198 thereby locking the collar 196 and brace 28 in place. In this locked position, benchtop 22 is in the fully extended position. To facilitate this operation, like brace 28, brace lock 30 pivotally connects to collar 196 at a hinge 202 that facilitates pivoting of brace lock 30 thereon. Hinge 202 is positioned outside of hinge 194.

In the arrangement shown, brace control 32 connects to brace 28 and brace lock 30 and facilitates operation of brace lock 30. That is, when the pin of brace lock 30 is engaged within the opening 198 in leg 26, which locks the position of brace 28 in place on leg 26, to release the brace lock 30 and facilitate folding of benchtop 22, brace control 32 is operated. In the arrangement shown, brace control 30 is a generally elongated member that connects at its lower end to brace lock 30 and terminates at its upper end in a handle 204 that is positioned just below the lower surface 82 of benchtop 22, when benchtop 22 is in a fully extended position. Between its lower end and upper end brace control 32 extends along the side of brace 28. In the arrangement shown, brace control 32, like brace 28 is a generally elongated bar-like member that is bent outward at its upper end to form handle 204 that is easily grasped by a user. Handle 204 extends outward from the sides of brace 28. This positioning allows a user to easily grasp the sides of benchtop 22 while engaging the brace control 32. To release the brace lock 30, the user lifts up on the benchtop 22 slightly to relieve the pressure on the pin of brace lock 30 while simultaneously pulling upward on the handle 204 (on both sides of benchtop 22). Pulling the handle 204 pulls the elongated member of brace control 32 upward (with respect to brace 28) which causes brace lock 30 to pivot on hinge 202 which causes the pin of brace lock 30 to be moved against the spring-bias force as it is pulled out of opening 198 in leg 26. Once the pin is removed from opening 198 in leg 26, the benchtop 22 can be lowered.

Placing the handle 204 of brace control 32 just below the lower surface 82 of benchtop 22 eliminates the need to bend over to lower the benchtop 22 which provides convenience and ease of use. While a handle 204 is shown for use as the manner or method of moving brace control 32, any other operational device is hereby contemplated for use such as a push button, lever, cord or cable or the like. With the combination of the spring loaded pin of brace lock 30 and the conveniently located brace control 32, the brace 28, brace lock 30 and brace control 32 provide speed, efficiency and convenience when moving the benchtops 22 between an extended position and a retracted position.

Container:

System 10 includes use of a small container 46 and medium container 48 (collectively container 46/48) that is used in association with the step 116 and recess 118 in the peripheral edge of benchtop 22 to hang from the edge of benchtop 22. Small container 46 and medium container 48 are formed of any suitable size, shape and design and are configured to hold objects, such as screws, bolts, nuts, plugs or the like while also facilitating connection to the edge 78/80 of benchtop 22. In the arrangement shown, as one example, container 46/48 includes a pair of opposing sidewalls 122 that connect at corners 206 to opposing end walls 126. The lower end of sidewalls 124 and end walls 126 connect to bottom wall 208. A hollow interior is defined between the upper surface of bottom wall 208 and the inward surfaces of sidewalls 124 and end walls 126. In the arrangement shown, sidewalls 124 are slightly longer than end walls 126 and thereby container 46/48 is formed in a generally rectangular shape when viewed from above or below.

In one arrangement, as is shown, instead of sidewalls 124 directly connecting to end walls 126 at corner 206, corners 206 are formed of a panel that is positioned at approximately a 45 degree angle to the sidewalls 124 and end walls 126. This panel of corners 206 provides enough room for a smooth transition from sidewall 124 to end wall 126, especially for lips 128 and flanges 130 and provides clearance for an unobstructed channel 213.

In one arrangement, as the sidewalls 124 and end walls 126 extend upward from the bottom wall 208, sidewalls 124 and/or end walls 126 extend at a slight outward angle such that the lower end of container 46/48 is slightly narrower than the upper end of container 46/48. In one arrangement, this outward angle is identical to or approximates the outward angle of the exterior surface of edge 78/80 of benchtop 22 such that when container 46/48 is connected to edge 78/80 of benchtop 22 the exterior surface of sidewall 124 or end wall 126 is in relatively flat and flush engagement with the exterior surface of edge 78/80. This flat and flush engagement provides support to container 46/48 as well as helps to prevent rotation of container 46/48 when in position on edge 78/80 thereby providing a stronger connection.

In the arrangement shown, sidewalls 124 and/or end walls 126 include a plurality of features 210 therein. Features in sidewalls 124 and/or end walls 126 are formed of any suitable size, shape and design and serve to break up the flat sidewalls 124 and/or end walls 126 and provide structure and therefore structural rigidity to sidewalls 124 and/or end walls 126 in much the same way that corrugation provides strength to a sheet of material. In the arrangement shown, features 210 are recessed or raised panels that extend from approximately the bottom edge of sidewalls 124 and/or end walls 126 and extend upward before terminating below the upper edge of sidewalls 124 and/or end walls 126. In the arrangement shown, when features 210 are panels, the panels narrow slightly as they extend upward. Also shown are features 211 that extend outward from end walls 126 and connect at their upper end to lip 128 and flanges 130 thereby obstructing channel 213 along end walls 126. However any other shape or configuration is hereby contemplated for use.

Lip 128 is positioned at or adjacent the upper end of sidewalls 124 and/or end walls 126 and extends outward therefrom in approximate parallel spaced relation to the plane of bottom wall 208. Lip 128 extends outward from sidewalls 124 and/or end walls 126 approximately the same distance as the width of upper surface 122 of step 116. A flange 130 is connected at the outward end of lip 128 and extends a distance downward therefrom before terminating in a lower edge 212. In this arrangement, a channel 213 is defined between the inward surface 214 of flange 130 and the exterior surface of sidewalls 124 and/or end walls 126.

The lip 128 and flange of container 46/48 are configured to connect container 46/48 to the step 116 in edge 78/80 of benchtop 22. In the arrangement shown, the downwardly extending portion of flange 130 is configured to fit within recess 118 in step 116 such that when flange 130 is inserted within recess 118 the lower edge 212 is positioned deep within the recess 118 and the inward surface 214 of flange is in generally flat and flush frictional engagement with the inward facing surface of recess 118. Also, in this position, the lower surface of lip 128 between the exterior surface of sidewall 124 and/or end wall 126 and the inward surface 214 of flange 130 is in engagement with upper surface 122 of step 116. In this way, the engagement of flange 130, lip 128 and the exterior surface of sidewalls 124 and/or end walls 126 of container 46/48 with the recess 118, upper surface 122 and outward surface of exterior edge 78/80 of benchtop 22 provides a removable but locking engagement of container 46/48 to benchtop 22. This engagement allows a container 46/48 to be quickly, easily and securely hung from any portion of exterior edge 78/80 of benchtop 22 that includes step 116.

When container 46/48 is in place in step 116, the upper surface of container 46/48 is positioned just below the upper surface 68 of benchtop 22. This ensures that the container 46/48 does not interfere with sliding workpieces 148 along the upper surface 68 of benchtop 22 that may extend over the edge 78/80 of benchtop 22. As such, placing container 46/48 in this position puts container 46/48 in a convenient but out of the way place.

Container 46/48 also includes a rim 216 that extends upward from the upper end of sidewalls 124 and/or end walls 126 a distance. Rim 216 facilitates connection to cover 218 that fits and matingly engages rim 216 and closes the hollow interior of container 46/48 when in place.

Container 46/48 also includes feet 220 positioned in bottom wall 208. Feet 220 are formed of any suitable size, shape and design. In the arrangement shown, feet 220 are relatively elongated rectangular members that protrude downward out of the bottom wall 208 a short distance. In the small container 46 a single foot 220 is positioned inward a distance from each end wall 126 and extends in approximate parallel spaced alignment with end wall 126. In the medium container 48, a pair of feet 220 are positioned inward a distance from sidewalls 124 a distance and extend in approximate parallel spaced alignment with sidewalls 128 with a space between adjacent feet 220. The spacing between opposing feet 220 is approximately the same for small containers 46 and medium containers 48 such that small containers 46 can be stacked on medium containers 48, and medium containers 48 can be stacked on a pair of small containers 46, and so on.

Cover 218 includes sockets 222 that form a recess in the upper surface of cover 218. Sockets 222 are formed of any suitable size, shape and design and are configured to receive feet 220 of container 46/48 therein in a mating arrangement. In this way, the presence of sockets 222 in cover 218 and feet 220 in bottom wall 208 facilitates stacking of containers 46/48. As the feet 220 are the same size and at the same spacing from one another in both the small container 46 as well as the medium container 48, this facilitates stacking of small containers 46 with medium containers 48. Any other size, shape, design, spacing and density of feet 220 and sockets 222 are hereby contemplated for use, as are any other sized or shaped containers.

In the arrangement shown, when viewed from the side or the end, the arrangement of lip 128 and flange 130 form a continuous and straight channel 213 that is uninterrupted and continues for a portion of the length of sidewall 124 and/or end wall 126 or the entire length of sidewall 124 and/or end wall 126. In one arrangement, container 46/48 includes removable corner sections 224. Removable corner sections 224 are positioned in the corners 206 of container 46/48 and are formed as a removable continuance of the lip 128 and flange 130 that wrap around corner 206. When removable corner sections 224 are in place the continuance of flange 130 around corner 206 obstructs the ends of the channel 213 and prevents insertion of flange 130 within recess 118 of benchtop 22.

To alleviate this problem, removable corner sections 224 are connected to both ends of lip 128/flange 130 at the ends of sidewalls 124 and end walls 126 by primary tabs 226. Primary tabs 226 are a thin extension of material that connects the exterior edges of removable corner sections 224 to the end of lip 128 and/or flange 130. These primary tabs 226 are positioned at the intersection of corner 206 and sidewall 124 or end wall 126. In the arrangement shown, the removable corner section 224 is also connected to the sidewall 126, end wall 128 or corner 206 by connection of secondary tabs 228. In the arrangement shown, three secondary tabs 228 extend from the inward surface of removable corner section 224 to the exterior surface of corner 206. When sufficient force is applied to removable corner section 224, primary tabs 226 and secondary tabs 228 break thereby facilitating the removal of removable corner section 224 which removes the interruption caused by removable corner section 226 at the ends of channel 213. In the arrangement shown, a removable corner section 226 is positioned in each corner 206.

In the arrangement shown, only the flanges 130 that extend along the longer sidewalls 124 are free from obstruction. In contrast, the flanges 130 that extend along end walls 126 are connected to features 211 thereby providing additional structural rigidity and strength to container 46/48 but obstructing channel 213. However, in an alternative arrangement, the channel 213 along end walls 126 is also free and clear and also facilitates connection to benchtop 22.

When removable corner sections 226 are in place, they cover the corners of cover 218 and help to prevent unintentional removal of cover 218, such as prior to purchase in a retail location. As the removable corner sections 224 prevent the removal of cover 218 when in place, removable corner sections 224 provide the added benefit of showing whether the container 46/48 has been previously opened which provides assurances to a potential purchaser that the contents of container 46/48 have not been tampered with or altered.

In one arrangement, container 46/48 also includes an optional hang tag 230 that facilitates hanging of the container 46/48 from a display in a retail environment. Hang tag 230 includes an opening therein that facilitates hanging. In one arrangement hang tag 230 is removable.

Guided Circular Saw:

In one arrangement, a guided circular saw system 240 is used in association with system 10. In the arrangement shown, guided circular saw system 240 includes a guide 242 that is configured to connect to the bottom surface of a conventional circular saw 244. Guide 242 is configured to mesh with features in a track 246. Track 246 is configured to hingedly connect to benchtop 22 by hinges 248. In the arrangement shown, hinges 248 include a top section 250, a middle section 252 and a bottom section 254 and include an upper hinge 256 between the top section 250 and middle section 252 and a lower hinge 258 between the middle section 252 and bottom section 254. In the arrangement shown, top section 250 is connected to the bottom surface of track 246 by fasteners 260 and the bottom section 254 is connected to openings 84 in benchtop 22 by way of fasteners 262. This arrangement allows for track 246 to be quickly and easily raised and lowered such that workpiece 148 may be placed under track 246 and cut using circular saw 242 that slides on track 246 with the use of guide 242.

In Operation:

System 10 is quickly and easily converted from a storage position to an extended position by separating the legs 26 which rotate upon center support 24 until shelf 36 is in a flat arrangement. In this arrangement, with the legs 26 extended but the benchtops 22 are folded, the system 10 may be used as a saw horse.

The benchtop 22 is moved to an extended position by simply lifting up on the outward edge 78 of benchtop 22. As benchtop 22 is lifted, benchtop 22 rotates upon hinge 70 as the collar 196 that extends around legs 26 slides upward along legs 26 until the spring loaded pin of brace lock 30 automatically engages the opening 198 in the center wall 176 of leg 26 which locks brace 28 in place with benchtop 22 in a fully extended position. Once this is performed for both benchtops 22, the system is fully extended and ready for use in various operations, as is discussed herein.

System 10 is also quickly and easily converted from an extended position to a storage position by grasping the end edges 80 of benchtop 22 and pulling the handle 204 of brace control 32 upward. This can be performed with both hands simultaneously as the user grasps the end edges 80 of benchtop 22. The convenient positioning of the handles 204 of brace controls 32 eliminates the need for the user to bend over to lower the benchtop 22. When the handles 204 are pulled upward, this causes the pins of brace locks 30 to be rotated upon hinge 202 against the spring bias force thereby pulling the pin of brace lock 30 out of the opening 198 in the center wall 176 of leg 26. Once pin has been removed from opening 198 the collar 196 is free to slide downward along legs 26 until benchtop 22 is fully folded.

In this way, system 10 quickly and easily converts between an extended position and a storage position.

Figure 18:
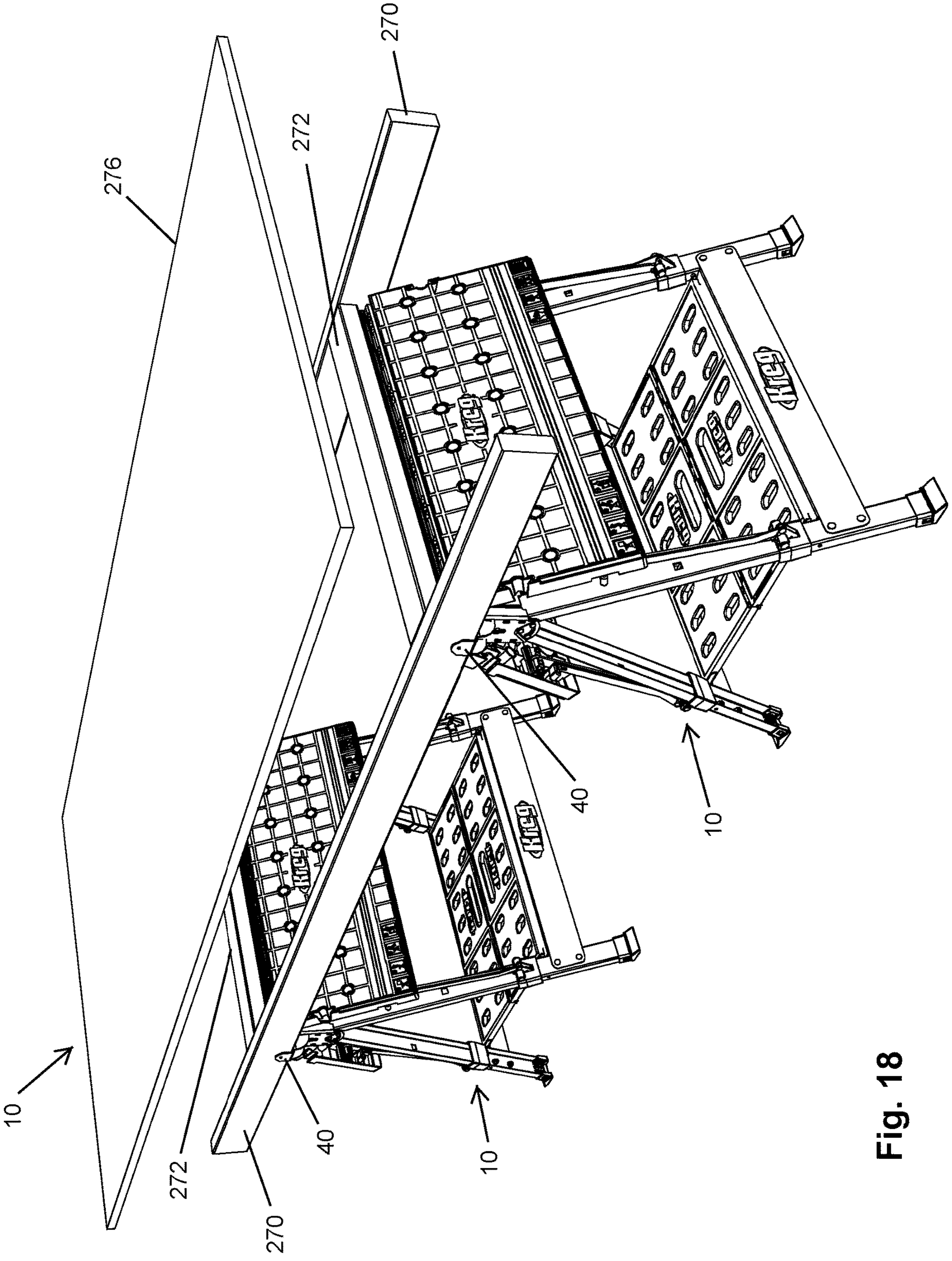
FIG. 18 is a perspective view of a pair of mobile project center systems positioned in side-to-side spaced alignment; the view showing the benchtops in a retracted position but the legs in an extended position; the view showing sacrificial boards attached to the center track to protect the center track; the view showing support brackets connected to the center supports and a support board held within the groove formed by the support bracket and the center support; the view showing a work surface, which is in the form of a large sheet, about to be attached to the sacrificial boards and the support boards thereby forming an extended work surface out of two connected mobile project center systems.
Figure 19:
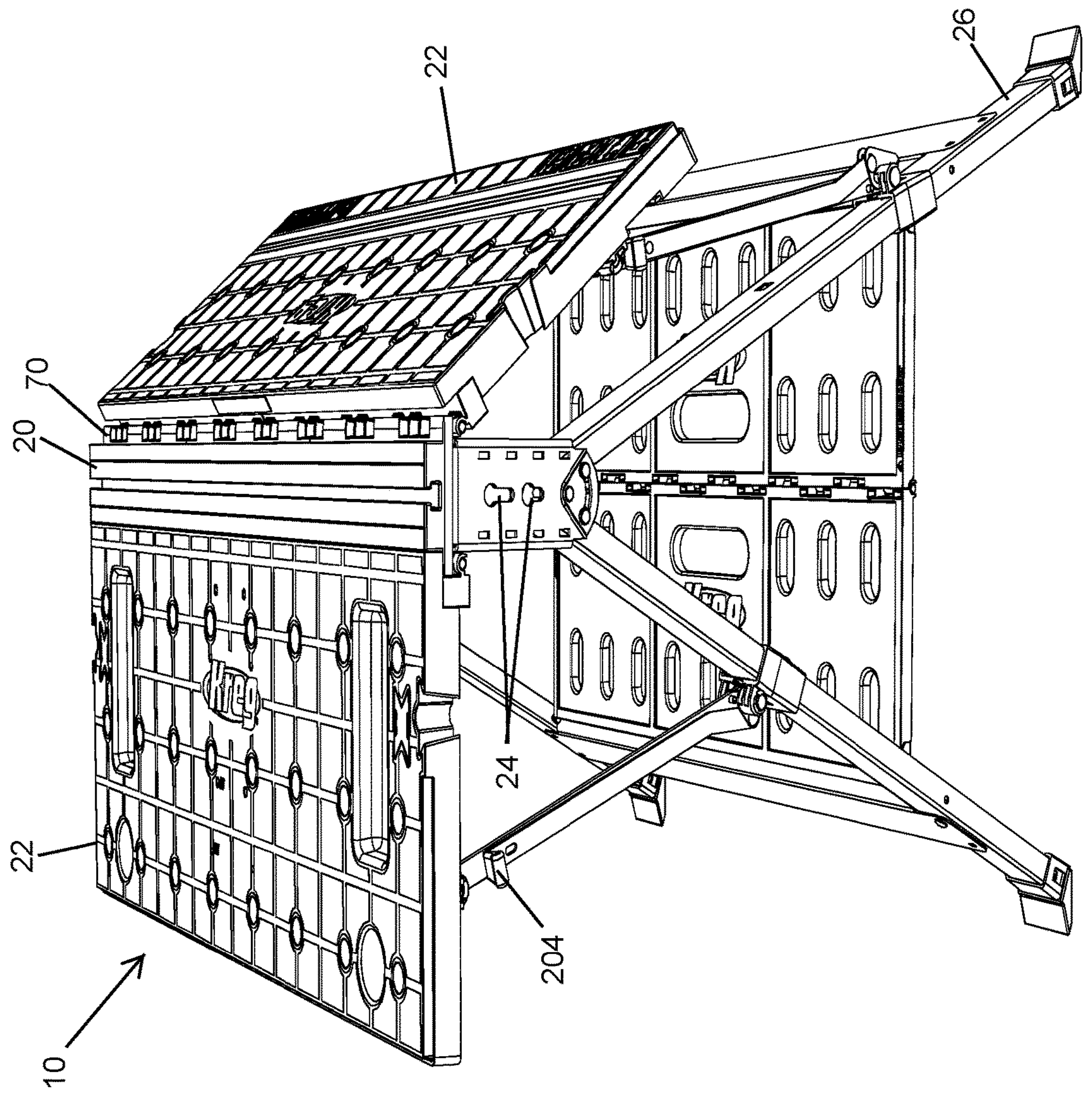
FIG. 19 is a perspective view of the mobile project center system shown in FIG. 1; the view showing an end of the mobile project center; the view showing one of the benchtops connected to the center track in a retracted position whereas the other benchtop is in an extended position.
Figure 20:
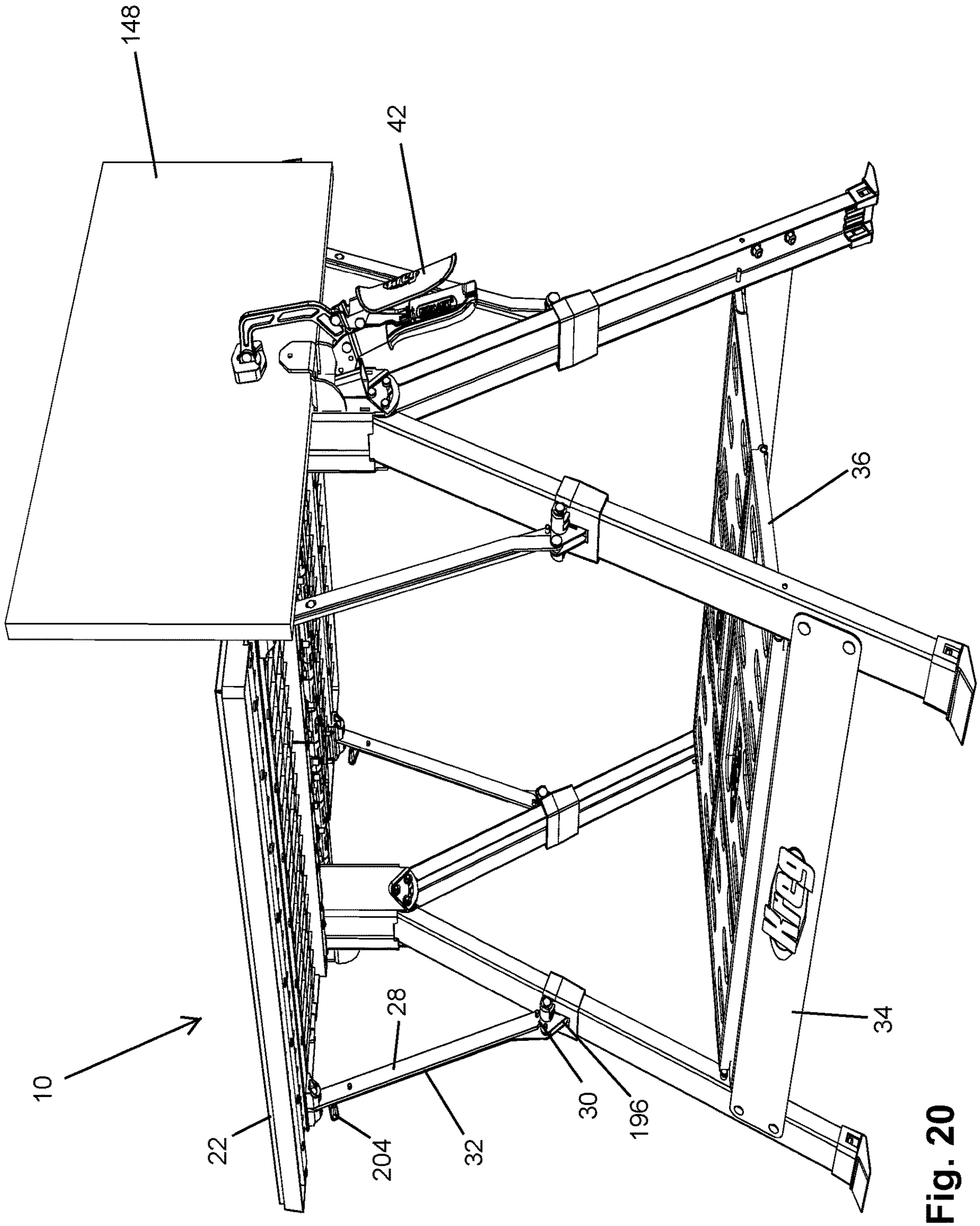
FIG. 20 is a perspective view of the mobile project center system shown in FIG. 1; the view showing a support bracket connected to slots in the exterior surface of a center support; the view showing a bench clamp connected to a key hole in the exterior surface of the center support just below the support bracket; the view showing a workpiece held within the channel formed between the support bracket and the center support and the bench clamp clamping the workpiece with a clamping force that extends approximately parallel to the plane of the upper surface of the benchtops.
Figure 21:
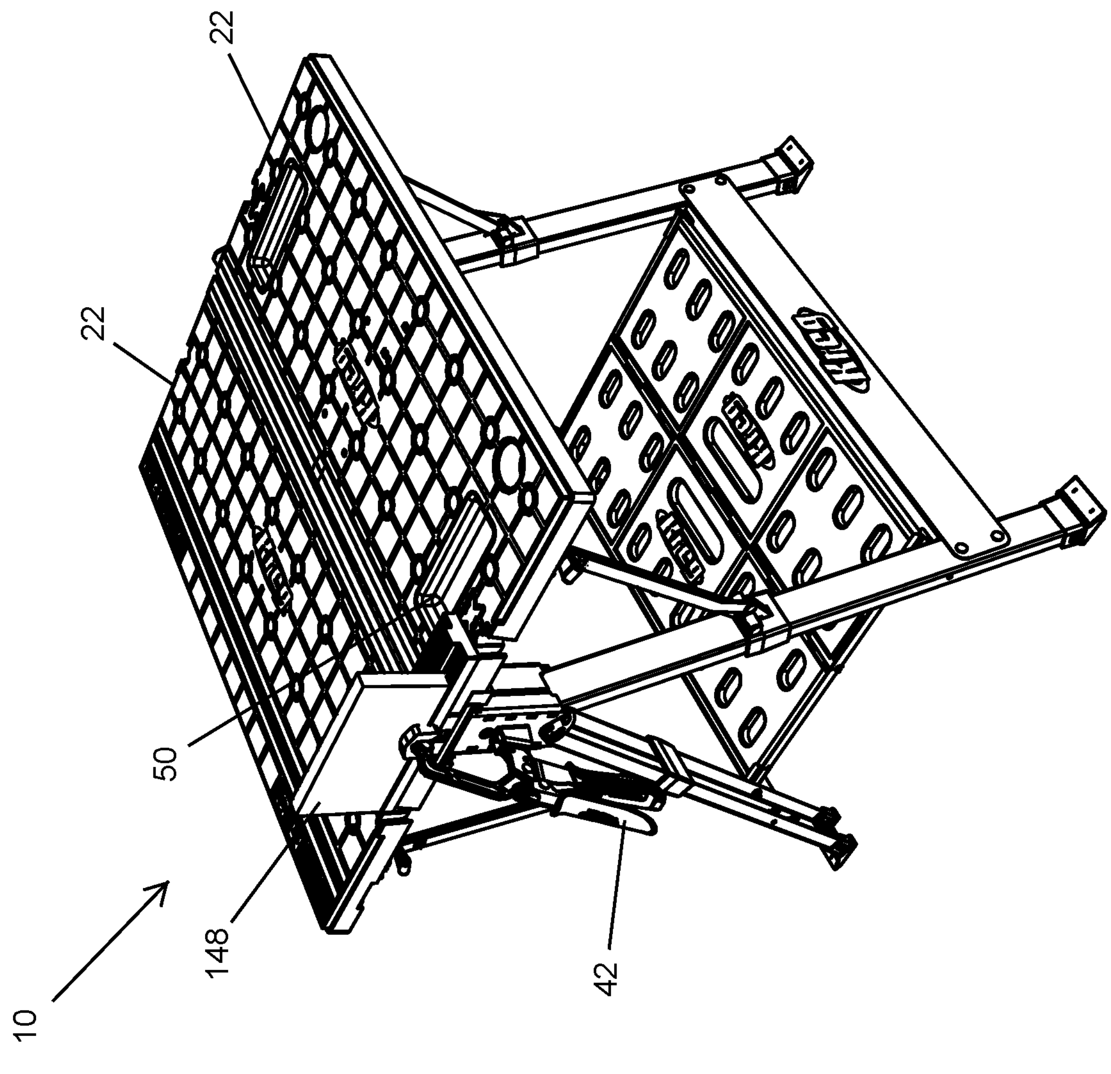
FIG. 21 is a perspective view of the mobile project center system shown in FIG. 1; the view showing a joinery block connected to openings in the benchtop; the view showing a bench clamp connected to a key hole in the exterior surface of the center support; the view showing a workpiece clamped against the joinery block by the bench clamp with a clamping force that extends approximately parallel to the plane of the upper surface of the benchtops; the view showing the workpiece extending upward.
Figure 22:
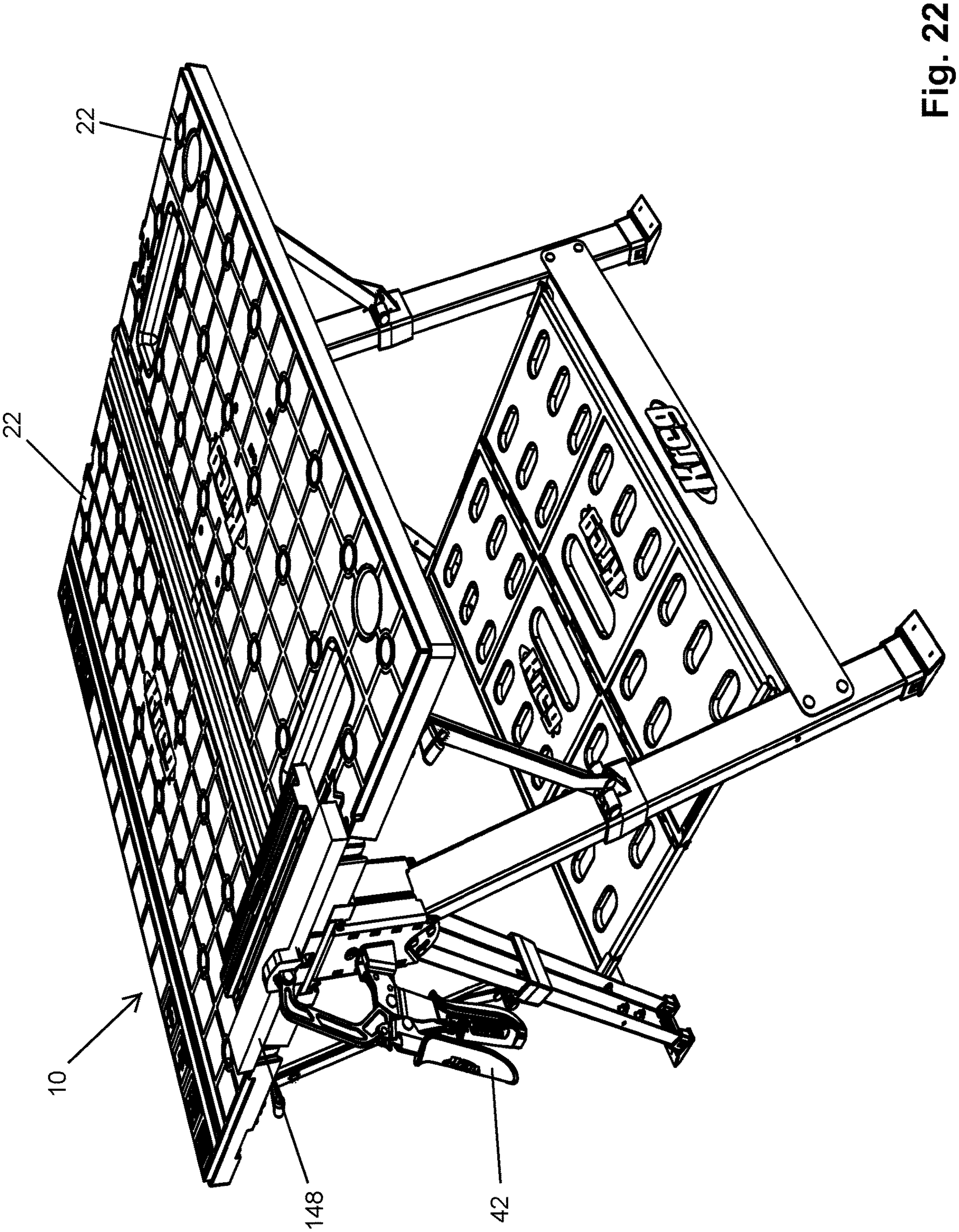
FIG. 22 is a similar perspective view to that shown in FIG. 21, the view showing a narrow workpiece lying flat on the benchtops.
Figure 23:
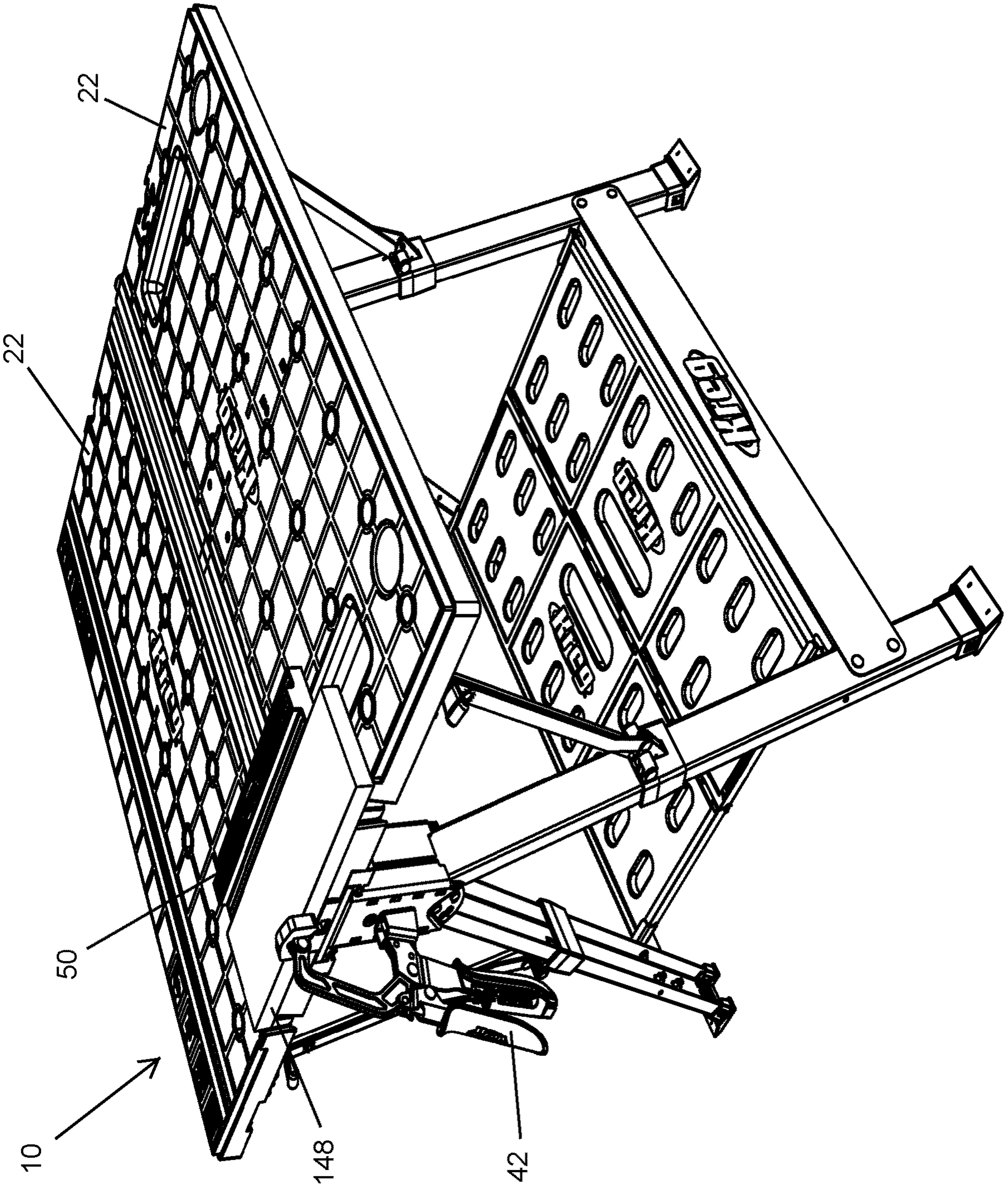
FIG. 23 is a similar perspective view to that shown in FIG. 22, the view showing a wider workpiece lying flat on the benchtops.
Figure 24:
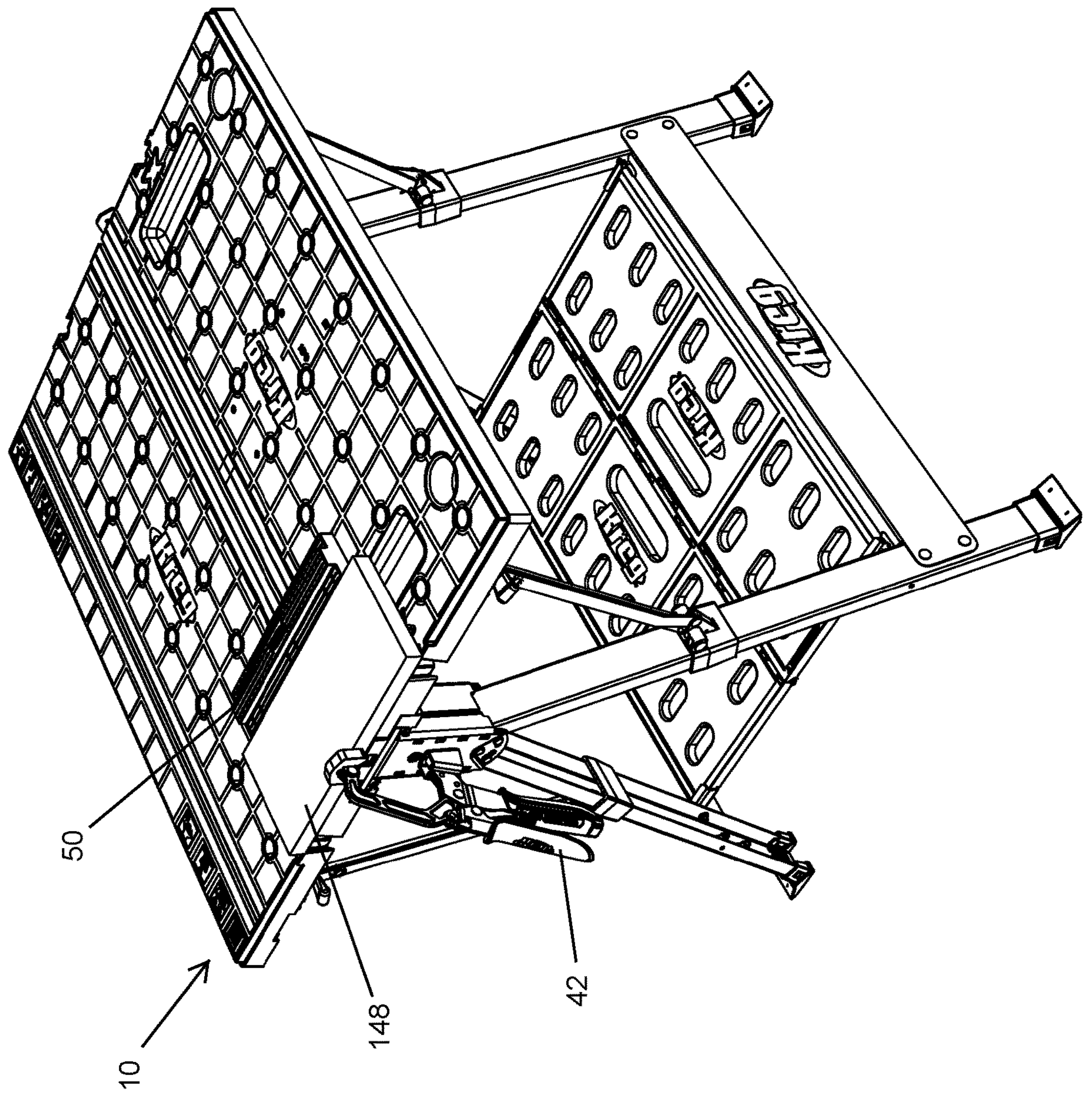
FIG. 24 is a similar perspective view to that shown in FIG. 23, the view showing a wider workpiece lying flat on the benchtops.
Figure 25:
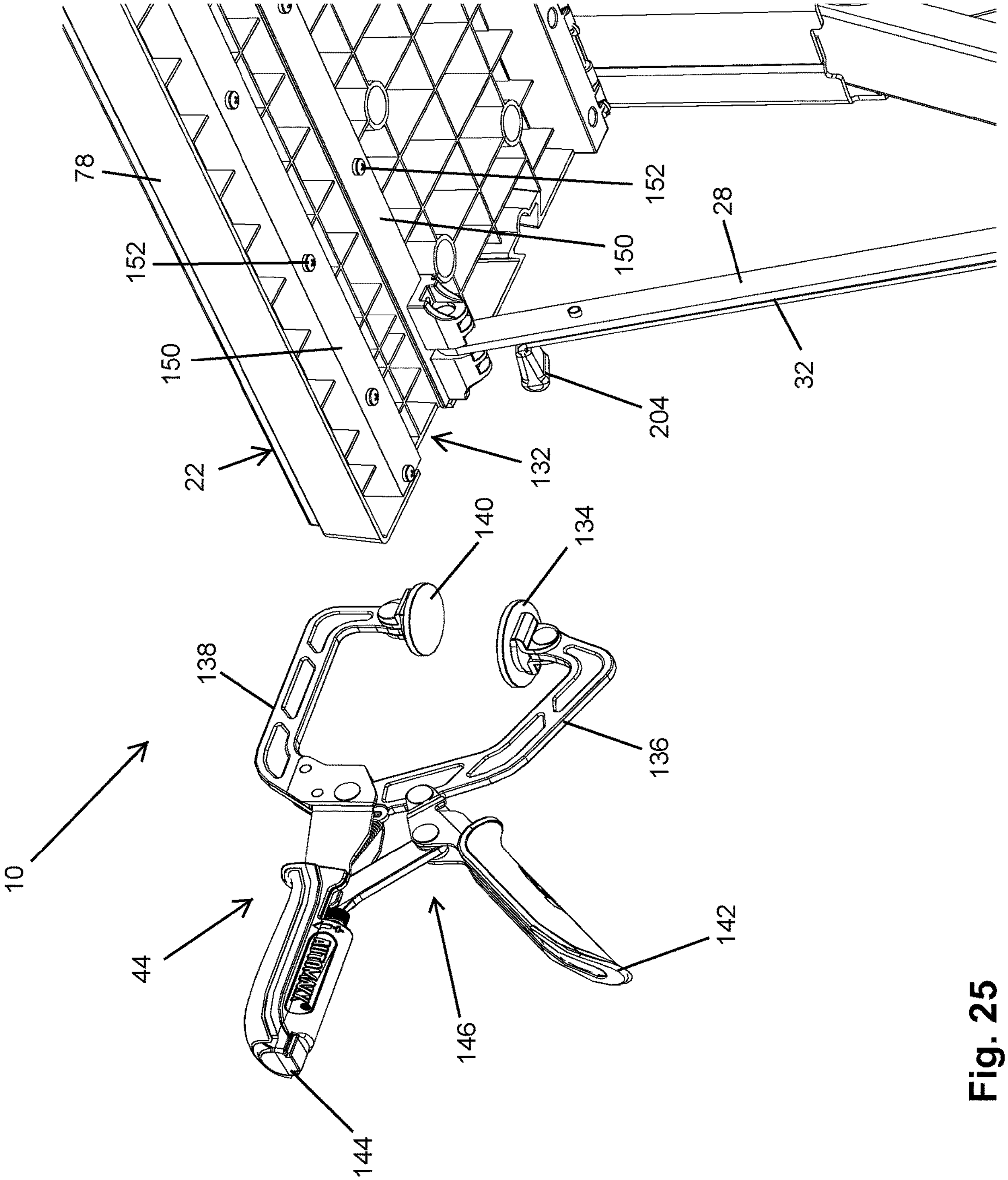
FIG. 25 is a close up perspective view of the bottom surface of a benchtop of the mobile project center system shown in FIG. 1; the view showing the slot in the bottom surface of the benchtop that is configured to receive the clamping pad of a project clamp therein that holds the project clamp along the edge of the benchtop while allowing the project clamp to slide along the length of the benchtop; the view showing the project clamp having an upper handle and a lower handle, an upper arm and a lower arm, an upper pad and a lower pad and a clamping mechanism; the view showing metallic flanges connected adjacent a recess in the lower surface of the benchtop thereby forming the slot in the lower surface of the benchtop.
Figure 26:
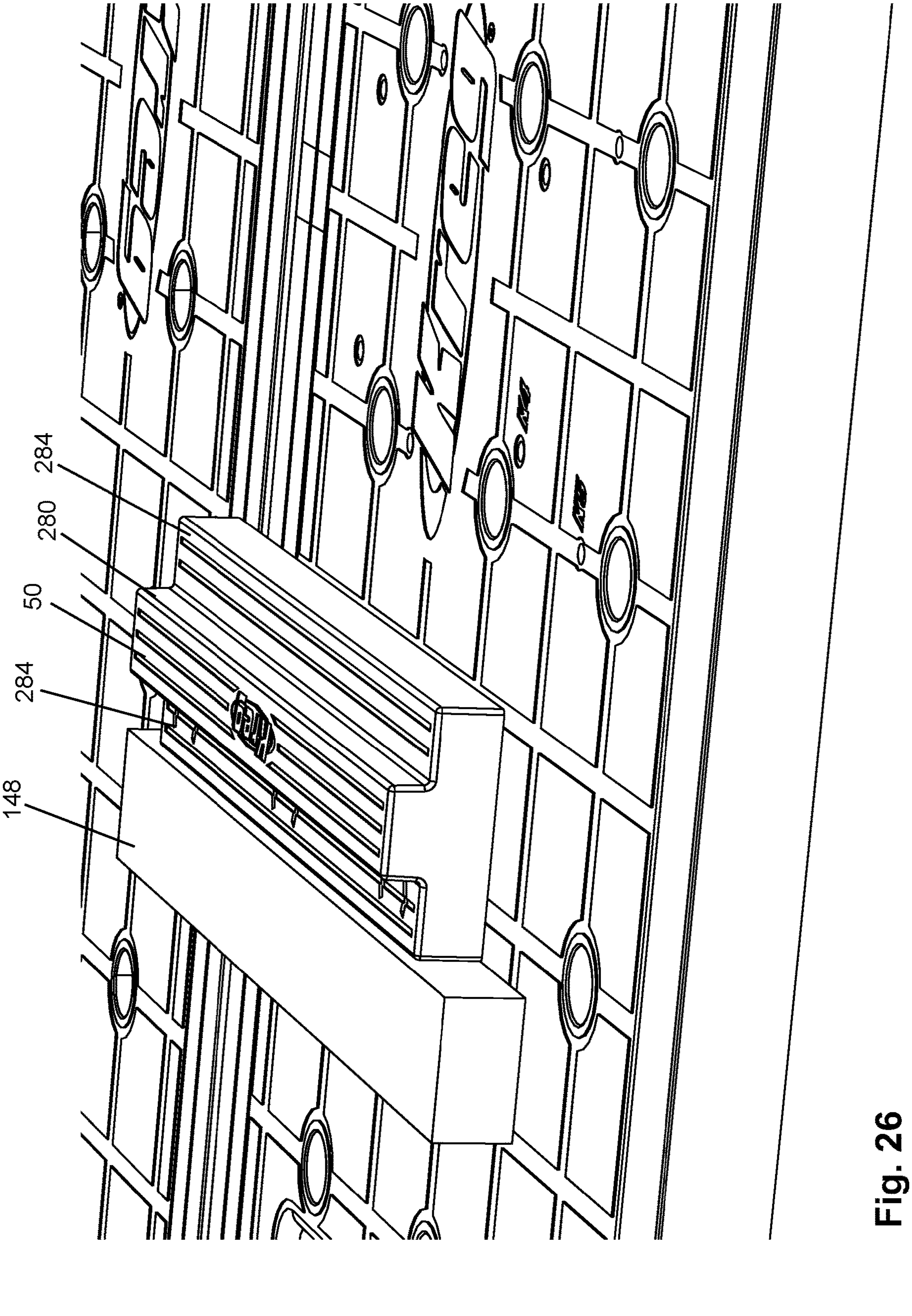
FIG. 26 is a close up perspective view of the upper surface of a benchtop of the mobile project center system shown in FIG. 1; the view showing a joinery block inserted within a pair of spaced openings in the benchtop; the view showing a workpiece aligned along a side of the joinery block; the view showing the joinery block having steps along the sides of the joinery block; the view showing the workpiece having a slightly greater thickness than the step of the joinery block so as to allow sanding of the upper surface of the workpiece without engaging the joinery block.
Figure 27:
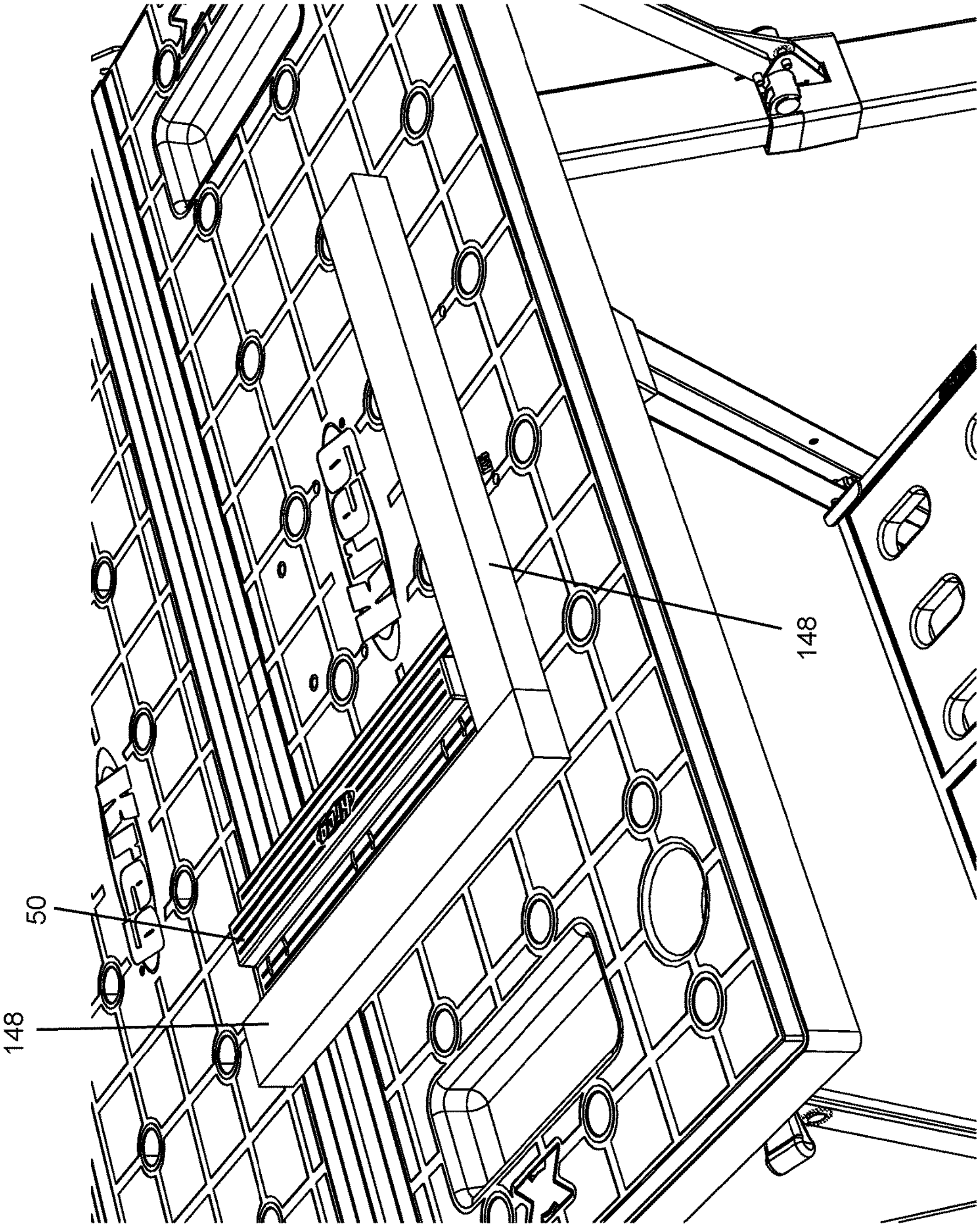
FIG. 27 is a similar perspective view to that shown in FIG. 26; the view showing the upper surface of a benchtop of the mobile project center system shown in FIG. 1; the view showing a joinery block inserted within a pair of spaced openings in the benchtop; the view showing a pair of workpieces perpendicularly aligned to one another along adjacent sides of the joinery block.
Figure 28:
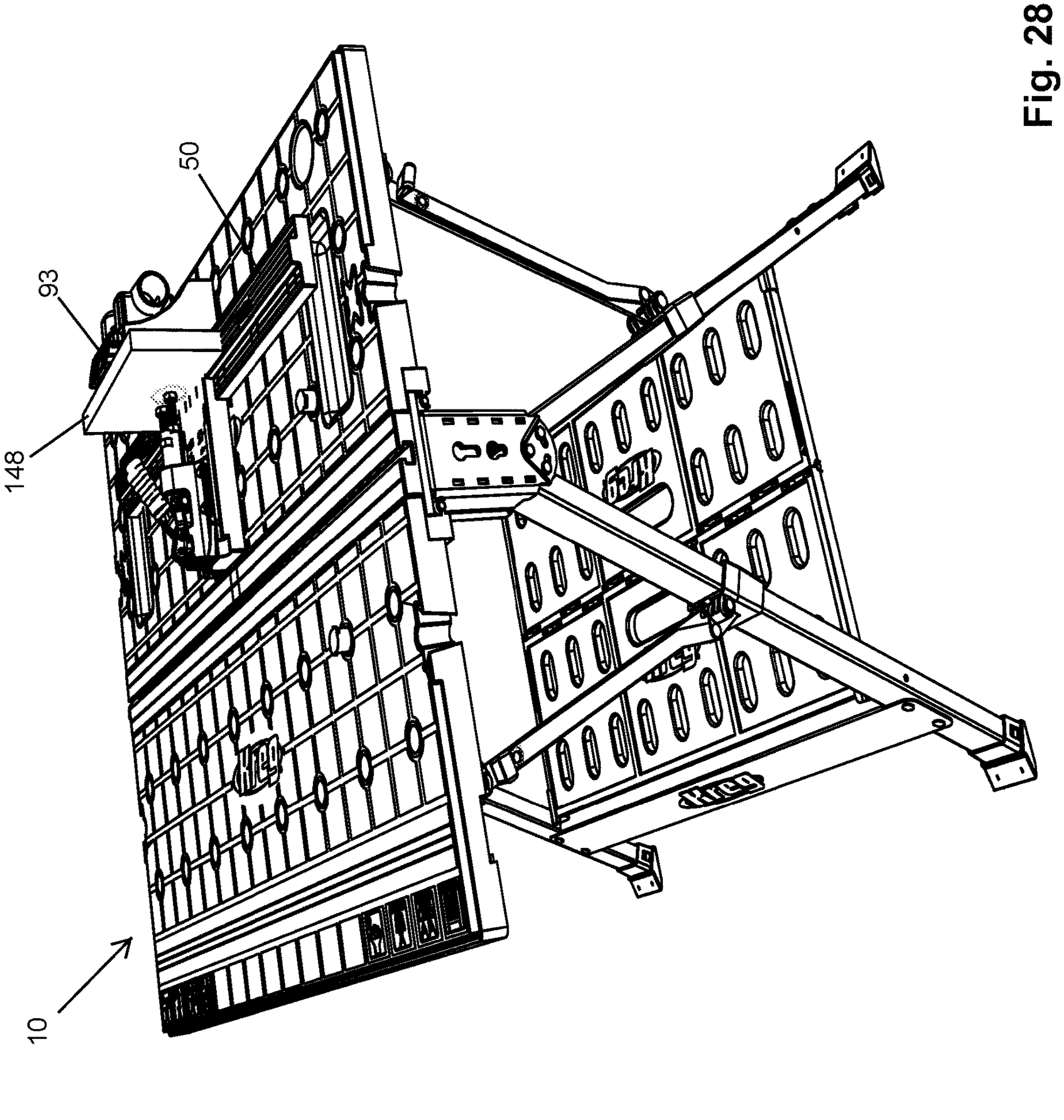
FIG. 28 is a perspective view of the upper surface of a benchtop of the mobile project center system shown in FIG. 1; the view showing a jig connected to the upper surface of a benchtop using alignment holes in the benchtop, which in this case is a Kreg Tool K4 pocket hole jig; the view also showing an alignment block inserted within a pair of spaced openings in the benchtop adjacent the jig; the view showing a workpiece clamped within the jig.
Figure 29:
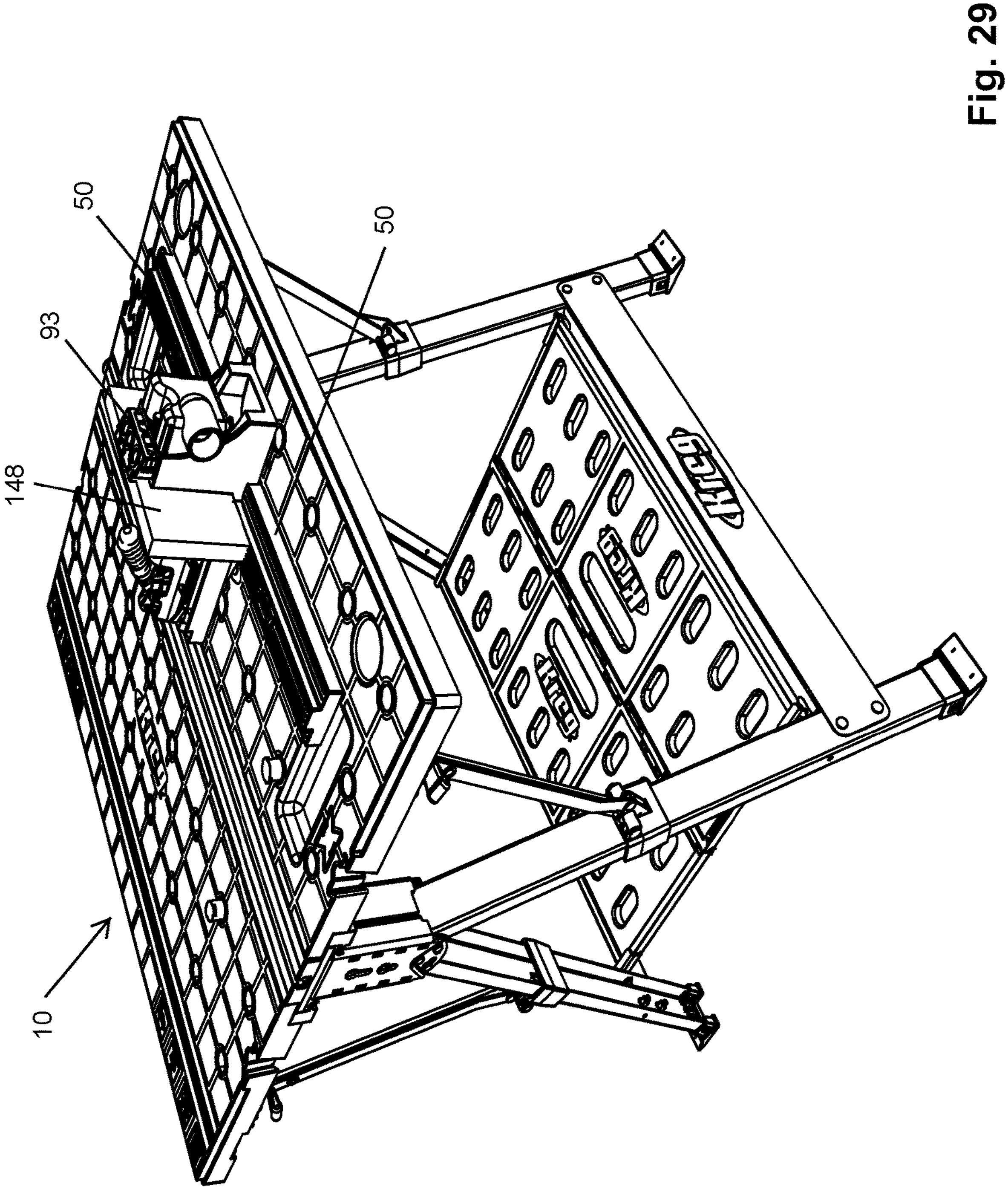
FIG. 29 is another perspective view of the view shown in FIG. 28.
Figure 30:
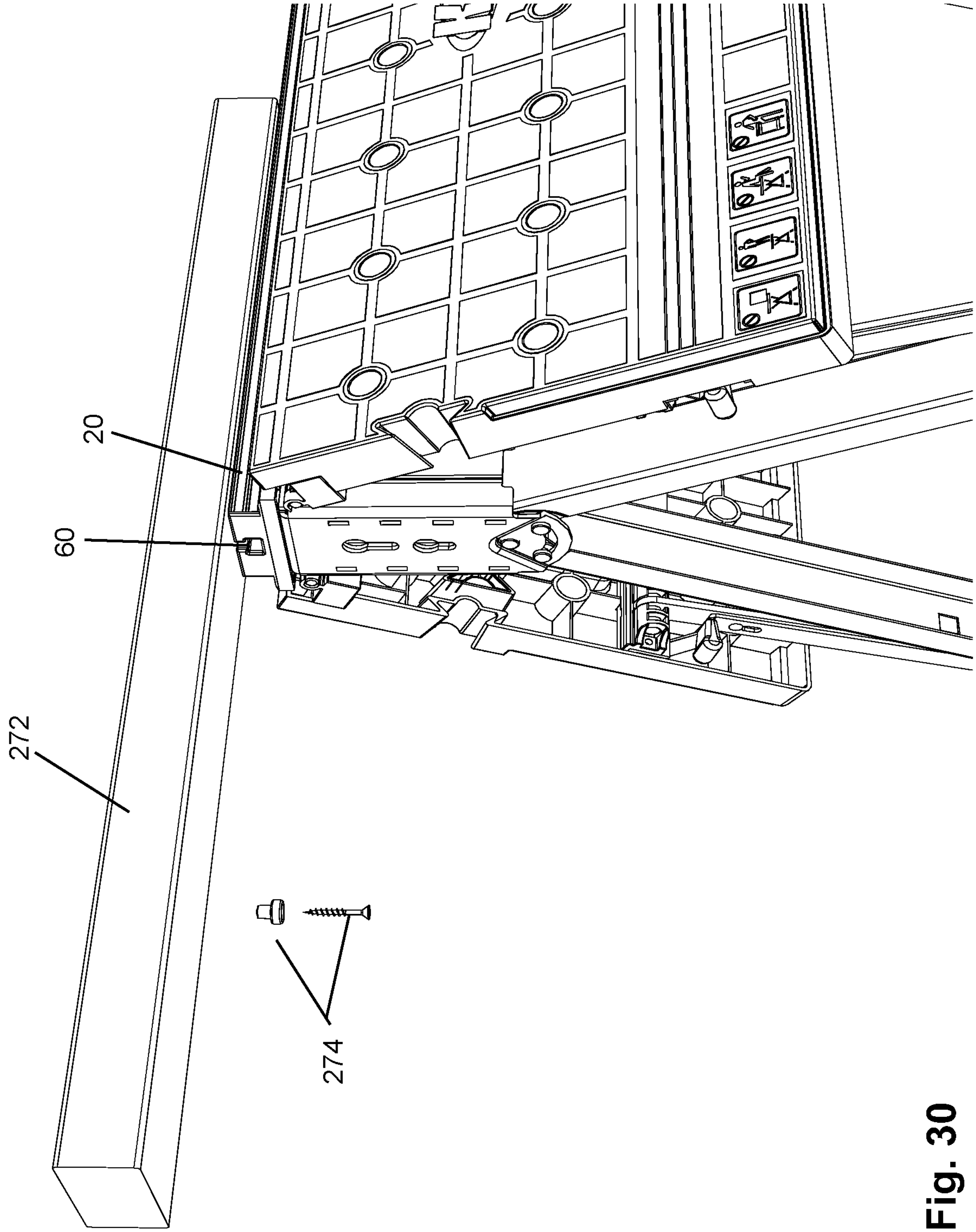
FIG. 30 is a perspective view of an end of the mobile project center system shown in FIG. 1, the view showing a sacrificial board about to be attached to the center track by attachment of a feature that fits within the slot of the center track by a fastener such that once the feature is fastened to the sacrificial board the sacrificial board is slid onto the center track thereby protecting the center track.
Figure 31:
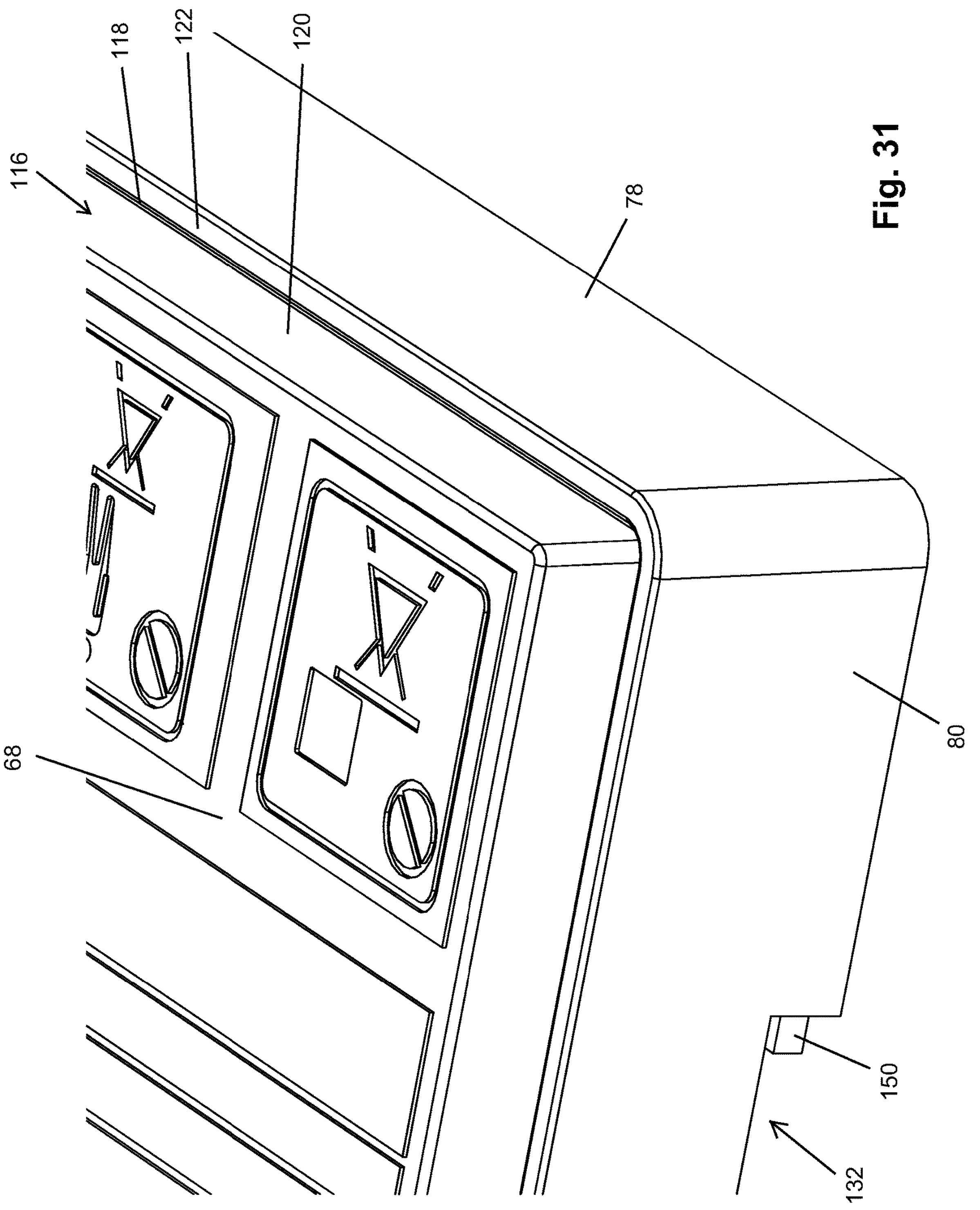
FIG. 31 is a close-up perspective view of the upper surface of a corner of a benchtop of the mobile project center system shown in FIG. 1, the view showing the step and recess in the edge of the benchtop that is configured to receive the lip of a container that hangs from the step and recess as is shown in FIG. 32.
Figure 32:
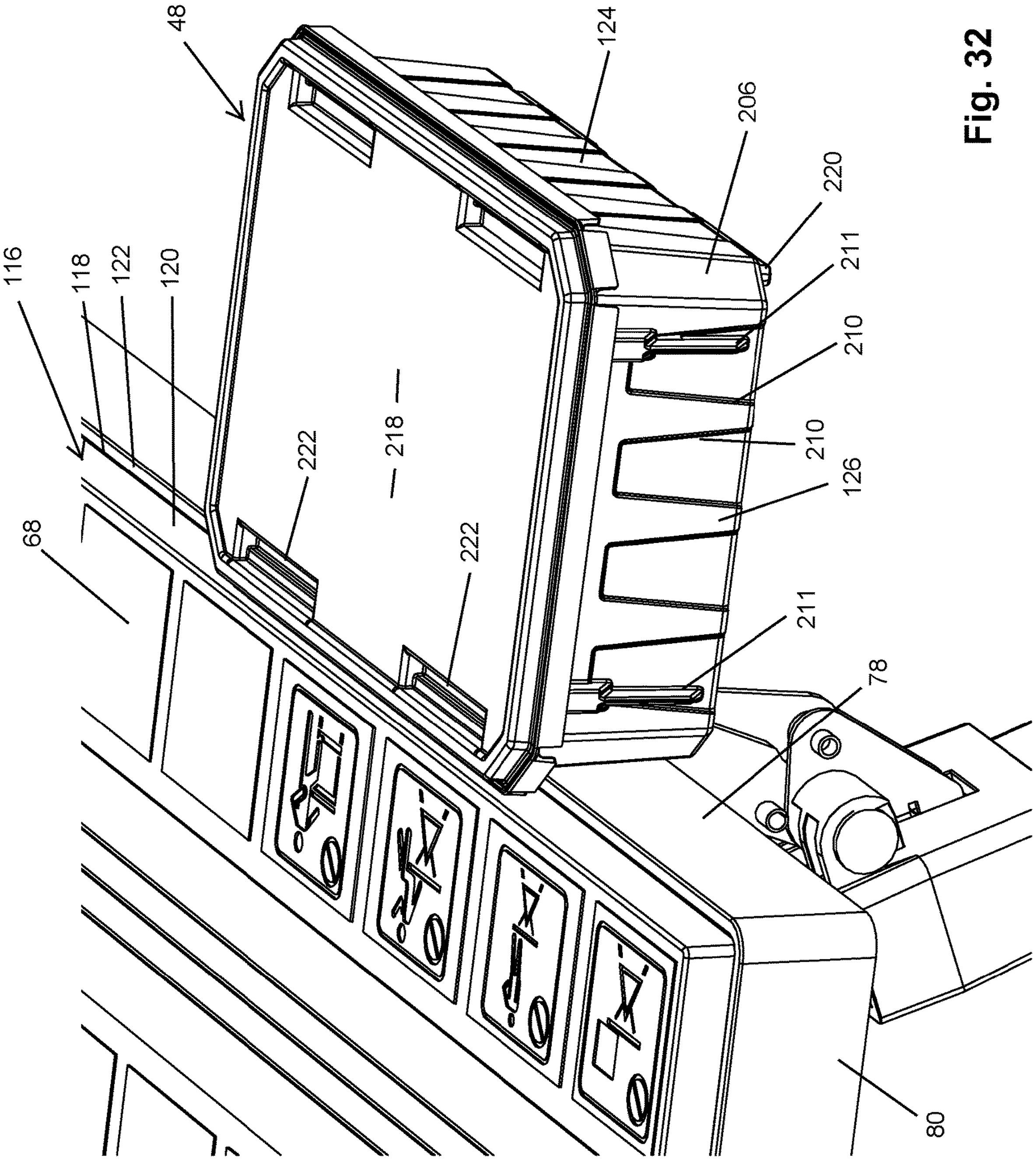
FIG. 32 is a close-up perspective view of the upper surface of a corner of a benchtop of the mobile project center system shown in FIG. 31, the view showing a medium container connected to the step and recess in the edge of the benchtop by a lip of a container that engages the recess of the benchtop; the view showing the container hanging from and extending outward from the edge of the benchtop.
Figure 33:
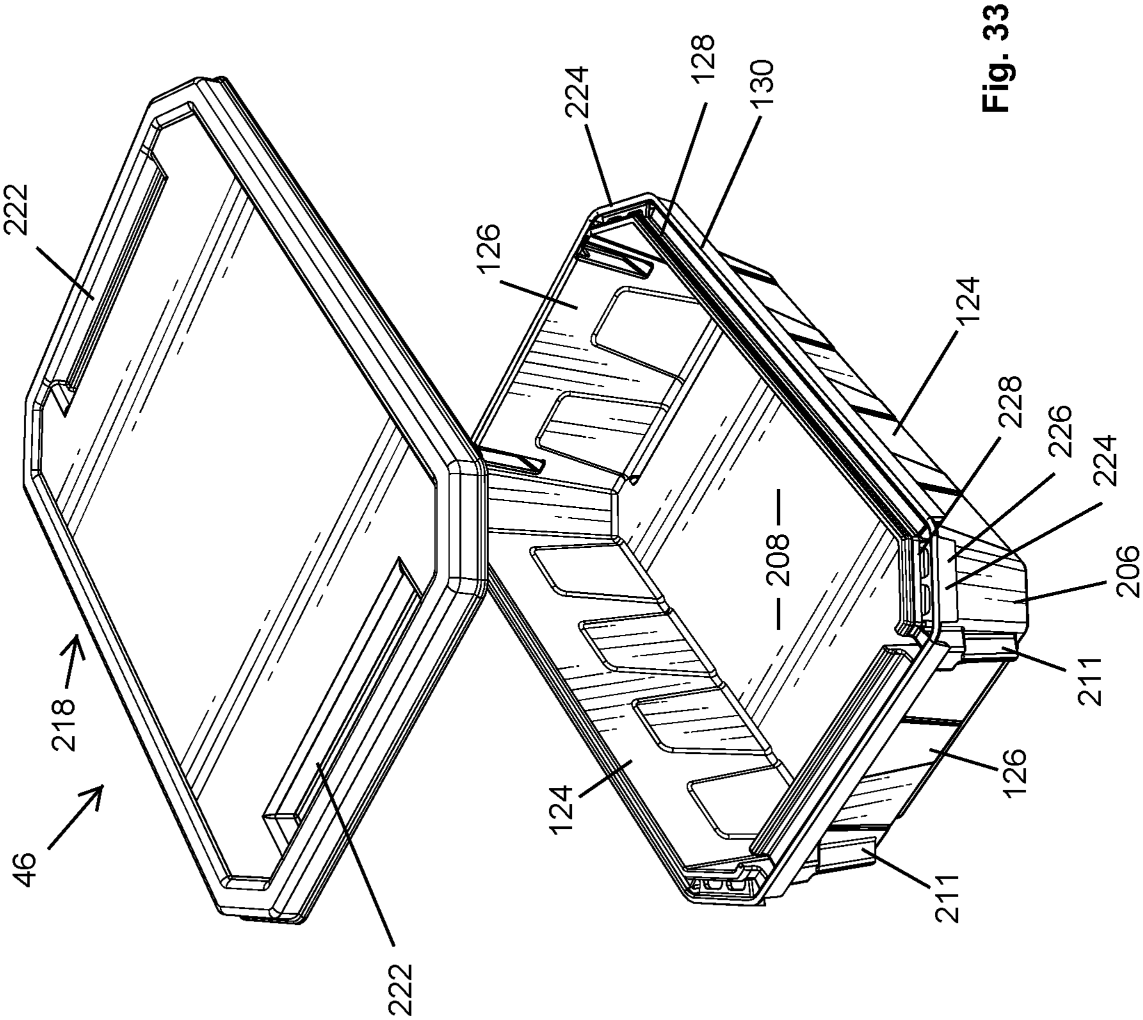
FIG. 33 is a perspective of a small container that has a lip that is configured to engage the step and recess in the edge of a benchtop of the mobile project center shown in FIG. 1.
Figure 34:
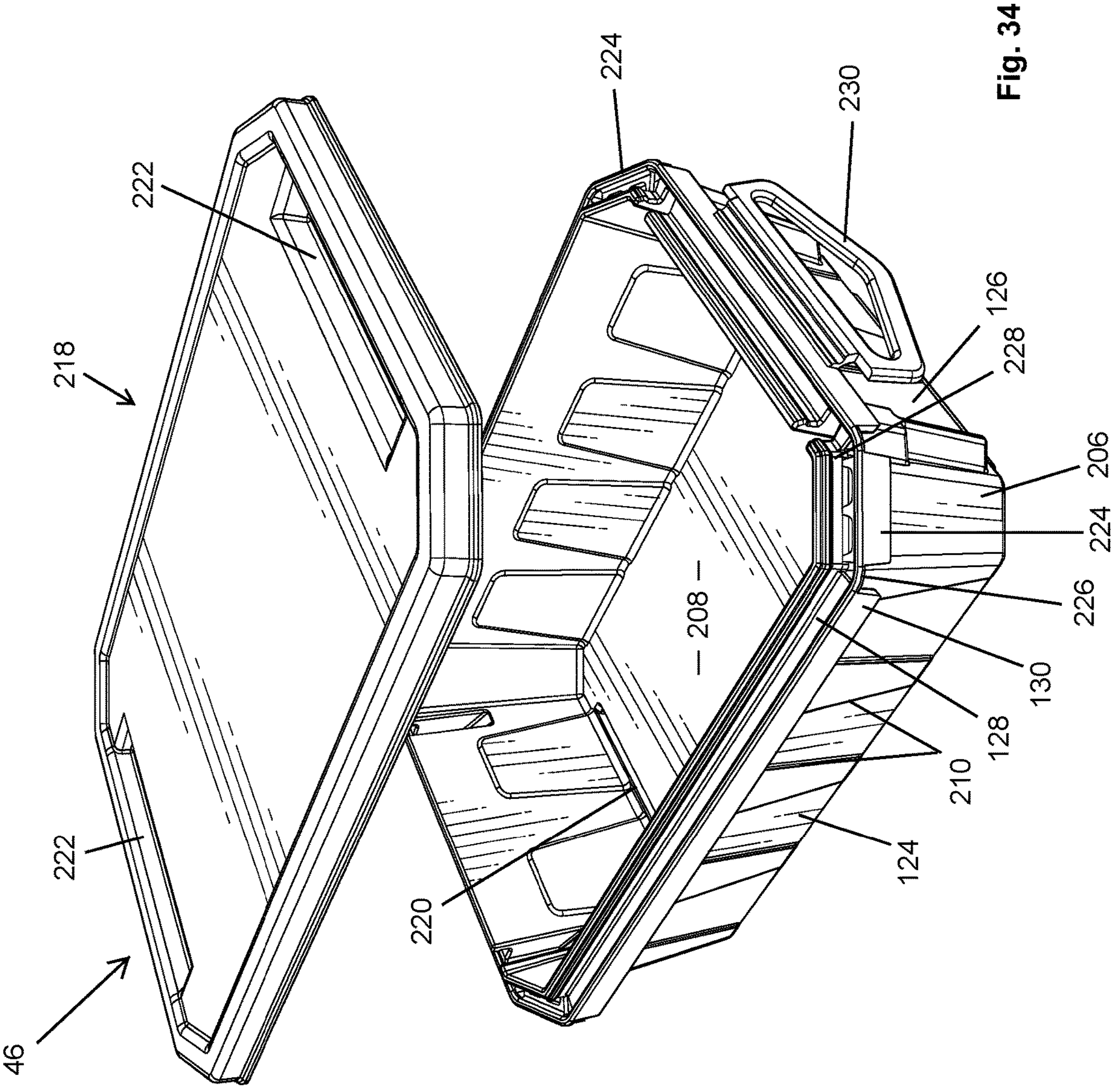
FIG. 34 is another perspective of a small container shown in FIG. 33 that has a lip that is configured to engage the step and recess in the edge of a benchtop of the mobile project center shown in FIG. 1.
Figure 35:
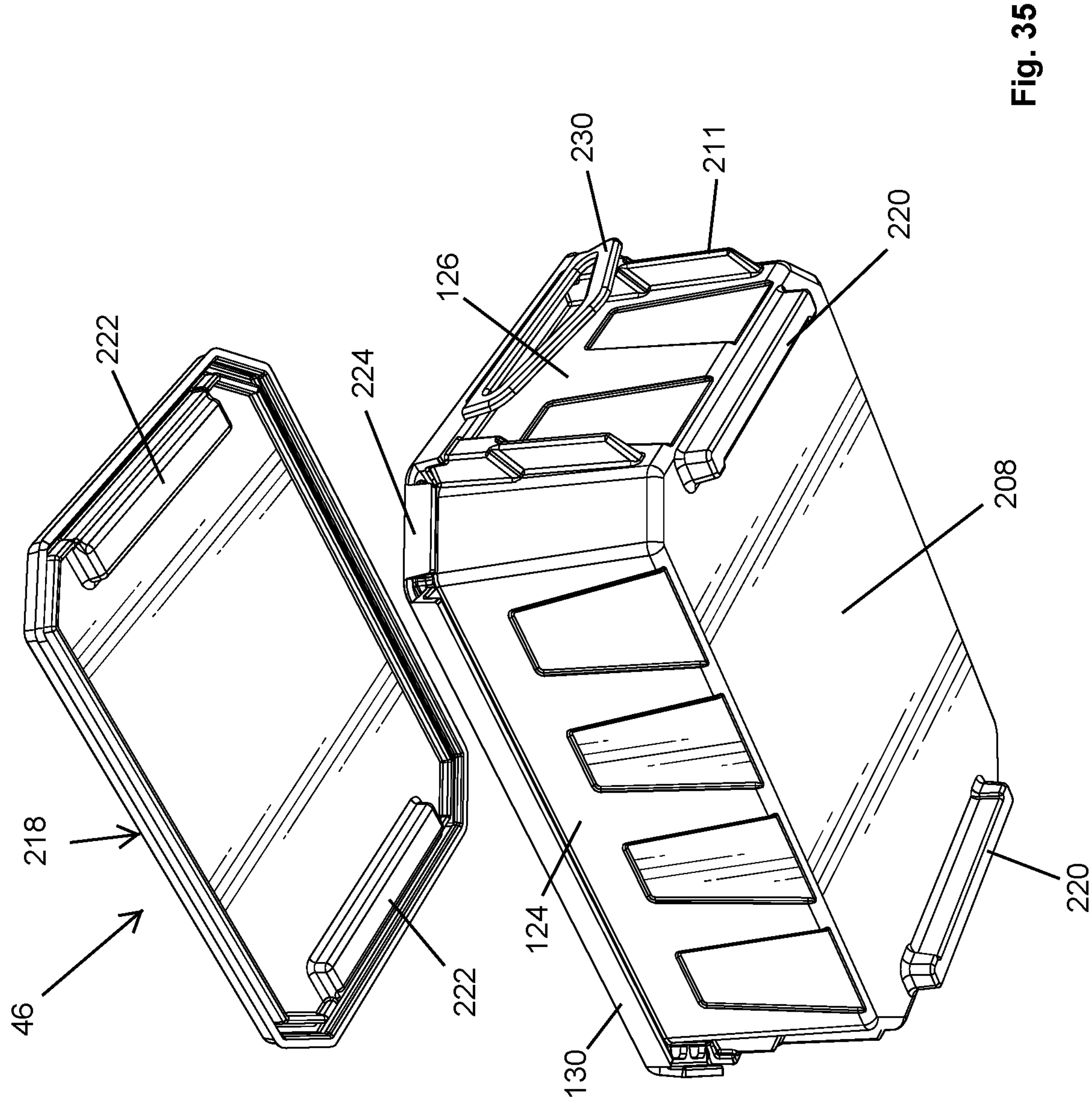
FIG. 35 is another perspective of a small container shown in FIG. 33 that has a lip that is configured to engage the step and recess in the edge of a benchtop of the mobile project center shown in FIG. 1; the view showing the bottom side of the small container having feet in the bottom of the container; the view showing corresponding sockets in the cover of the small container.
Figure 36:
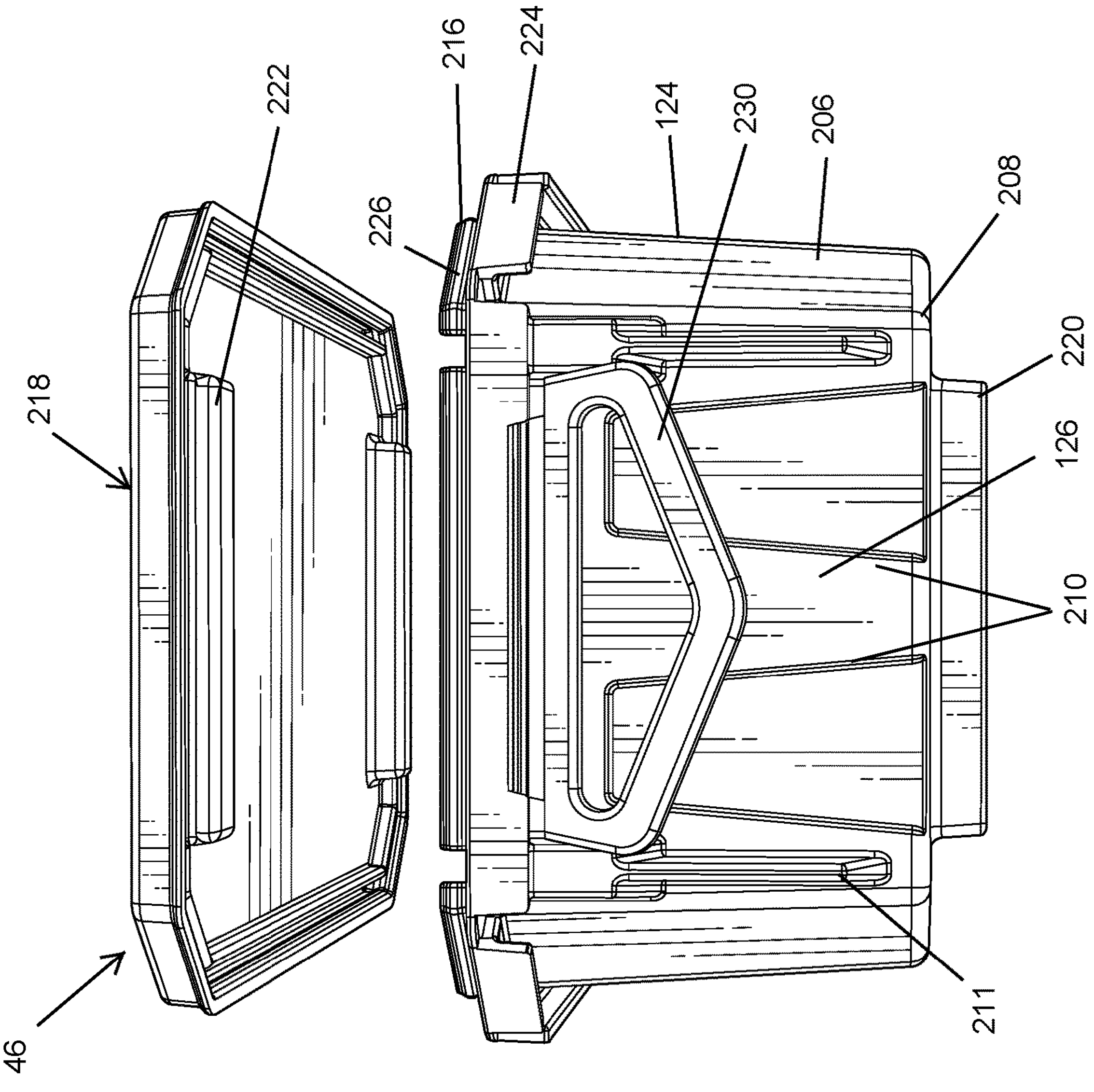
FIG. 36 is an elevation view of an end of a small container shown in FIG. 33 that has a lip that is configured to engage the step and recess in the edge of a benchtop of the mobile project center shown in FIG. 1; the view showing the removable corner sections still attached.
Figure 37:
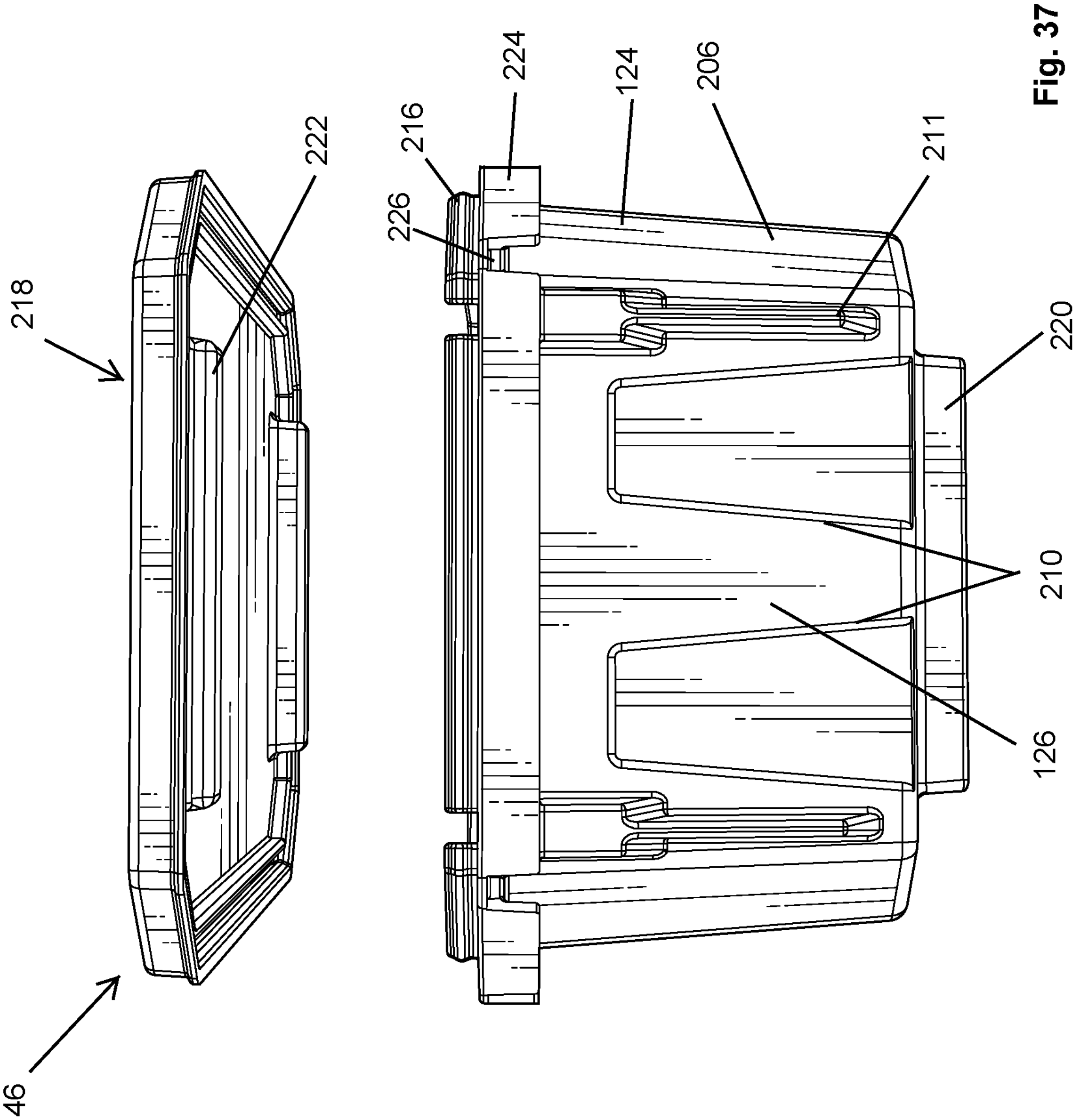
FIG. 37 is an elevation view of an end of a small container shown in FIG. 33 that has a lip that is configured to engage the step and recess in the edge of a benchtop of the mobile project center shown in FIG. 1; the view showing the opposite end as shown in FIG. 36; the view showing the removable corner sections still attached.
Figure 38:
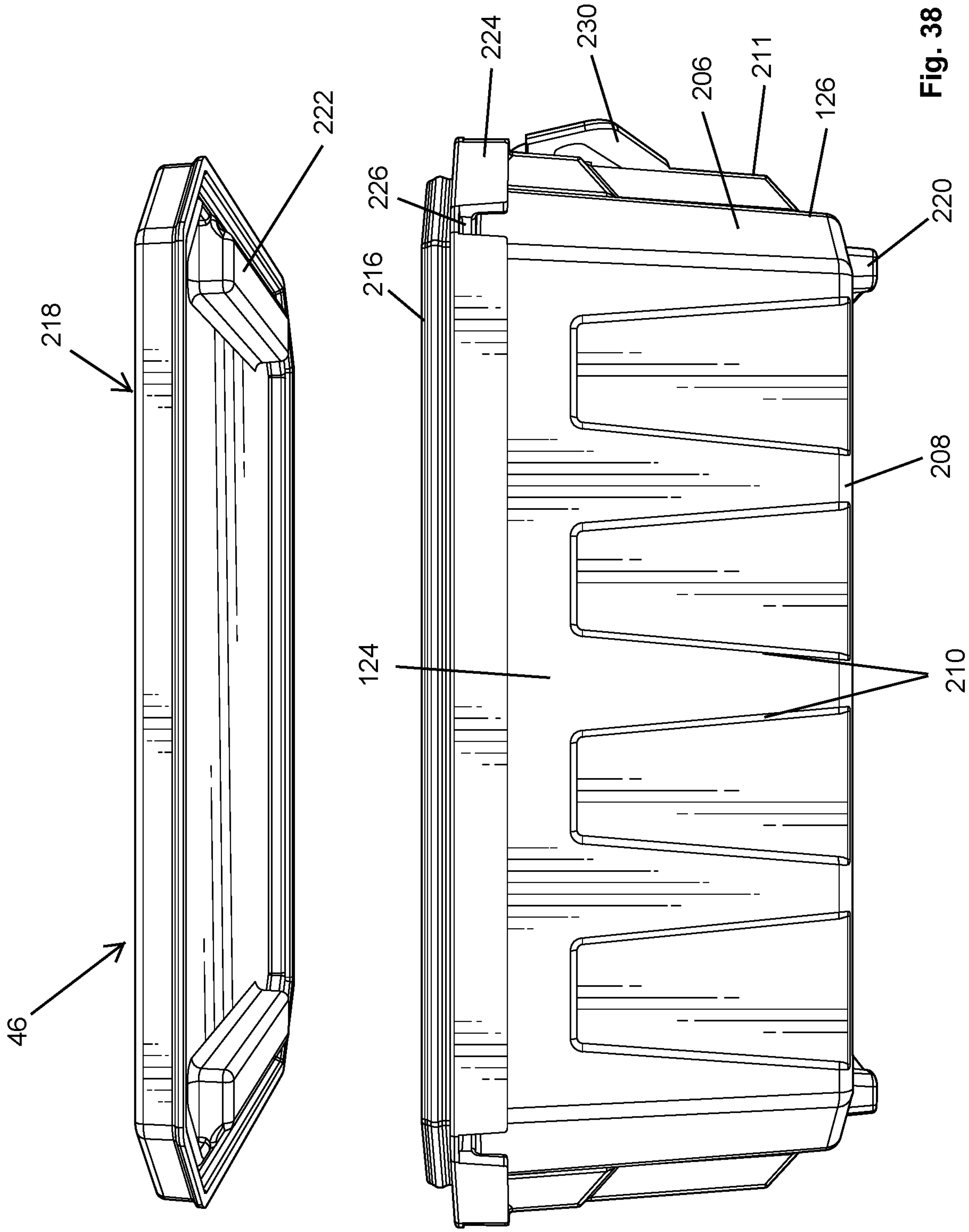
FIG. 38 is an elevation view of side of a small container shown in FIG. 33 that has a lip that is configured to engage the step and recess in the edge of a benchtop of the mobile project center shown in FIG. 1.
Figure 39:
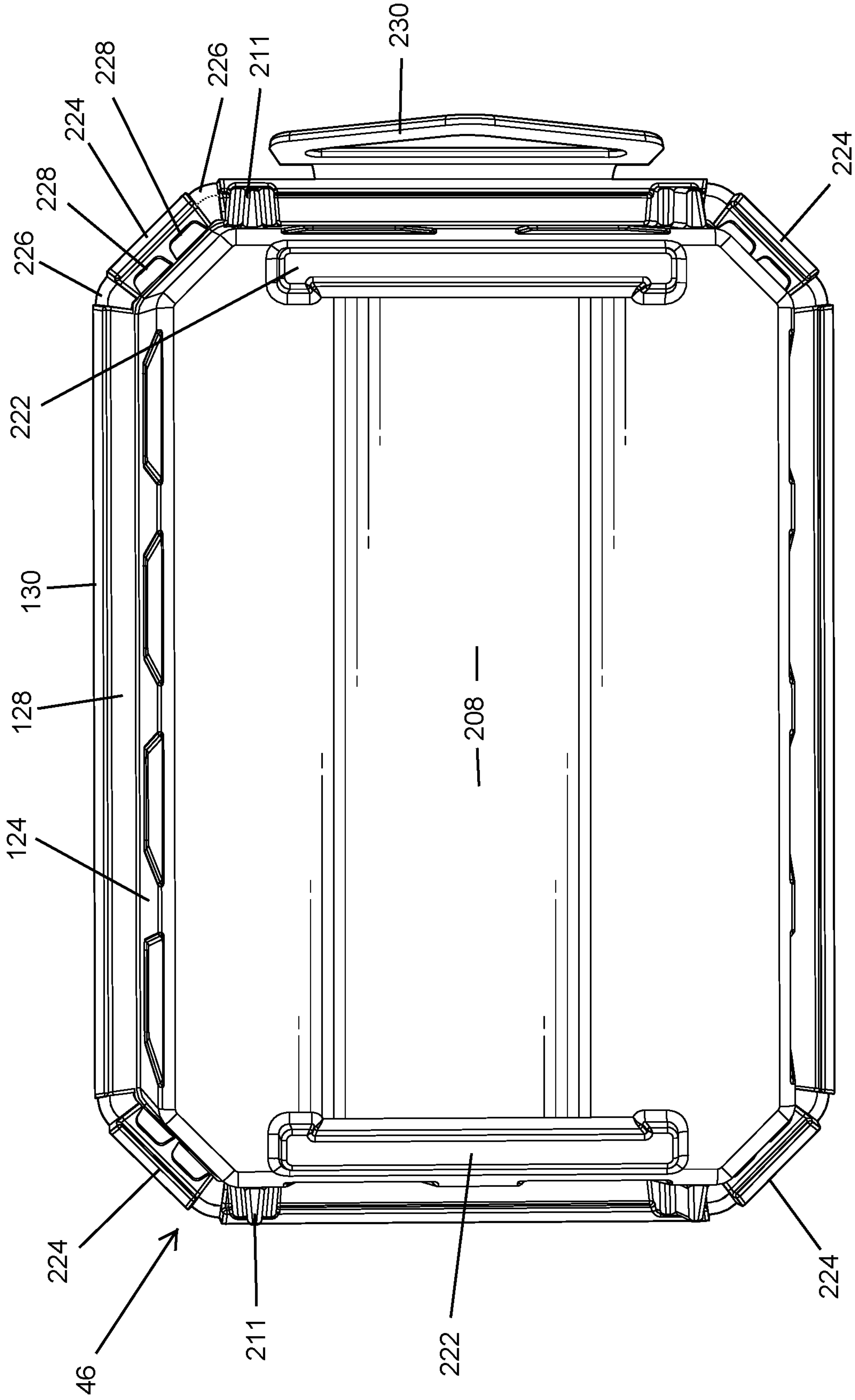
FIG. 39 is an elevation view of the bottom side of a small container shown in FIG. 33 that has a lip that is configured to engage the step and recess in the edge of a benchtop of the mobile project center shown in FIG. 1.
Figure 40:
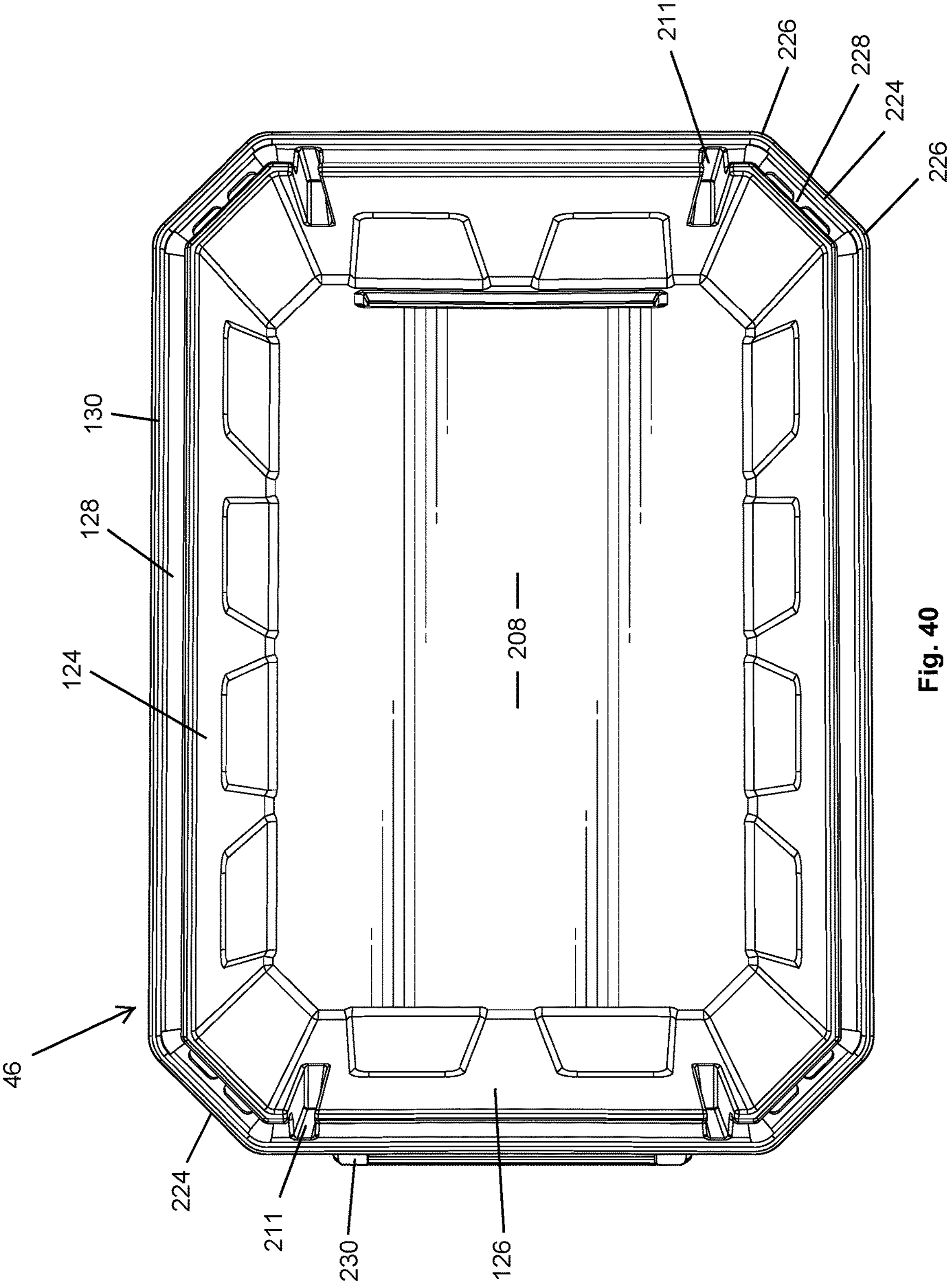
FIG. 40 is an elevation view of the top side of a small container shown in FIG. 33 that has a lip that is configured to engage the step and recess in the edge of a benchtop of the mobile project center shown in FIG. 1.
Figure 41:
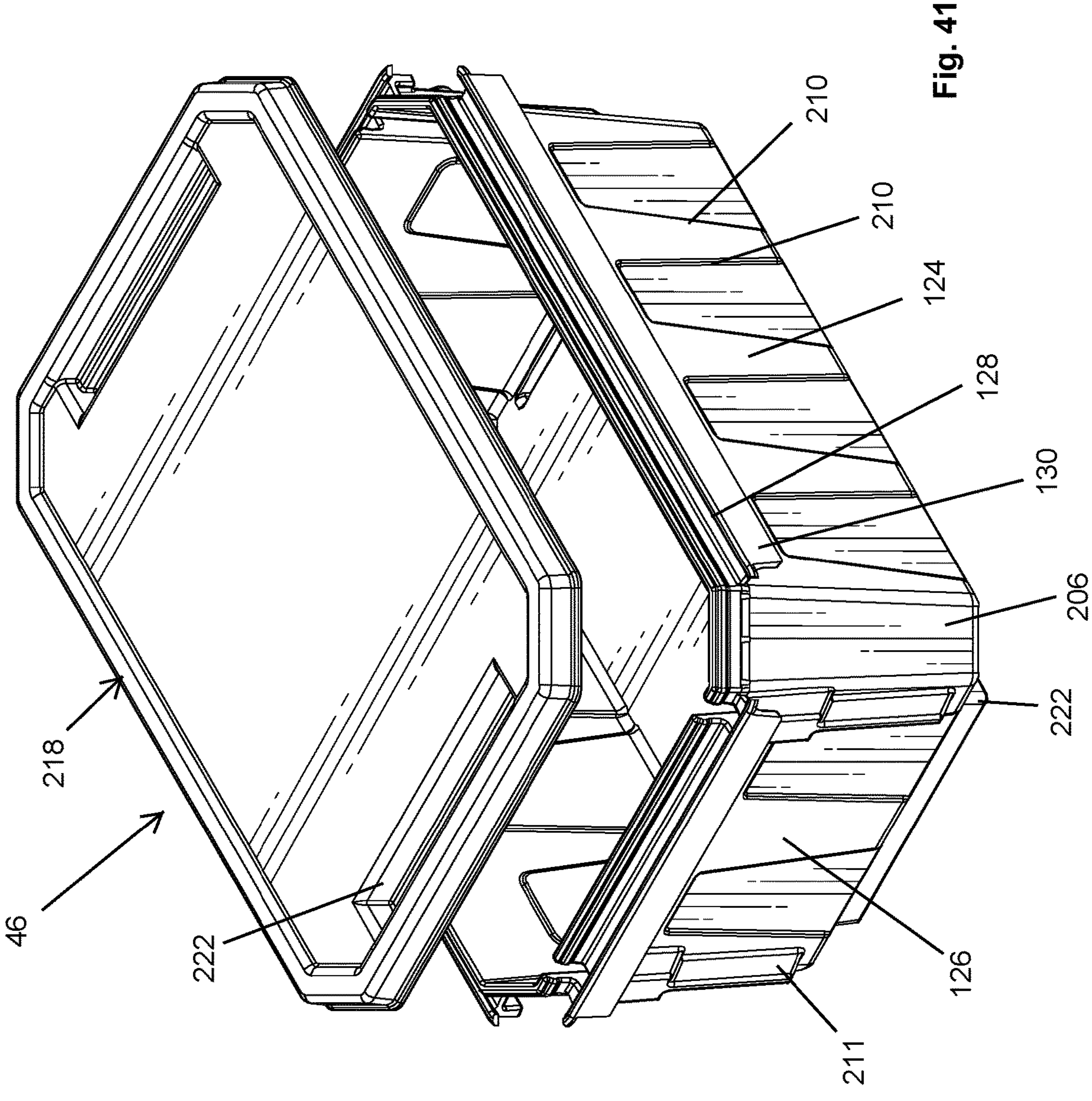
FIG. 41 is perspective view of a small container shown in FIG. 33 that has a lip that is configured to engage the step and recess in the edge of a benchtop of the mobile project center shown in FIG. 1; the view showing the removable corner sections removed to as to expose the channel that extends along the sides of the small container.
Figure 42:
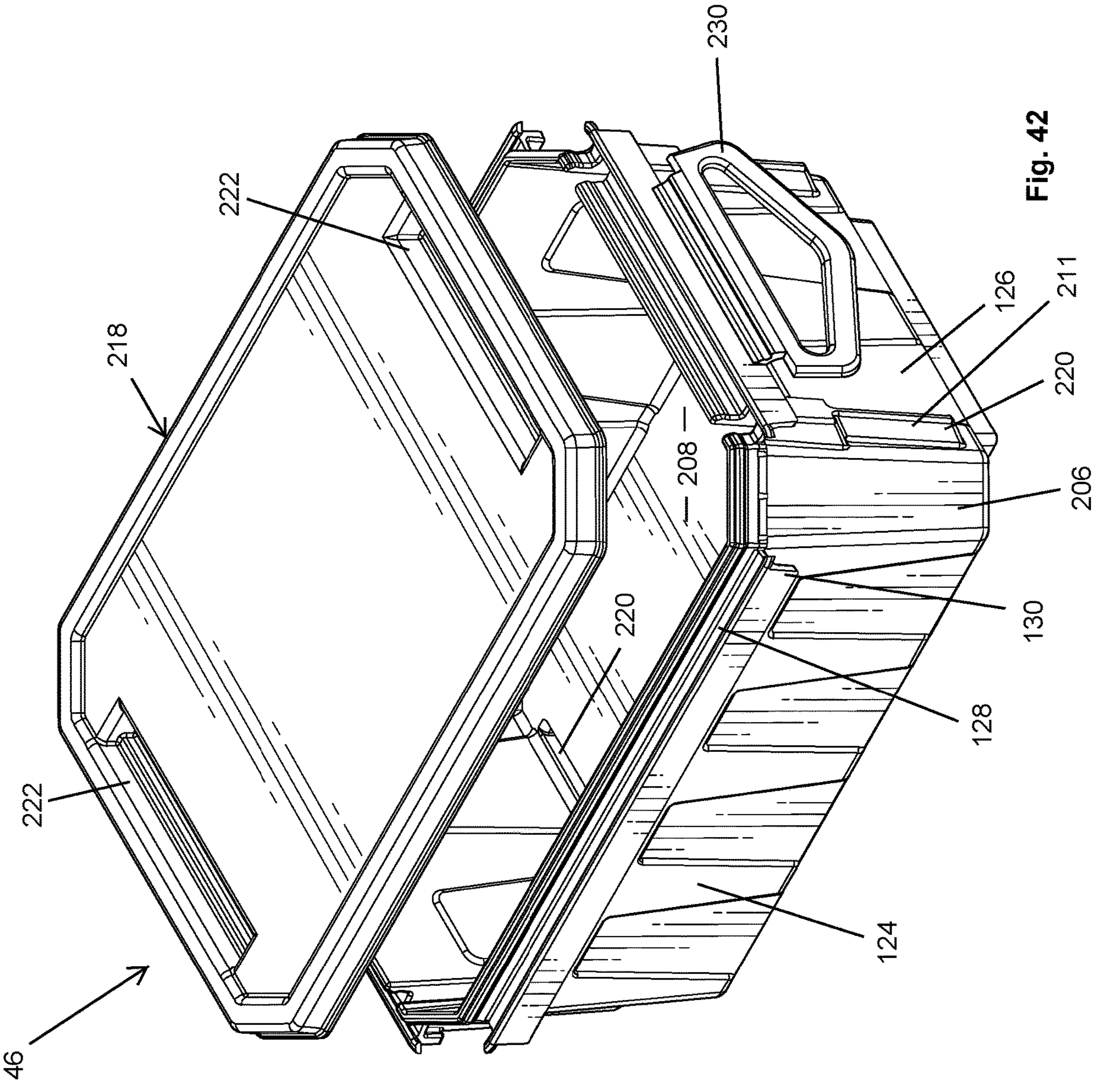
FIG. 42 is another perspective view of a small container shown in FIG. 33 that has a lip that is configured to engage the step and recess in the edge of a benchtop of the mobile project center shown in FIG. 1; the view showing the removable corner sections removed to as to expose the channel that extends along the sides of the small container.
Figure 43:
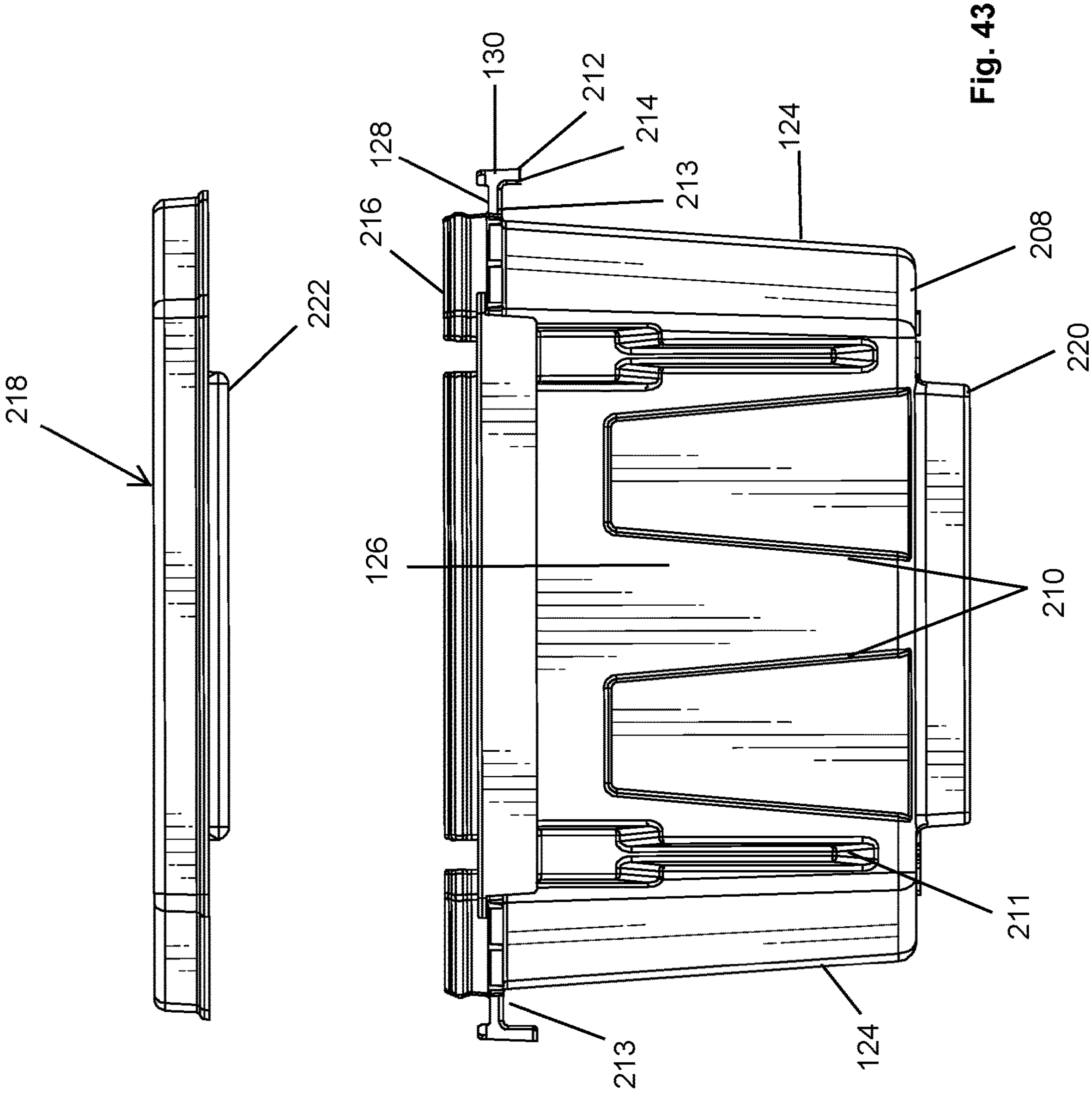
FIG. 43 is an elevation view of an end of a small container shown in FIG. 33 that has a lip that is configured to engage the step and recess in the edge of a benchtop of the mobile project center shown in FIG. 1; the view showing the removable corner sections removed to as to expose the channel that extends along the sides of the small container.
Figure 44:
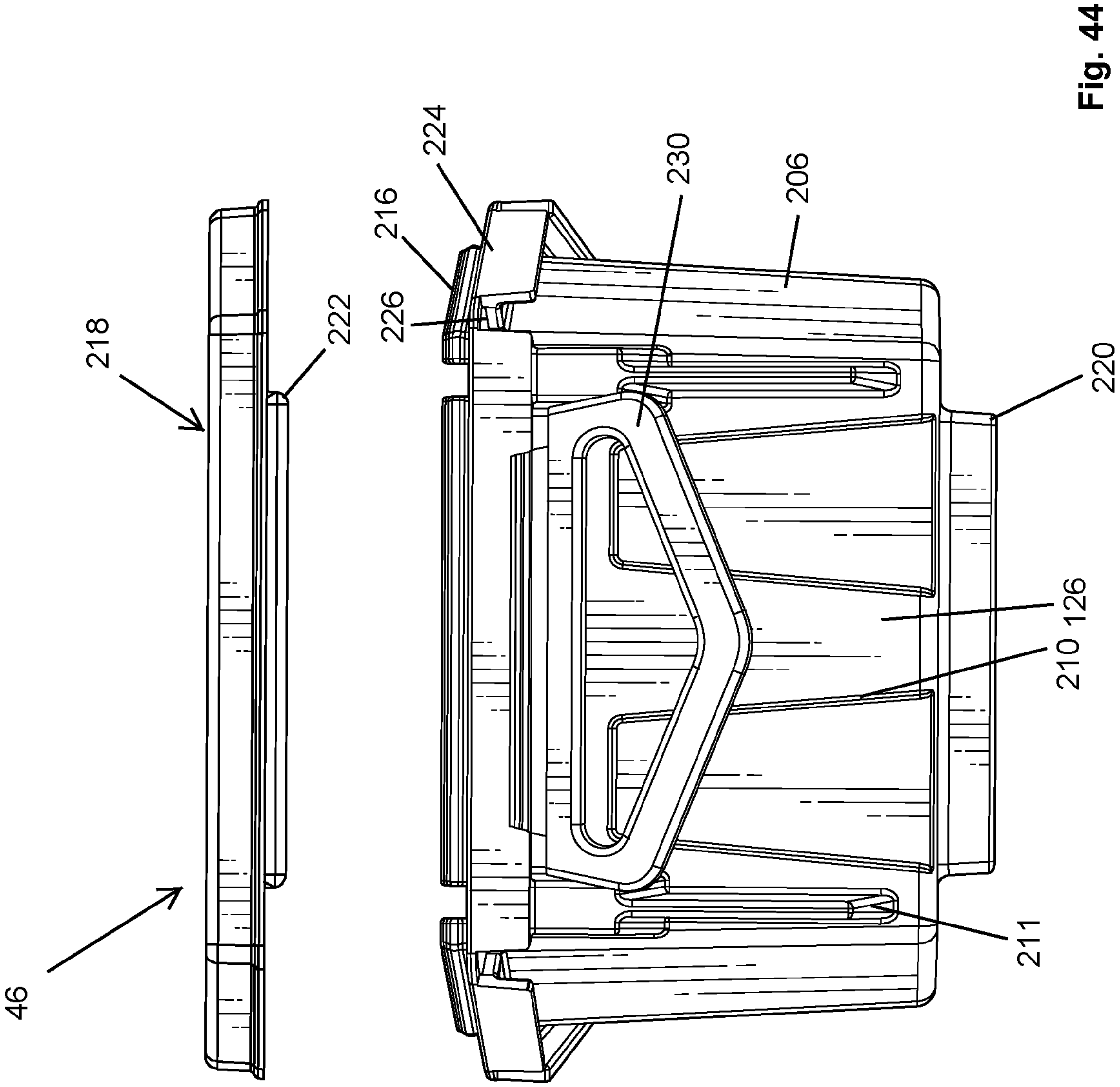
FIG. 44 is an elevation view of an end of a small container shown in FIG. 33 that has a lip that is configured to engage the step and recess in the edge of a benchtop of the mobile project center shown in FIG. 1; the view showing the removable corner sections in place and thereby covering the ends of the channel that extends along the sides of the small container.
Figure 45:
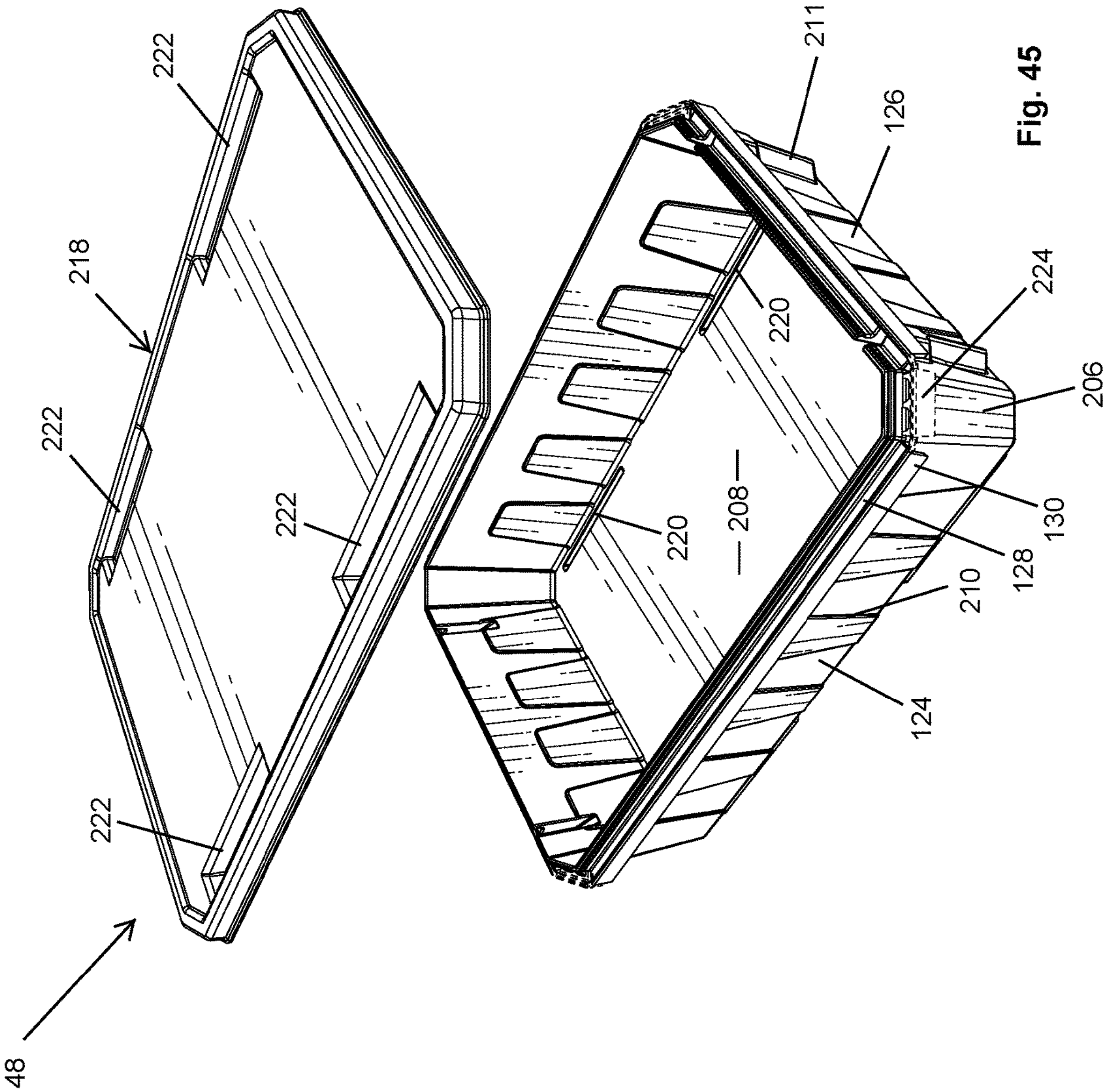
FIG. 45 is a perspective of a medium container that has a lip that is configured to engage the step and recess in the edge of a benchtop of the mobile project center shown in FIG. 1; the view showing the medium container being approximately twice the size as the small container shown in FIG. 33; the view showing the cover having a pair of sockets along each side and the bottom wall having a pair of corresponding feat along each side that correspond in size, shape and position to those present in a small container.
Figure 46:
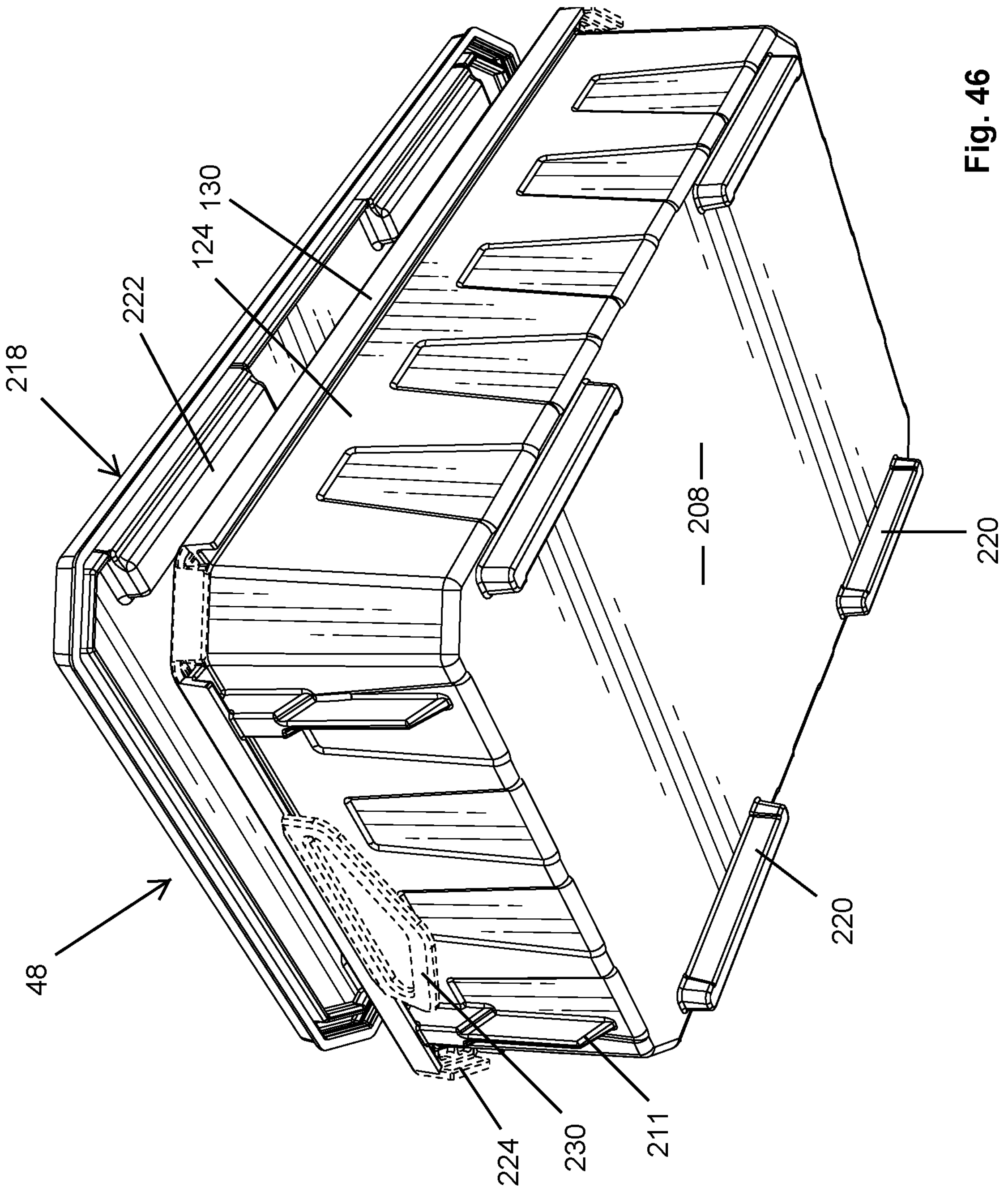
FIG. 46 is another perspective of a medium container shown in FIG. 45 that has a lip that is configured to engage the step and recess in the edge of a benchtop of the mobile project center shown in FIG. 1.

Side to Side Connectability—Sacrificial Work Surface:

With reference to FIG. 18, when an extended work surface is needed, two systems 10 may be used by connecting support bracket 40 in each center support 24 by inserting tabs 162 of support bracket 40 into the slots 160 of center support 24. Next, the two systems 10 are positioned at adequate spacing to one another and aligned in side 18 to side 18 alignment and a support board 270, such as a conventional 2×4, 2×6 or other board is placed in the channel formed between the exterior surface of center support 24 and the upper surface of upper wall 164 and the inward surface of outward wall 168 of support bracket 40. Once in this position, support board 270 may be affixed to the support bracket 40 by passing a fastener, such as a screw, through one or both of the openings 170 in support bracket 40. Also, a sacrificial board 272 may be connected to the upper surface 66 of center track 20 to cover the upper surface of center track 20 by connecting one or more fasteners 274 that fit within T-slot 60 to sacrificial board 272 and sliding these fasteners 274 within the T-slot 60.

Once support boards 270 and sacrificial boards 272 are attached, an extended work surface 276 is placed on top of the support boards 270 and sacrificial boards 272, such as a 4×8 sheet of plywood or the like. Once extended work surface 276 is in place on support boards 270 and/or sacrificial boards 272 the extended work surface 276 may be affixed in place to the sacrificial boards 272 and/or support boards 272 by adhesive or by screwing, bolting or the like manner or method. In this way, two systems 10 are used to quickly and easily form an extended work surface 276.

Joinery Block:

In one arrangement, a joinery block 50 includes a main body 280 that includes posts 282 (not shown) protruding from its lower surface that are sized and spaced to fit within two openings 84 in the benchtop 22. When in position in benchtop 22, joinery block 50 is used to align workpieces 148 thereon. In one arrangement, main body 280 includes steps 284 on each side of main body 280 that are at specified heights that are useful in various operations. In one arrangement, wherein a step 284 is positioned on each side of main body 280, the steps 284 are at different heights. In one arrangement, each step 284 is slightly less than a standard thickness of a standard workpiece 148, so as to facilitate sanding the upper surface of the workpiece 148 without engaging the joinery block 50. Standard thicknesses may include 1 inch, ¾ of an inch, or ½ of an inch, meaning that the thickness of step 284 of joinery block is slightly less than 1 inch, ¾ of an inch, or ½ of an inch, respectively.

Figure 47:
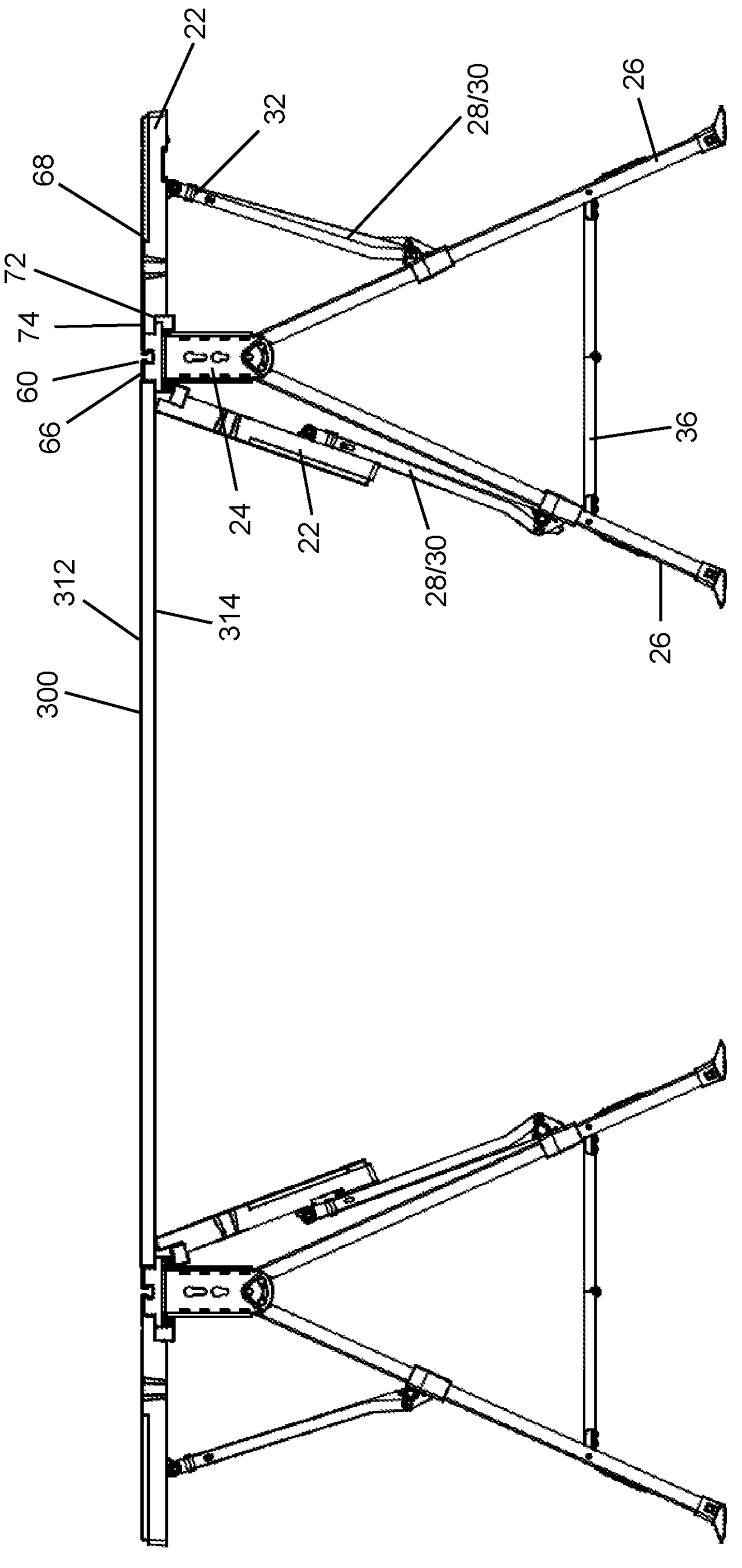
FIG. 47 is an end elevation view of a pair of mobile project centers connected in side-to-side alignment to one another by a sheet of material; the view showing the inward positioned benchtops in a retracted position and the edge of the sheet of material resting within the step of center track that is exposed by the inward benchtop being in a retracted position.
Figure 48:
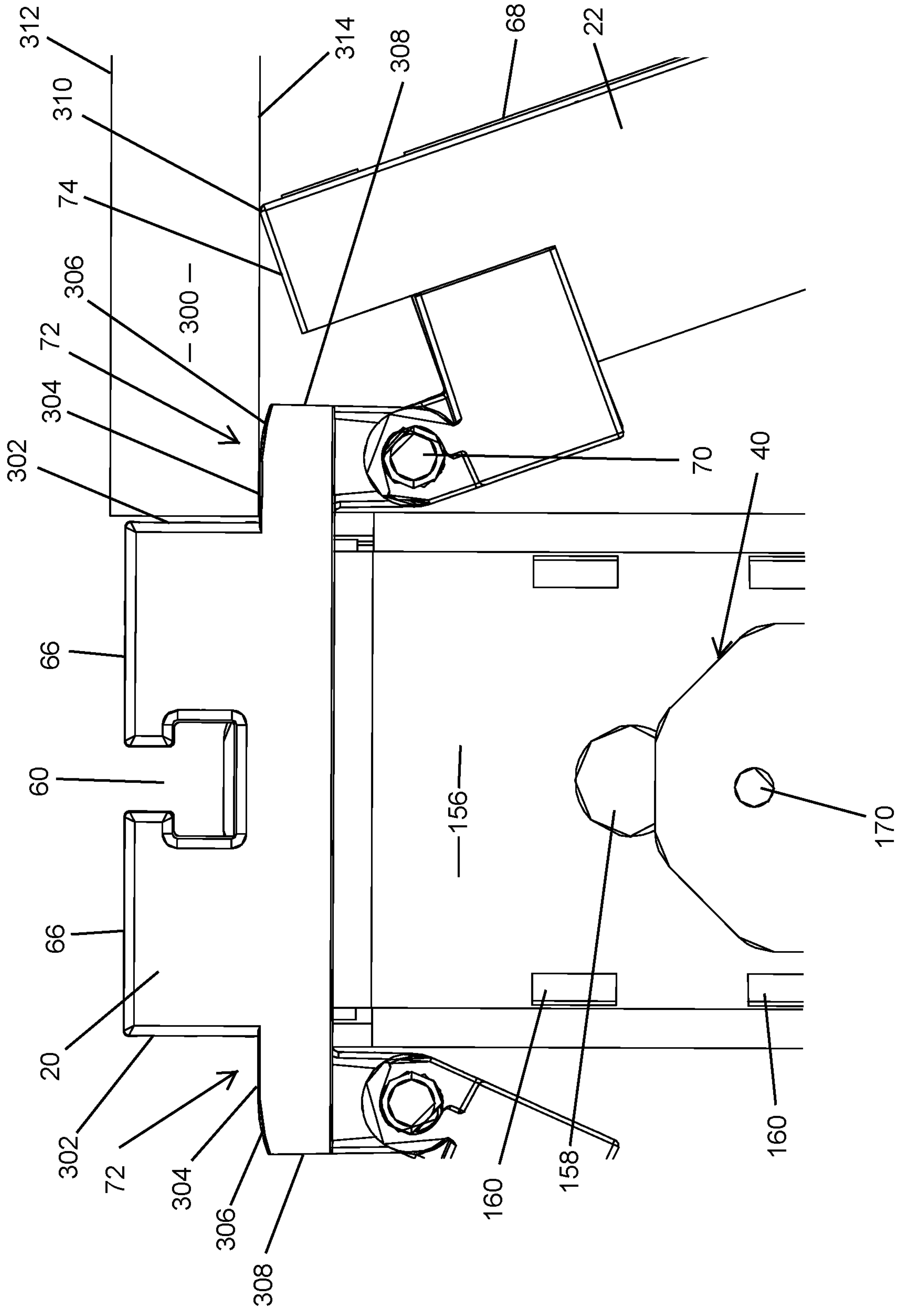
FIG. 48 is a close up elevation view of an end of mobile project center connected to a sheet of material that forms an extended work surface; the view showing the benchtops in a retracted position and the edge of the sheet of material resting within the step of center track that is exposed by the benchtop being in a retracted position.
Figure 49:
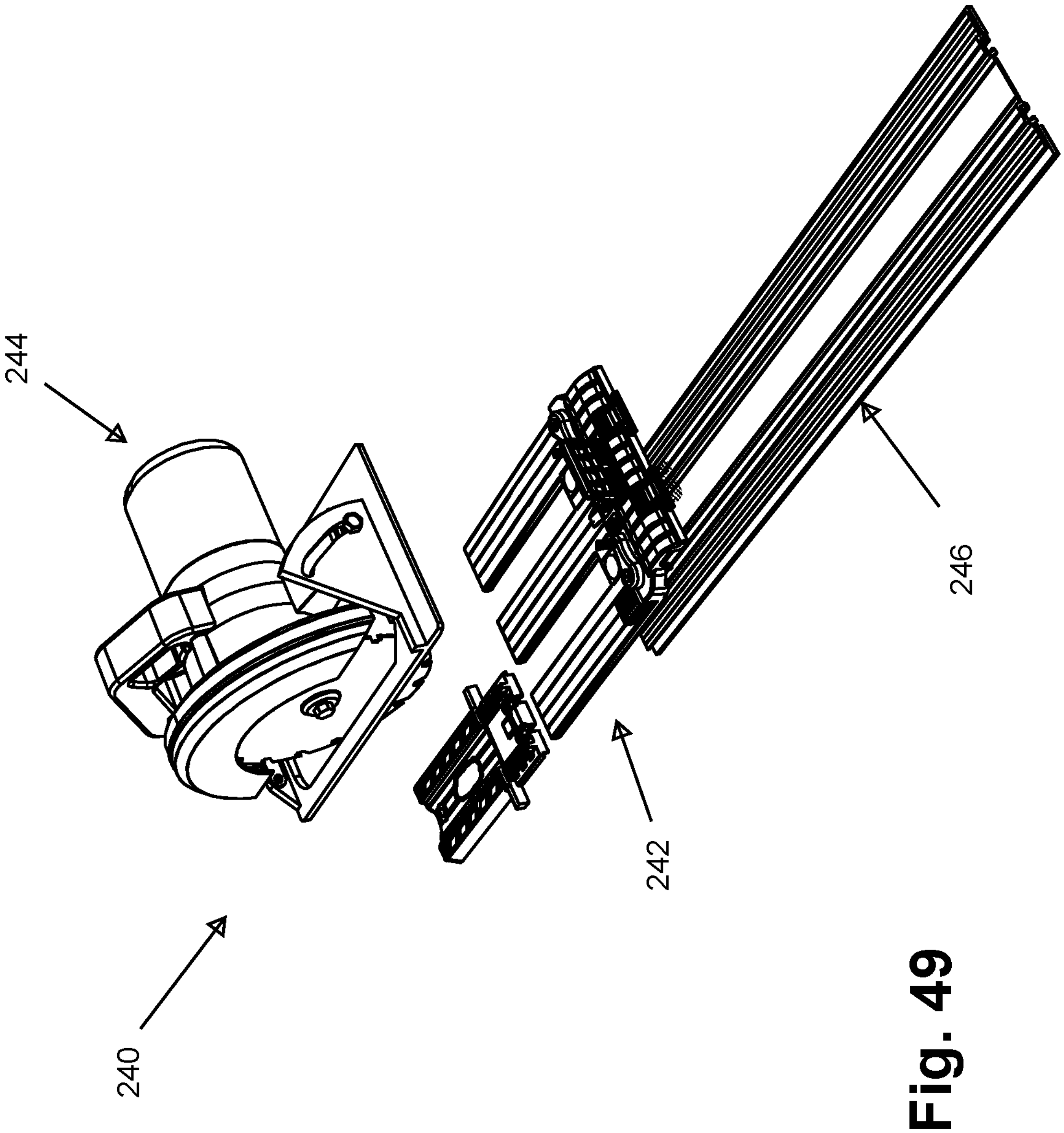
FIG. 49 is an exploded perspective view of a guided circular saw system that is used in association with the mobile project center system shown in FIG. 1; the view showing a guide, a circular saw that is to be connected to the guide, and a track that is to be used in association with the guide and circular saw.
Figure 50:
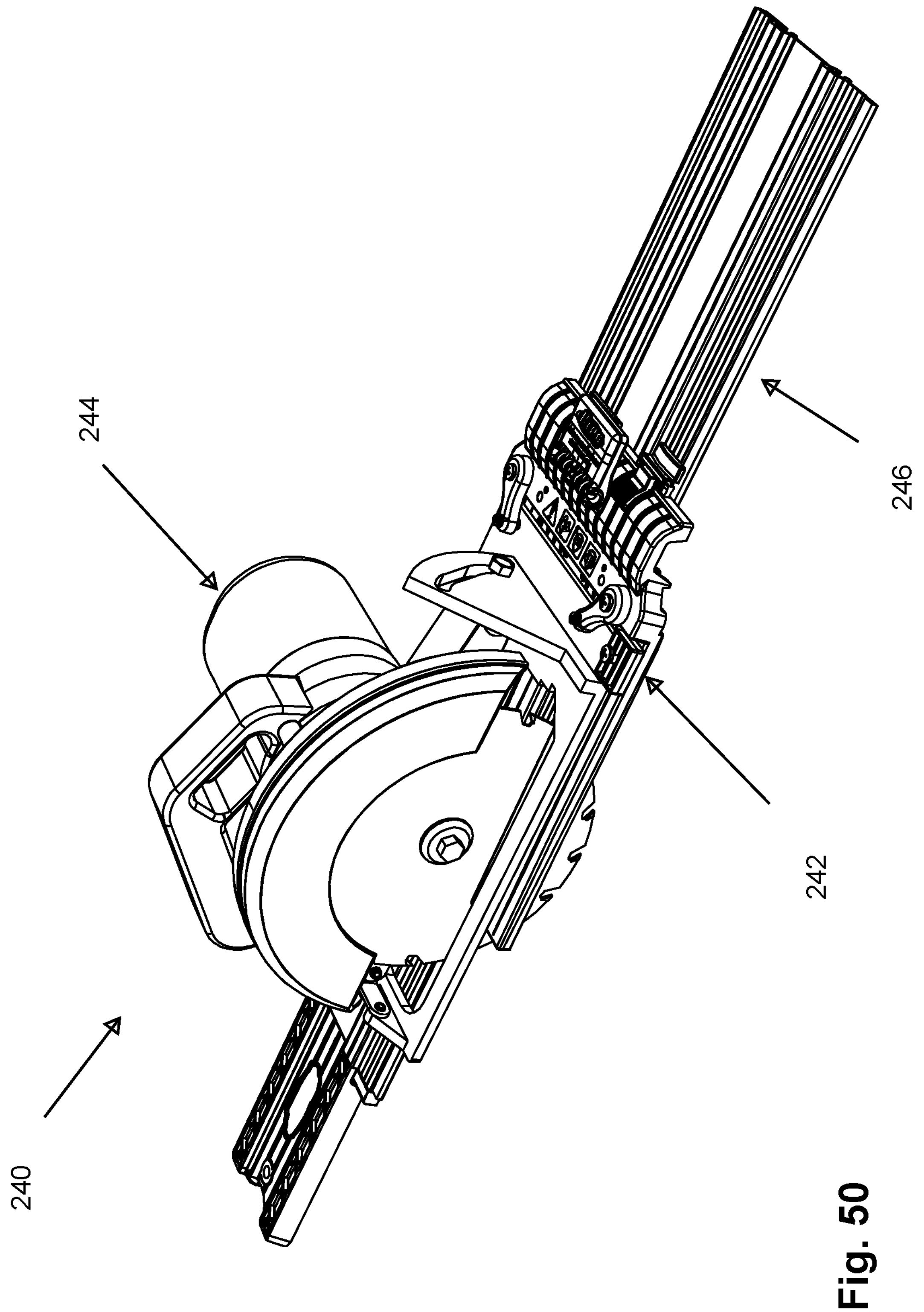
FIG. 50 is an perspective view of the assembled guided circular saw system shown in FIG. 49 that is used in association with the mobile project center system shown in FIG. 1; the view showing a guide, a circular saw that is to be connected to the guide, and a track that is to be used in association with the guide and circular saw.
Figure 51:
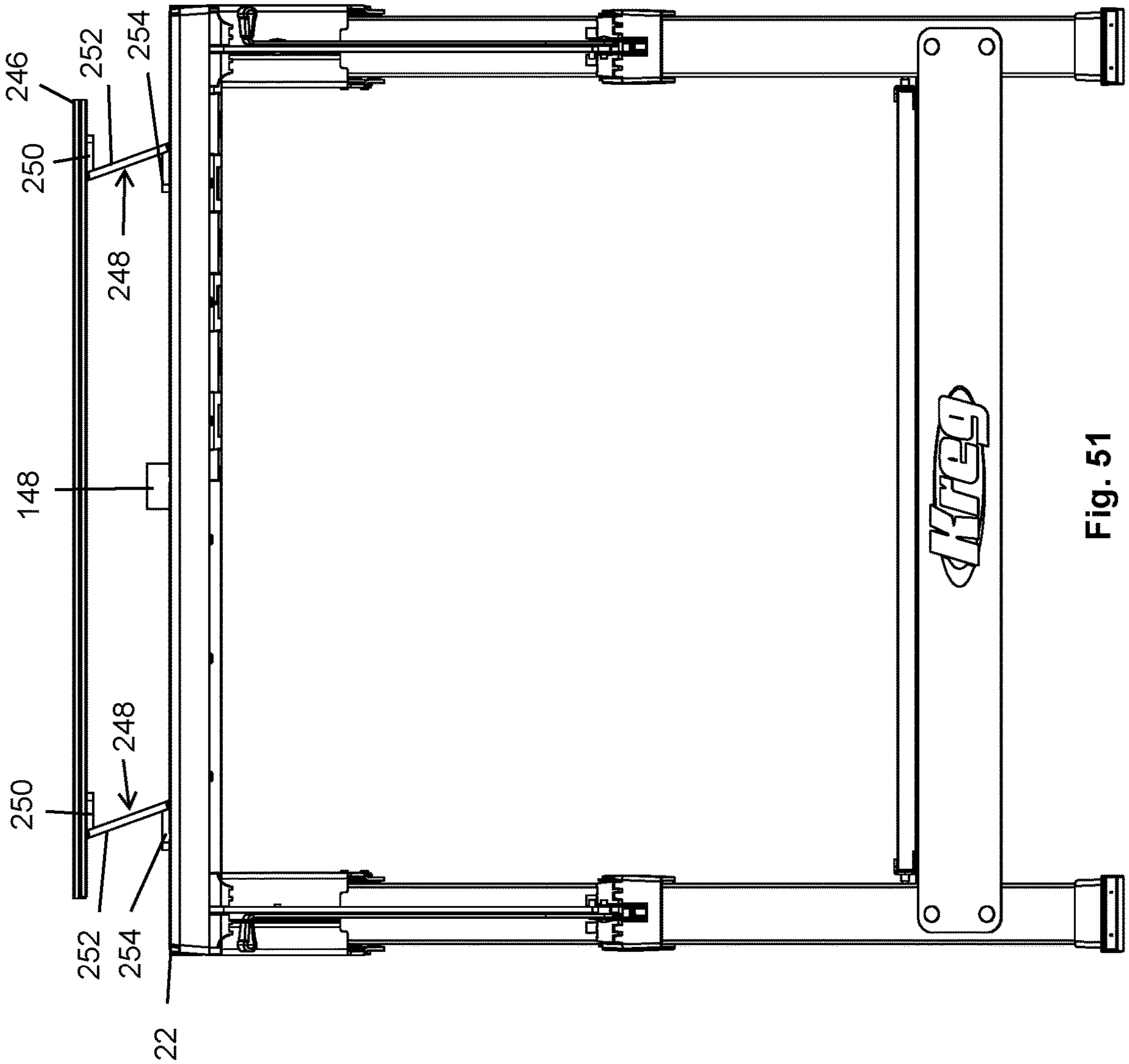
FIG. 51 is an elevation view of a side of the mobile project center shown in FIG. 1; the view showing the track shown in FIG. 49 attached to the center track of the mobile project center system by a pair of hinges connected adjacent the ends of the track; the view showing the track in a fully elevated and over-center position; the view showing a workpiece positioned under the track.
Figure 52:
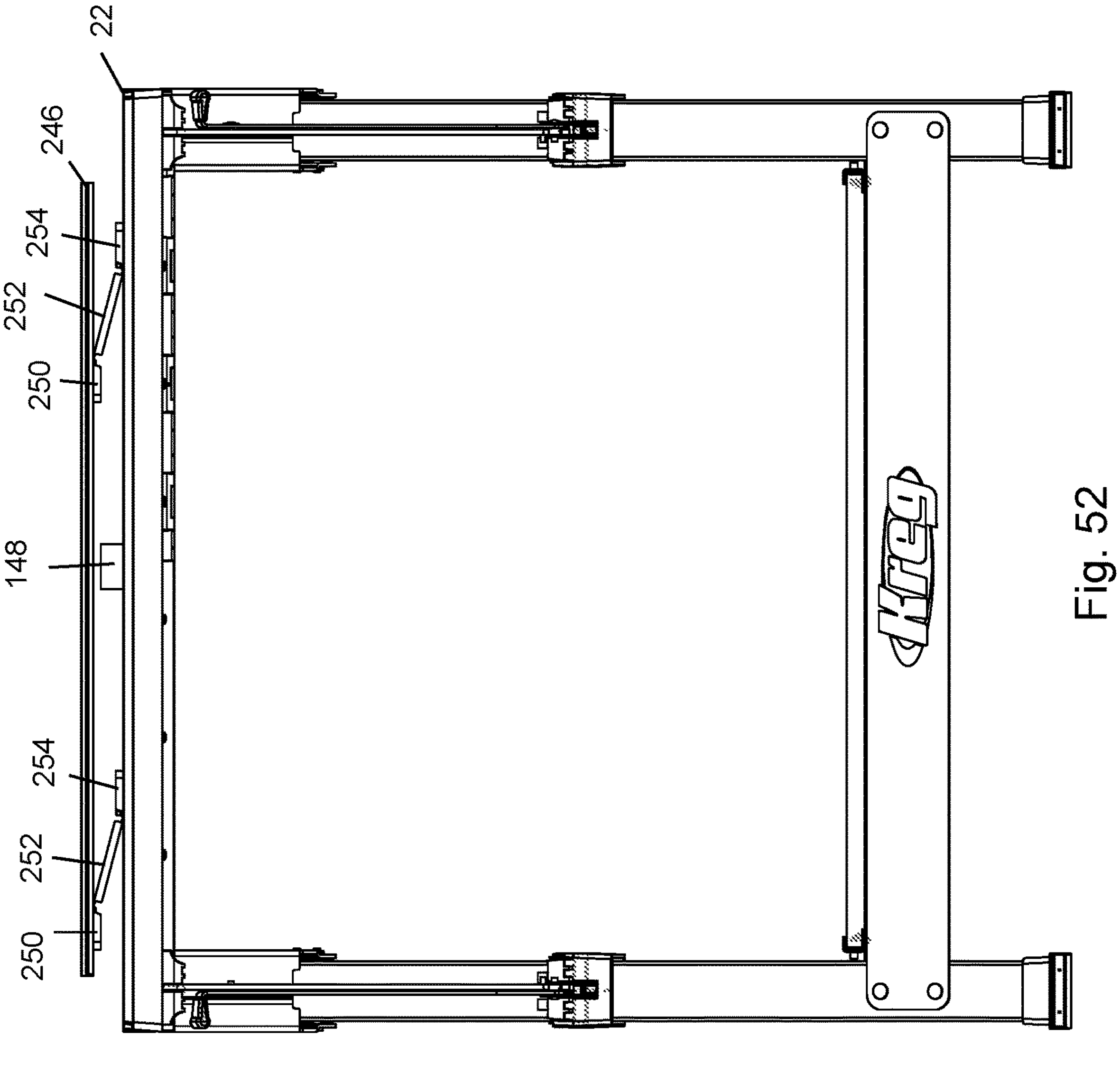
FIG. 52 is a similar elevation view to that shown in FIG. 51, with the difference being in this view the track is lowered onto the workpiece.
Figure 53:
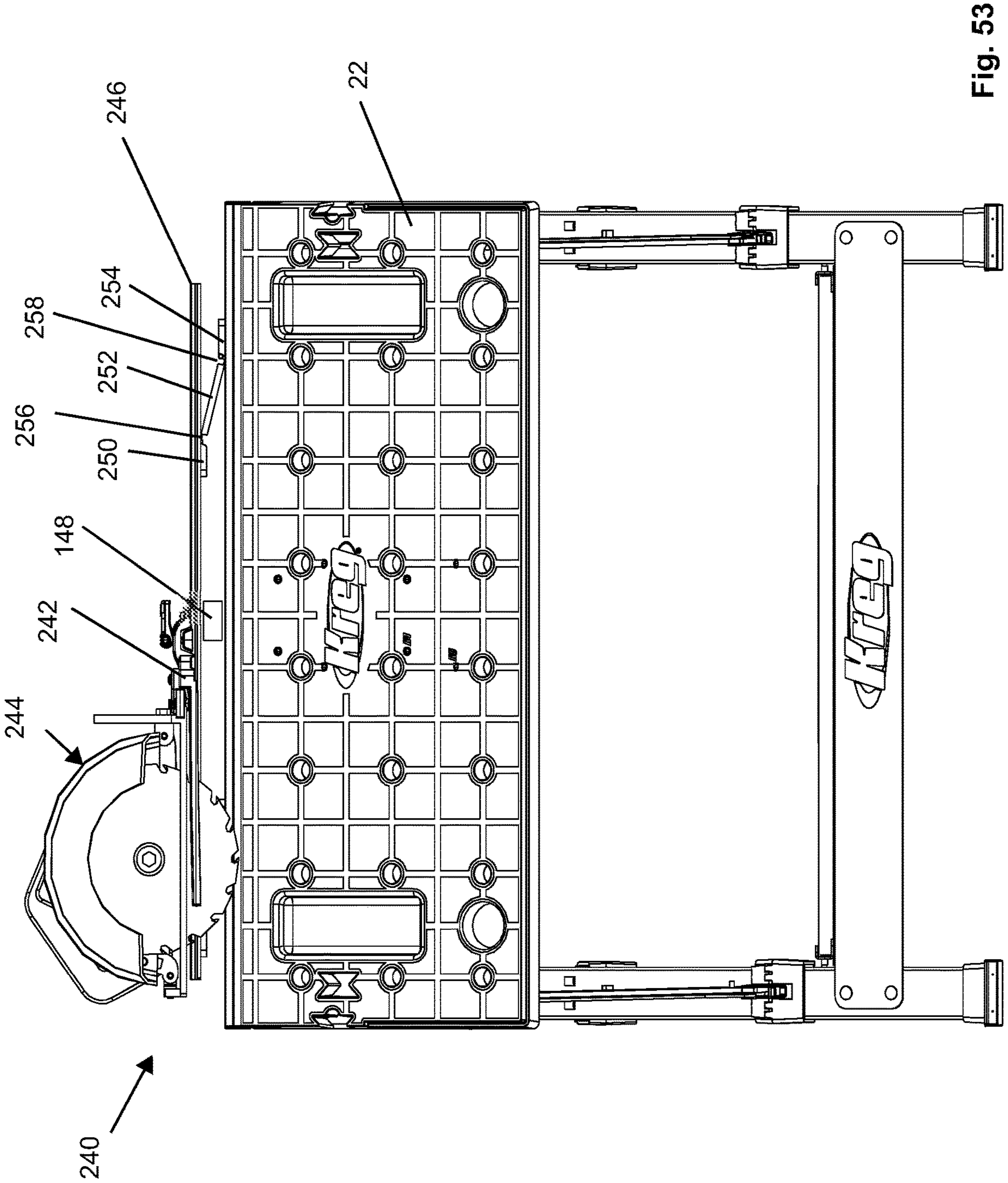
FIG. 53 is a similar elevation view to that shown in FIG. 52, with the difference being in this view the circular saw and guide are placed on the track; the view also showing a benchtop in a retracted position; the view also showing the blade extending down from the circular saw prior to cutting the workpiece.
Figure 54:
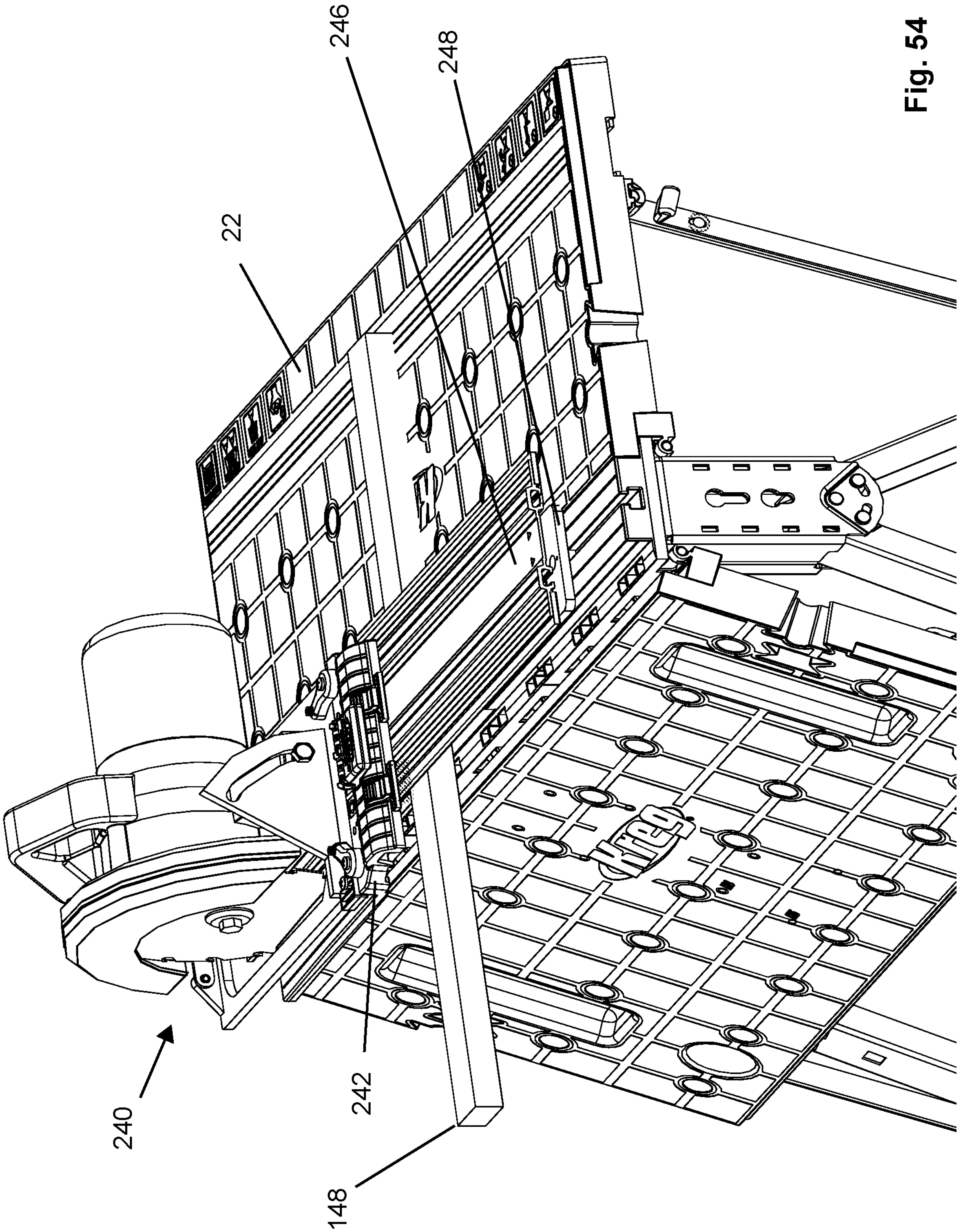
FIG. 54 is a perspective view of the arrangement shown in FIG. 53.
Figure 55:
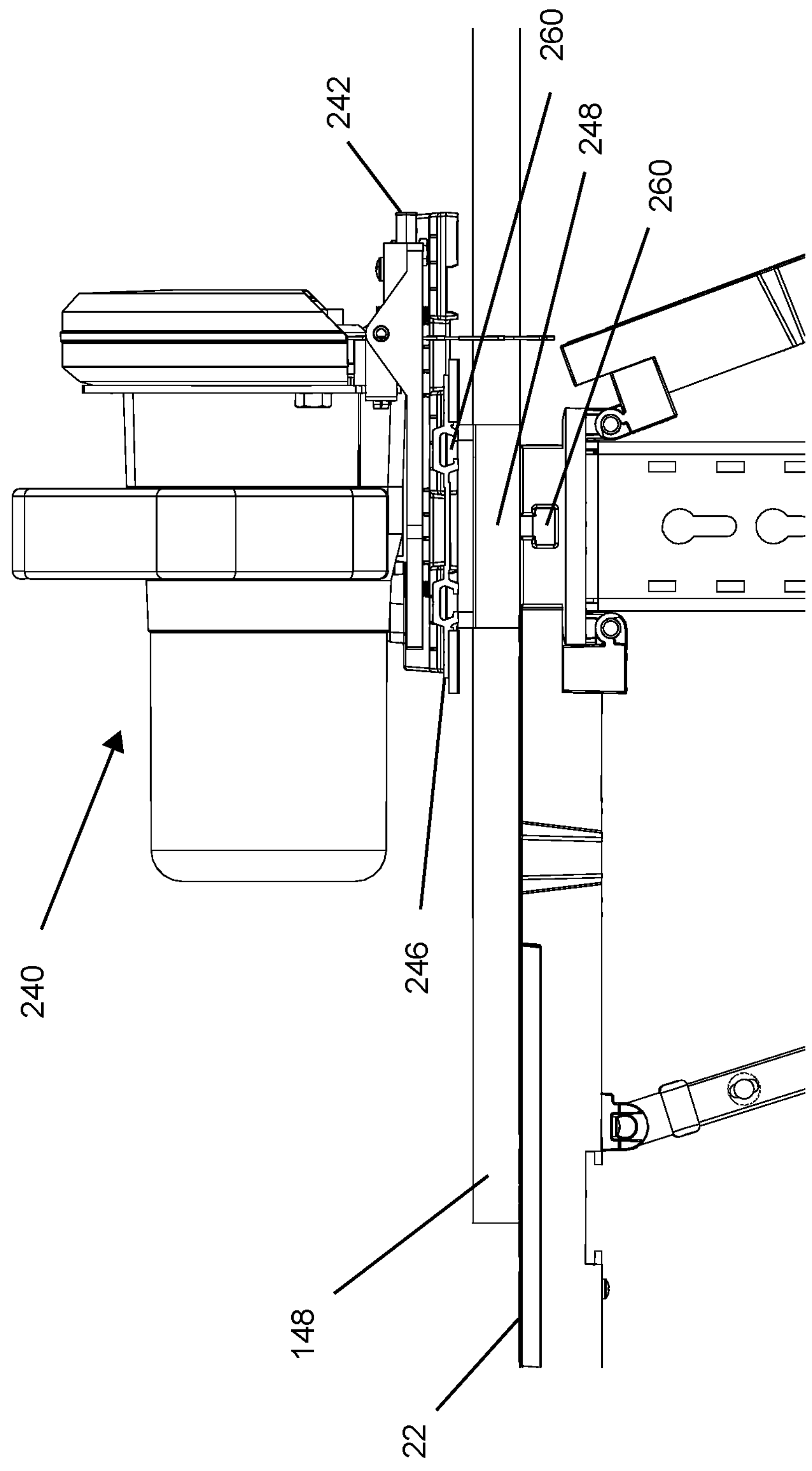
FIG. 55 is a rear elevation view of the arrangement shown in FIG. 53 and FIG. 54; the view showing the top section of the hinge connected to slots of the track by fasteners and the bottom section of the hinge connected to the slot of the center track by a fastener.
Figure 56:
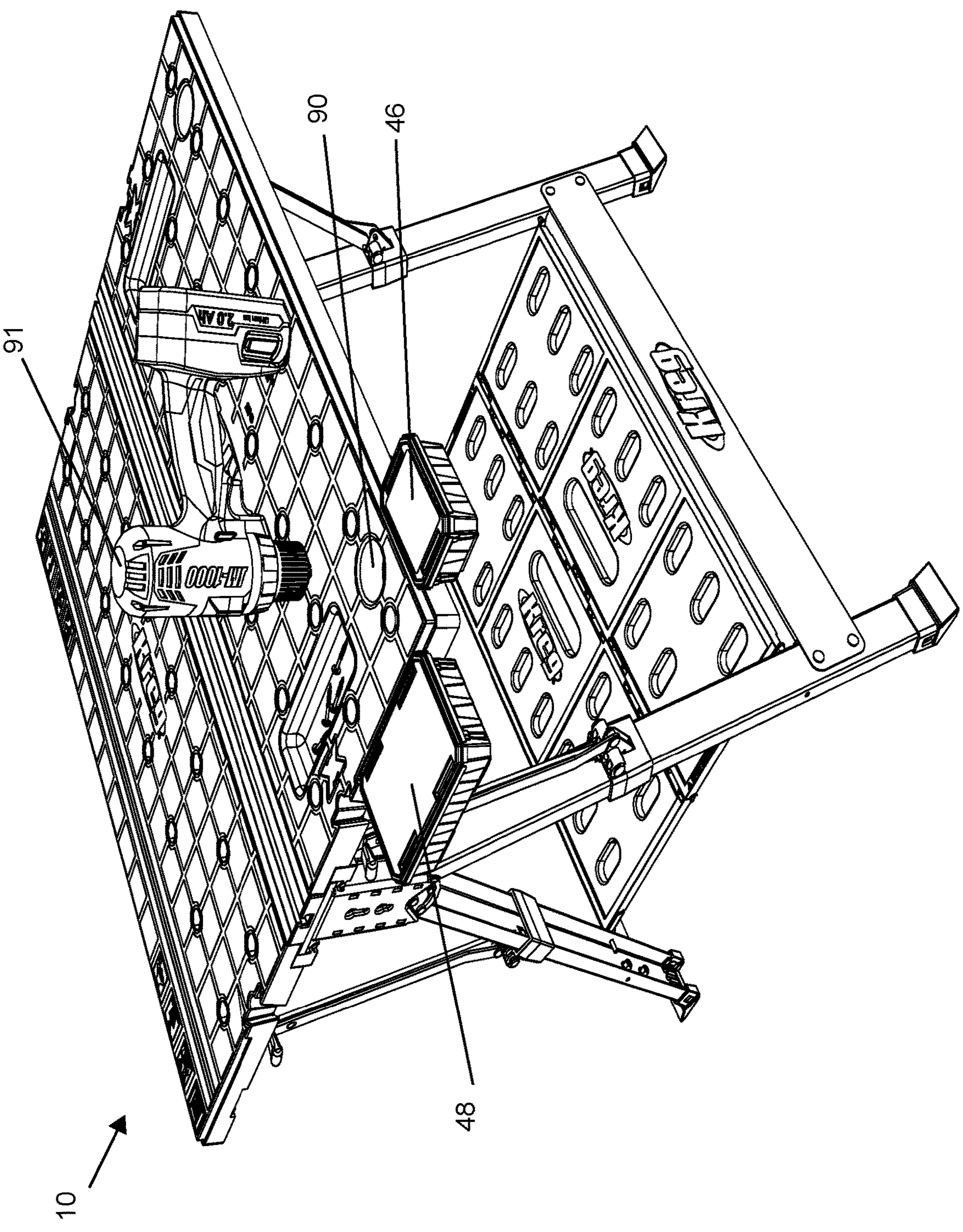
FIG. 56 is a perspective view of the mobile project center system shown in FIG. 1; the view showing a medium container connected to the slot on the end edge of a benchtop and a small container connected to the slot on the outward edge of a benchtop; the view showing a drill about to be inserted within the drill holster opening in the benchtop.
Figure 57:
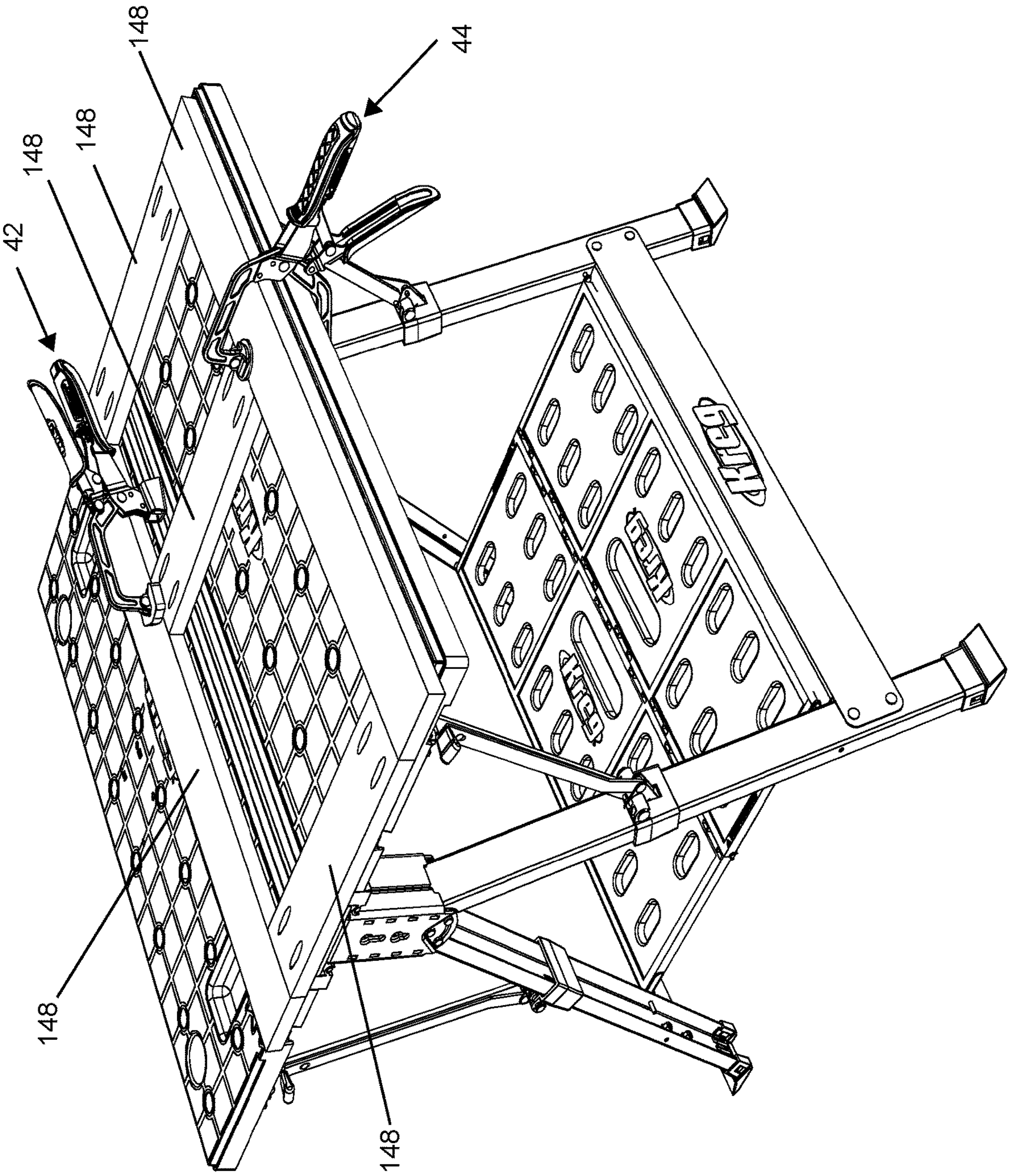
FIG. 57 is a perspective view of the mobile project center system shown in FIG. 1; the view showing a plurality of workpieces arranged on the upper surface of the benchtop; the view showing a bench clamp connected to the slot of the center track by insertion of an anchor therein; the view showing the bench clamp applying a force perpendicular to the surface of the benchtop at the intersection of two adjacent workpieces; the view showing a project clamp connected to a slot in the lower surface of the benchtop; the view showing the project clamp applying a force perpendicular to the surface of the benchtop at the intersection of two adjacent workpieces; this view shows the simultaneous use of bench clamps and project clamps with the mobile project center system to facilitate quick and easy clamping.

Side-By-Side Connectability—Extended Flush Work Surface:

With reference to FIG. 47 and FIG. 48, when an extended work surface is needed, two systems 10 may be used together by placing a sheet of material 300 between the two systems 10. This may be accomplished by placing the two systems 10 a distance apart from one another in side 18 to side 18 orientation. In this arrangement, each of the systems 10 have their legs 26 spread apart and the inward-positioned benchtop 22 in a lowered position and the outward-positioned benchtop 22 in a raised position.

When the benchtops 22 are in a raised or extended position, the upper surface 68 of the benchtop 22 is in an approximately flat and flush arrangement with the upper surface 66 of track 20. By moving the inward-positioned benchtop 22 to the lowered position, this exposes the step 72 in or adjacent to track 20. This also exposes the inward edge 74 of benchtop 22. The step 72 and the inward edge 74 of benchtop 22 serve to receive an edge of sheet of material 300 and provide support to the sheet of material 300.

More specifically, when the inward-positioned benchtop 22 is lowered, this exposes the step 72 of track 20. In the arrangement shown, as one example, the step 72 is formed of a vertical face 302 that connects at its upper edge at the outward edge of upper surface 66, and at its lower edge at the inward edge of horizontal face 304. Vertical face 302 and horizontal face 304 are positioned in approximate perpendicular alignment to one another, with vertical face 302 in approximate perpendicular alignment with the upper surface 66. In the arrangement shown, as one example, the outward end of horizontal face 304 includes a curved section 306 that curves or angles slightly downward as it extends outward before connecting to second vertical face 308. Second vertical face 308 extends downward in approximate parallel alignment with vertical face 302 and extends downward before connecting to hinge 70.

Step 72, or more specifically, the arrangement of vertical face 302 and horizontal face 304 serve to receive an edge of sheet of material 300 therein and provide support to the edge of the sheet of material 300. To provide additional support to sheet of material 300, when legs 26 are fully spread apart from one another (and shelf 36 is in a flat arrangement) and the inward-positioned benchtop 22 is in a folded position, the inward edge 74 of benchtop 22 serves as an additional point of support for the sheet of material 300. That is, when legs 26 are spread and benchtop 22 is folded the corner 310 positioned at the intersection of inward edge 74 of benchtop 22 and the upper surface 68 of benchtop 22 is positioned in approximate alignment with the plane formed by the flat section of vertical surface 304. As such, when an edge of a sheet of material 300 is placed within step 72, corner 310 provides support to sheet of material 300 outward a distance from the edge of sheet of material that is held within step 72.

This arrangement provides greater strength and rigidity to the connection and helps to reduce the deflection of the sheet of material 300. In the arrangement shown, step 72 and corner 310 of benchtop 22 extend from end 16 to end 16 thereby providing support across the width of system 10. Also, while corner 310 is shown as a conventional ninety-degree corner, it is hereby contemplated that corner 310 may be chamfered, have a plane to it, or have an extended surface that provides additional surface area of support for sheet of material 300.

In one arrangement the depth of step 72 is approximately equal to or slightly less than the thickness of conventional materials. That is, in one arrangement, the depth of step 72, or more specifically the vertical height of vertical face 302 is approximately equal to the thickness of sheet of material 300 such that when the sheet of material 300 is positioned within the step 72 the upper surface 312 of sheet of material 300 is approximately flush with or just slightly above or just slightly below the upper surface 66 of track 20. Therefore, as the upper surface 68 of benchtop 22 is in approximate flat and flush alignment with the upper surface 66 of track 22, the upper surface 68 of the benchtop 22 on the opposite side of track 22 from sheet of material 300 is in approximate flat and flush alignment with the upper surface 312 of sheet of material 300.

In one arrangement, as an example, as is shown, sheet of material 300 is a ¾ inch sheet of plywood or pressboard or other material, and the height of step 72 is matched accordingly. ¾ inch material is desirable because it is readily available, is relatively inexpensive and is rigid and resists deflection and therefore it is desirable. However any other thickness of material is hereby contemplated for use such as 1 inch, ½ inch, ¼ inch or any other thickness.

In one arrangement, an extended work surface is provided by simply placing the edges of sheet of material 300 in steps 72 in spaced systems 10. While effective, the longer the distance between systems 10 the greater the potential for sheet of material 300 to sag or bow between systems 10. To alleviate this problem, support brackets 40 and support boards 270 are used, in a similar manner to that shown in FIG. 18 and described herein with respect to the side-to-side connectability and the sacrificial work surface. In this arrangement, however a lower slot 160 is selected in center supports 24 for support brackets 40 such that the upper edge of support boards 270 are in approximate flat and flush alignment with the lower surface 314 of sheet of material 300.

In this arrangement, when sheet of material 300 is placed in steps 72 the lower surface 314 of sheet of material rests upon the upper surface of support boards 270. In this way, support boards 270 provide support to sheet of material 300 along the distance between spaced systems 10. In one arrangement, slots 160 are provided at particular spacing such that when conventional materials such as a 2×4 or 2×6 is used for support boards 270 the upper edge of support board 270 is in approximate parallel, flat and flush alignment with the plane of horizontal face 304 of step 72, or said another way, the upper edge of support board 270 is in approximate parallel, flat and flush alignment with lower surface 314 of sheet of material 300.

When sheet of material 300 is placed upon support boards 270, sheet of material can be affixed to support boards 270 by adhesive, screwing, bolting or the like thereby connecting the components together as is described herein. In addition, the support boards 270 may be affixed to the support brackets 40 by screwing, bolting or the like thereby connecting the components together as is described herein.

To provide additional support, strength and rigidity to this arrangement, the opposing laterally-extending support boards 270 that are connected to support brackets 40 are connected to one another by additional support boards 270. These cross-support support boards 270 may be placed in a grid-like pattern, or any other arrangement, that connects the opposing laterally-extending support boards 270. In one arrangement, the cross-support support boards 270 are positioned such that their upper surface is in a flat and flush alignment with the upper surface of the laterally-extending support boards 270 such that all the support boards 270 (the laterally-extending support boards 270 as well as the cross-support support boards 270) have their upper surface in an approximate plane with one another such that when sheet of material 300 is placed thereon, the support boards 270 are in alignment with and/or engage the lower surface 314 of the sheet of material 300.

In one arrangement, the sheet of material 300 includes a grid of openings 84, that are in a pattern similar or identical to the pattern in benchtops 22 such that when the sheet of material 300 is placed on the opposing systems 10, the grid of openings 84 continues in an uninterrupted manner across both systems 10 and the sheet of material 300. This consistent spacing eliminates the need for measuring and speeds and eases many steps and operations.

While in the arrangement shown two systems 10 are shown for use, it is hereby contemplated that only a single system 10 may be used with sheet of material 300. In this arrangement, where only a single system 10 is used, the end of sheet of material 300, opposite the end connected to the single system 10 is supported by any other manner method or means.

Figure 58:
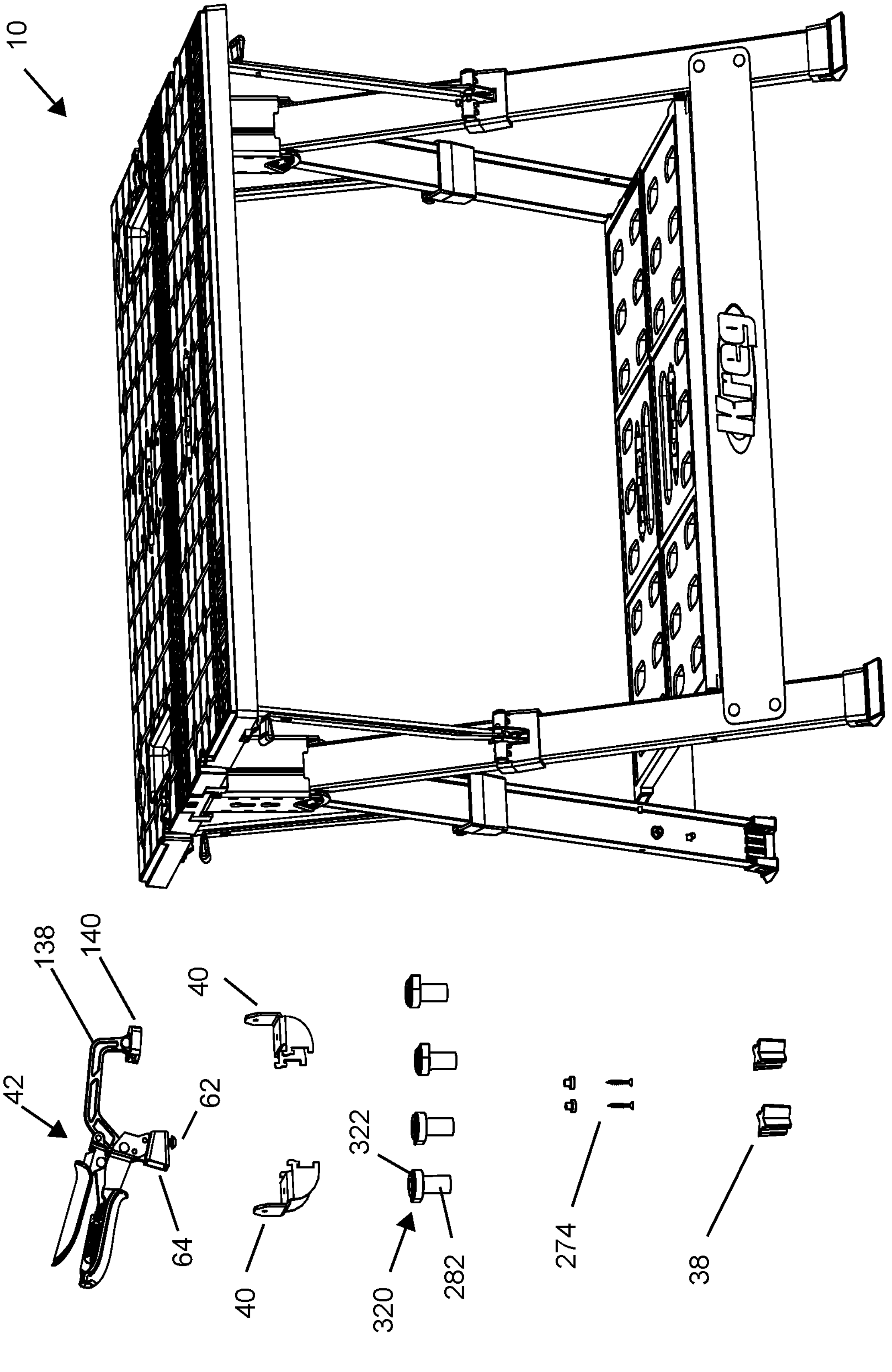
FIG. 58 is a perspective view of the mobile project center system shown in FIG. 1; the view showing a bench clamp, a pair of support brackets, four bench dog stops, a set of fasteners used to connect sacrificial boards to the center track, and a pair of connection keys that are used in association with the mobile project center system.
Figure 59:
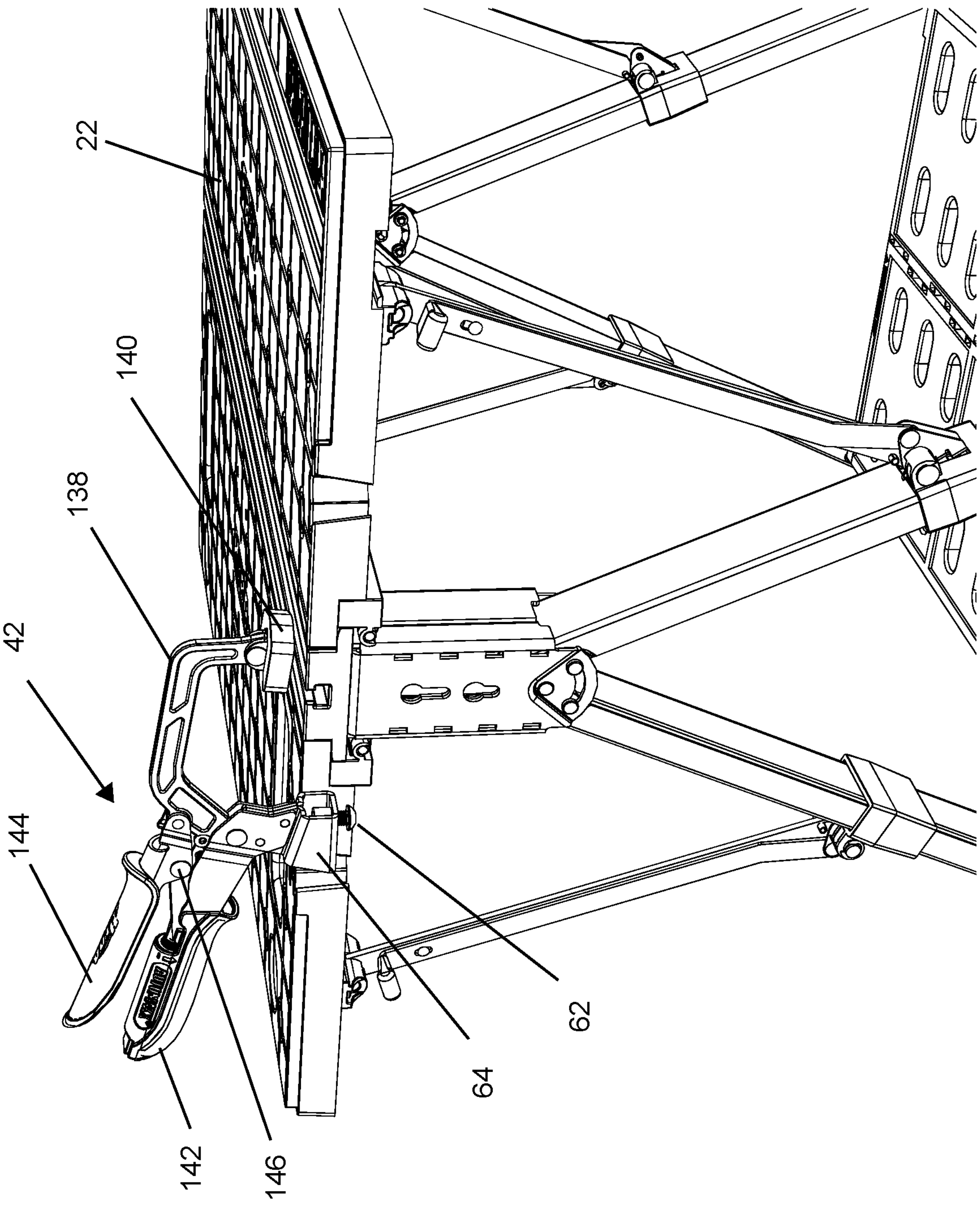
FIG. 59 is a perspective view of the mobile project center system shown in FIG. 1; the view showing a bench clamp with a block and an anchor extending out of the block; the view showing the anchor of the bench clamp about to be inserted within the slot of the center track of the mobile project center system.

Bench Dog Hole Stops:

With reference to FIG. 58, bench dog hole stops 320 are presented. Bench dog hole stops 320 are formed of any suitable size, shape and design and are configured to be received within openings 84 of benchtops 22 and serve as a stop surface for a workpiece 148. In one arrangement, as is shown, bench dog hole stops 320 include a post 282, which are similar, if not identical, to posts 282 of joinery block 50, at their lower end, which are connected to a head 322 at their upper end. In one arrangement, head 322 is wider than post 282 and as such, engagement of the head with the upper surface 66 of benchtop 22 establishes the fully inserted position of bench dog hole stop 320 within opening 84. In one arrangement, head 322 includes a flat surface that is used to engage the side of a workpiece 148. The use of bench dog hole stops 320 and with the grid of openings 84 facilitates the fast, easy and precise alignment of workpieces 148.

Figure 60:
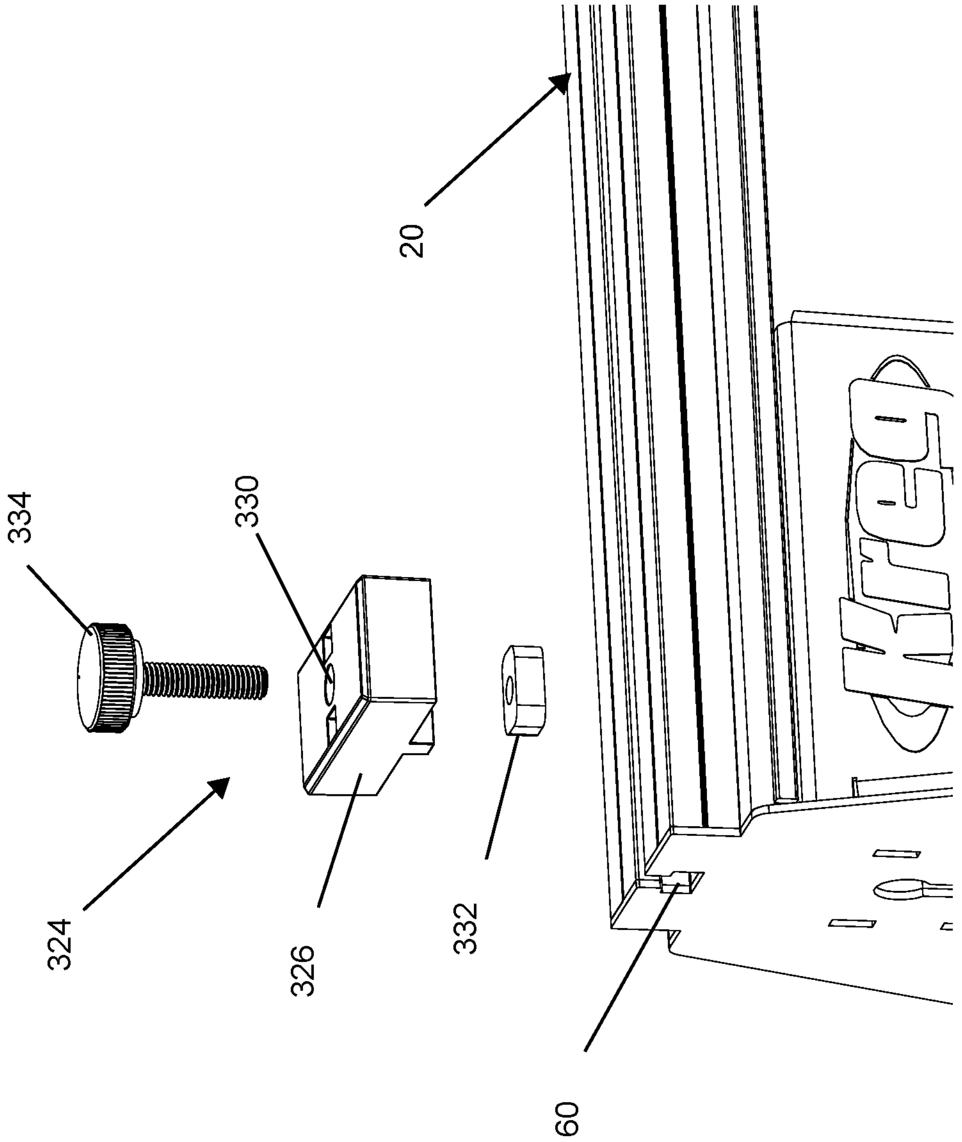
FIG. 60 is an exploded perspective view of a track block assembly that is configured to be used as a stop in the slot of the center track of the mobile project center system shown in FIG. 1; the view showing the track block assembly having a generally square or rectangular main body having a guide connected to its bottom surface and an opening extending through the main body; the view showing a slider that is configured to be received within the slot of the center track; the view showing a fastener configured to extend through the main body and fasten to the slider thereby tightening the slider against the slot of the center track.
Figure 61:
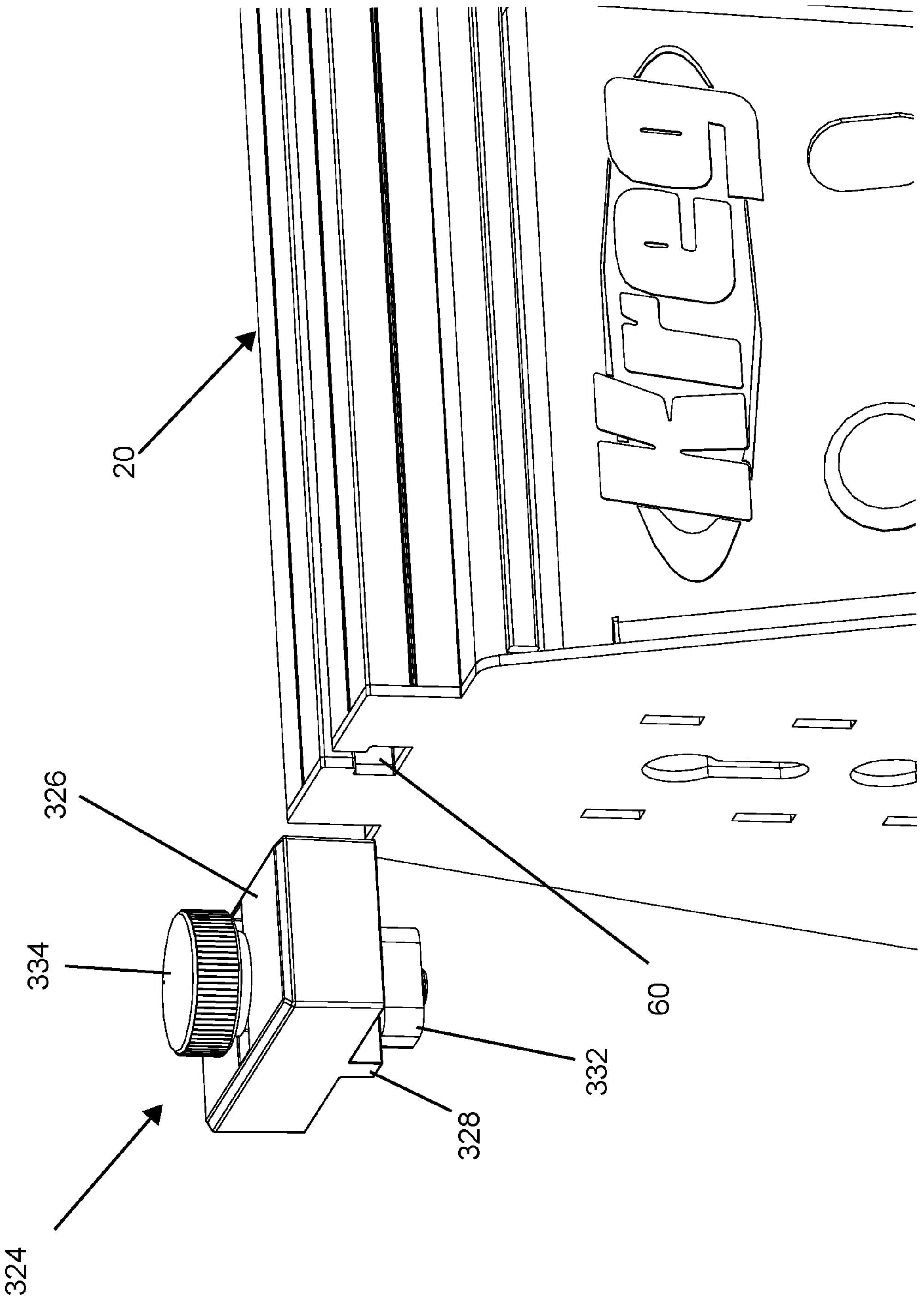
FIG. 61 is a perspective view of the track block assembly shown in FIG. 60; the view showing the track block assembly in an assembled state.
Figure 62:
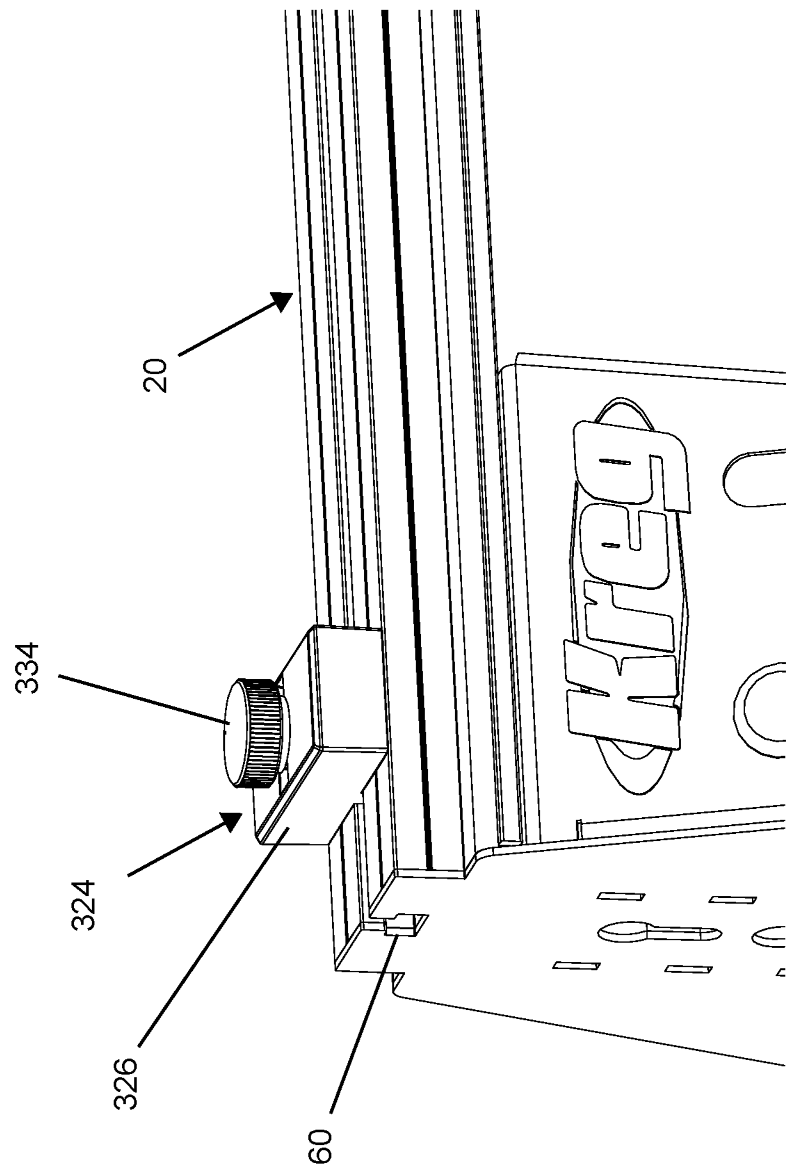
FIG. 62 is a perspective view of the track block assembly shown in FIG. 60; the view showing the track block assembly in an assembled state; the view showing the track block assembly affixed to the slot of the center track.

Track Block Assembly:

Countless accessories, other than bench clamp 42, may connect to slot 60 of center track 20. As one example, with reference to FIGS. 60-62, a track block assembly 324, also known as a stop assembly, is presented. Track block assembly 324 is formed of any suitable size, shape and design and is configured to provide a stop surface that connects to slot 60 in center track 20. In one arrangement, as is shown, track block assembly 324 includes a main body 326, having a guide 328, and an opening 330, and a slider 332 connected to the guide 328 by a fastener 334.

In the arrangement shown, as one example, main body 326 is generally square or rectangular in shape, when viewed from above or below. This square or rectangular shape provides a square stop surface upon which a workpiece 148 may be clamped or stopped.

Guide 328 provides alignment for main body 326 within the slot 60 of center track 20. In the arrangement shown, guide 328 takes the shape of a fin or protrusion that extends approximately out of the middle of the bottom surface of main body 362. In the arrangement shown, as one example, when viewed from the side, guide 328 takes the shape of a square or rectangular protrusion. Guide 328 is sized and shaped to be received within slot 60 of track 20 and extends in parallel spaced alignment to a pair of sides of main body and in perpendicular alignment to a pair of sides of main body 326. In this way, when guide 328 is within slot 60 of track 20, the exterior surfaces of main body 326 are aligned either perpendicularly to, or parallel to, the length of slot 60.

Slider 332 is configured to fit within the slot 60 of center track 20 and prevent track block assembly 324 from being detached from center track 20. In the arrangement shown, as one example, slider 332 is a generally rectangular member that slideably fits within the wider portion of slot 60 but is too large to pull through the narrower portion of slot 60. Slider 332 includes a n opening at its middle that is configured to receive an end of fastener 334 therein. As fastener 334 is tightened, slider 332 is pulled toward main body 326 thereby tightening track block assembly against slot 60 of track 20 thereby locking the track block assembly 324 in place. In the arrangement shown, fastener 334 has an enlarged head at its upper end that facilitates easy hand tightening. Once the track block assembly 324 is locked in place on center track 20, the squared and aligned sides of main body 326 serve as stop surfaces for workpieces 148.

Countless other accessories can be used and countless other operations can be performed using the multi-function system 10 presented herein. From the above discussion it will be appreciated that the mobile project center system and related method of use, presented herein improves upon the state of the art.

Specifically, the mobile project center system presented: provides improved functionality over prior art workbenches; provides improved features over prior art workbenches; provides a unique combination of features over prior art workbenches; provides a unique combination of functionalities over prior art workbenches; is easy to use; is convenient to use; is safe to use; can be manipulated into a plurality of configurations; saves time; improves accuracy; can be used with a plurality of other accessories to perform additional functions; can be quickly and easily set-up; can be quickly and easily taken down; is easily transported; is rigid; is durable; facilitates end-to-end connection of two workbenches; facilitates side-to-side connection of two work benches; can function as a sawhorse; can function as an expanded table; can function as a table with a sacrificial surface; can function as a vise; is configured to hold containers; is configured to receive a Kreg Jig; facilitates clamping; has a long useful life; is easy to manufacture; is high quality; improves efficiencies; improves the quality of products made using the system; and is fun to use, among countless other advantages and improvements.

It will be appreciated by those skilled in the art that other various modifications could be made to the device without parting from the spirit and scope of this disclosure. All such modifications and changes fall within the scope of the claims and are intended to be covered thereby.

What is claimed:

1. A workbench system, comprising;

a first benchtop;

the first benchtop having an upper surface, a lower surface and an edge;

a slot positioned in the lower surface of the first benchtop;

the slot extending a length of the first benchtop;

wherein the slot is formed of a recess in the lower surface of the first benchtop and a flange positioned along an inward edge and an outward edge of the recess thereby forming a T-slot;

a project clamp;

the project clamp having a lower clamp arm, an upper clamp arm and a clamping mechanism;

wherein when the lower clamp arm of the project clamp is engaged with the slot of the first benchtop, the project clamp is slidable along a length of the slot of the first benchtop;

wherein when the lower clamp arm of the project clamp is engaged with the slot of the first benchtop the upper clamp arm is positioned above the upper surface of the first benchtop;

wherein when the lower clamp arm of the project clamp is engaged with the slot of the first benchtop the project clamp is configured to provide a clamping force that is perpendicular to the upper surface of the first benchtop.

2. The system of claim 1, wherein the lower clamp arm of the project clamp includes a clamp pad that is received within the slot of the first benchtop.

3. The system of claim 1, wherein the slot is formed of a recess in the first benchtop and a flange connected to an inward edge and an outward edge of the recess, wherein the first benchtop is formed of a plastic material and the flanges are formed of a metallic material.

4. The system of claim 1, wherein the slot in the first benchtop is a T-slot.

5. The system of claim 1, wherein the slot in the first benchtop extends the entire length of the first benchtop and the project clamp may be positioned along the length of the slot in the first benchtop.

6. The system of claim 1, further comprising a track having a slot configured to receive a bench clamp, wherein an upper surface of the track is in approximate flush alignment with the upper surface of the first benchtop when the first benchtop is in an extended position.

7. The system of claim 1, further comprising a track having a slot configured to receive a bench clamp, wherein an upper surface of the track is in approximate flush alignment with the upper surface of the benchtop when the first benchtop is in an extended position, wherein the track extends in an approximate parallel spaced relation to the slot in the lower surface of the benchtop.

8. The system of claim 1, wherein the first benchtop moves between an extended position and a retracted position.

9. The system of claim 1, further comprising folding legs operatively connected to the first benchtop.

10. The system of claim 1, wherein the slot in the lower surface of the first benchtop holds the project clamp when the project clamp is in an unclamped position, thereby preventing the project clamp from detaching from the first benchtop.

11. The system of claim 1, further comprising:

a center support operatively connected to the benchtop;

at least one mounting member positioned in the center support;

a bench clamp having a clamp arm, a clamping mechanism and an anchor;

wherein the anchor is configured to engage the at least one mounting member;

wherein when the anchor is engaged with the at least one mounting member the bench clamp applies a clamping force parallel to a plane formed the upper surface of the first benchtop.

12. The system of claim 1, further comprising:
a center support;
the first benchtop operatively connected on a first side of the center support;
a second benchtop operatively connected on a second side of the center support;
wherein the first benchtop and the second benchtop are configured to move between an extended position and a retracted position.

13. The system of claim 1, wherein the first benchtop includes a grid of spaced openings, wherein the grid of openings are configured to receive alignment accessories therein.

14. A workbench system, comprising:
a first benchtop;
the first benchtop having an upper surface, a lower surface and an edge;
a slot positioned in the lower surface of the first benchtop;
the slot extending a length of the first benchtop;
wherein the slot in the lower surface of the first benchtop is formed by attaching a flange along an inward edge and an outward edge of a recess in the lower surface of the first benchtop thereby forming a T-slot;
a project clamp;
the project clamp having a lower clamp arm, an upper clamp arm and a clamping mechanism;
wherein when the lower clamp arm of the project clamp is engaged with the slot of the first benchtop, the project clamp is slidable along a length of the slot of the first benchtop;
wherein when the lower clamp arm of the project clamp is engaged with the slot of the first benchtop the upper clamp arm is positioned above the upper surface of the first benchtop;
wherein when the lower clamp arm of the project clamp is engaged with the slot of the first benchtop the project clamp is configured to provide a clamping force that is perpendicular to the upper surface of the first benchtop.

15. A workbench system, comprising;
a center support;
the center support having an upper surface;
a slot positioned in the upper surface of the center support;
a first benchtop and a second benchtop operatively connected to the center support;
the first benchtop and the second benchtop having an upper surface and a lower surface;
a slot positioned in the lower surface of the first benchtop;
wherein the slot in the first benchtop is formed of a recess in the lower surface of the first benchtop and a flange positioned along an inward edge and an outward edge of the recess thereby forming a T-slot;
wherein the first benchtop and the second benchtop are configured to move between an extended position, wherein the upper surface of the first benchtop and second benchtop are in approximate flush alignment with the upper surface of the center support, and a retracted position;
wherein the slot in the lower surface of the first benchtop is configured to receive a project clamp;
wherein the project clamp is configured to clamp workpieces against the upper surface of the first benchtop;
wherein the slot in the upper surface of the center support is configured to receive an anchor of a bench clamp;
wherein the bench clamp is configured to clamp workpieces against the upper surface of the workbench.

16. The system of claim 15, further comprising:
a project clamp; wherein the project clamp has a lower clamp arm, an upper clamp arm and a clamping mechanism; wherein when the lower clamp arm of the project clamp is engaged with the slot of the first benchtop the upper clamp arm is positioned above the upper surface of the first benchtop.

17. The system of claim 15, further comprising:
a project clamp; wherein when a lower clamp arm of the project clamp is engaged with the slot of the first benchtop, the project clamp is slidable along a length of the first benchtop.

18. The system of claim 15, further comprising:
a project clamp; wherein when the anchor of the bench clamp is engaged with the slot of the center support, the bench clamp is slidable along a length of the center support.

19. The system of claim 15, further comprising:
a project clamp; wherein a lower clamp arm of the project clamp includes a clamp pad that is received within the slot of the first benchtop.

20. The system of claim 15, wherein the slot in the first benchtop extends the entire length of the first benchtop and the project clamp may be positioned along the length of the slot in the first benchtop.

21. The system of claim 15, further comprising folding legs operatively connected to the first benchtop and the second benchtop.

22. A workbench system, comprising:
a center support;
the center support having an upper surface;
the center support extending a length between opposing ends of the center support;
at least one mounting member positioned in a side of the center support;
a slot positioned in the upper surface of the center support;
a first benchtop and a second benchtop having an upper surface and a lower surface;
a slot positioned in the lower surface of the first benchtop;
wherein the first benchtop and the second benchtop are configured to move between an extended position, wherein the upper surface of the first benchtop and second benchtop are in approximate flush alignment with the upper surface of the center support, and a retracted position;
wherein the slot in the lower surface of the first benchtop is configured to receive a project clamp;
wherein the project clamp is configured to clamp workpieces against the upper surface of the first benchtop;
wherein the slot in the upper surface of the center support is configured to receive an anchor of a bench clamp;
wherein the at least one mounting member is configured to receive an anchor of a bench clamp;
wherein the bench clamp is configured to clamp workpieces against the upper surface of the workbench;
wherein when the bench clamp is connected to the at least one mounting member the bench clamp provides a clamping force that is parallel to the upper surface of the center support.

23. A workbench system, comprising;
a center support;
the center support having an upper surface;

a first benchtop and a second benchtop operatively connected to the center support;

the first benchtop and the second benchtop having an upper surface and a lower surface;

a slot positioned in the lower surface of the first benchtop;

wherein the slot is formed of a recess in the lower surface of the first benchtop and a flange positioned along an inward edge and an outward edge of the recess thereby forming a T-slot;

wherein the first benchtop and the second benchtop are configured to move between an extended position, wherein the upper surface of the first benchtop and second benchtop are in approximate flush alignment with the upper surface of the center support, and a retracted position;

wherein the slot in the lower surface of the first benchtop is configured to receive a project clamp;

wherein when the project clamp is engaged with the slot of the first benchtop, the project clamp is configured to clamp workpieces against the upper surface of the first benchtop.

24. A workbench system, comprising:

a center support having an upper surface;

the center support extending a length between opposing side surfaces;

a first benchtop having an upper surface and a lower surface;

the first benchtop operatively connected to the center support;

a first leg and a second leg operatively connected to the center support and first benchtop;

at least one mounting member in a side surface of the center support that is configured to receive an anchor of a bench clamp;

a bench clamp having a clamp arm, a clamping mechanism and an anchor that is configured to engage the at least one mounting member in the center support;

wherein when the anchor is engaged with the at least one mounting member in the center support, the bench clamp provides a clamping force that is parallel to the upper surface of the first benchtop.

25. The system of claim 24, further comprising a slot in the upper surface of the center support that is configured to receive a bench clamp that provides a clamping force perpendicular to the upper surface of the first benchtop.

26. The system of claim 24, further comprising a slot in the lower surface of the first benchtop that is configured to receive a project clamp that provides a clamping force perpendicular to the upper surface of the first benchtop.

27. The system of claim 24, wherein the first benchtop folds with respect to the center support.

28. The system of claim 24, wherein the at least one mounting member is a slot or a key hole.

29. The system of claim 24, further comprising a stop assembly connected to a slot in the center support, wherein the stop assembly serves as a stop for workpieces.

30. A workbench system, comprising:

an upper surface, a lower surface and opposing side surfaces;

a slot positioned in the upper surface that is configured to receive a bench clamp that provides a clamping force that is perpendicular to the upper surface;

a slot positioned in the lower surface that is configured to receive a project clamp that provides a clamping force that is perpendicular to the upper surface;

at least one mounting member in a side surface that is configured to receive a bench clamp that provides a clamping force that is parallel to the upper surface;

wherein the workbench system facilitates clamping a workpiece with a clamping force that is both parallel to the upper surface of the workbench as well as with a clamping force that is perpendicular to the upper surface of the workbench.

31. The system of claim 30, further comprising a center support and a first benchtop, wherein the center support includes the slot in the upper surface and the first benchtop includes the slot in the lower surface.

32. The system of claim 30, further comprising a center support and a first benchtop, wherein the at least one mounting member is positioned in the center support and the at least one slot in the lower surface is positioned in the first benchtop.

33. The system of claim 30, wherein the at least one mounting member is a slot or a key hole.

* * * * *